US012400223B2

(12) United States Patent
Dill et al.

(10) Patent No.: US 12,400,223 B2
(45) Date of Patent: *Aug. 26, 2025

(54) SYSTEMS AND METHODS FOR COMMUNICATING RISK USING TOKEN ASSURANCE DATA

(71) Applicant: Visa International Service Association, San Francisco, CA (US)

(72) Inventors: Matthew Dill, St. Helena, CA (US); Prasanna L. Narayan, San Ramon, CA (US); Glenn Powell, Fremont, CA (US); John Sheets, San Francisco, CA (US); Andrew Carpenter, Belmont, CA (US)

(73) Assignee: Visa International Service Association, San Francisco, CA (US)

( * ) Notice: Subject to any disclaimer, the term of this patent is extended or adjusted under 35 U.S.C. 154(b) by 529 days.

This patent is subject to a terminal disclaimer.

(21) Appl. No.: 17/676,041

(22) Filed: Feb. 18, 2022

(65) Prior Publication Data

US 2022/0172199 A1    Jun. 2, 2022

Related U.S. Application Data

(63) Continuation of application No. 17/020,472, filed on Sep. 14, 2020, now Pat. No. 11,915,235, which is a
(Continued)

(51) Int. Cl.
*G06Q 20/38* (2012.01)
*G06Q 20/40* (2012.01)
*H04L 9/32* (2006.01)

(52) U.S. Cl.
CPC ......... *G06Q 20/385* (2013.01); *G06Q 20/40* (2013.01); *G06Q 20/4016* (2013.01); *H04L 9/32* (2013.01);
(Continued)

(58) Field of Classification Search
CPC .. G06Q 20/385; G06Q 20/40; G06Q 20/4016; H04L 9/32; H04L 2209/42; H04L 2209/56
See application file for complete search history.

(56) References Cited

U.S. PATENT DOCUMENTS

| 5,613,012 A | 3/1997 | Hoffman et al. |
| 5,781,438 A | 7/1998 | Lee et al. |

(Continued)

FOREIGN PATENT DOCUMENTS

| AU | 2014292980 | 2/2016 |
| AU | 2014293042 | 2/2016 |

(Continued)

OTHER PUBLICATIONS

U.S. Appl. No. 17/020,472, Non-Final Office Action, Mailed On Mar. 30, 2023, 26 pages.
(Continued)

*Primary Examiner* — John W Hayes
*Assistant Examiner* — Edgar R. Martinez-Hernandez
(74) *Attorney, Agent, or Firm* — Kilpatrick Townsend & Stockton LLP

(57) ABSTRACT

Systems and methods for interoperable network token processing are provided. A network token system provides a platform that can be leveraged by external entities (e.g., third party wallets, e-commerce merchants, payment enablers/payment service providers, etc.) or internal payment processing network systems that have the need to use the tokens to facilitate payment transactions. A token registry vault can provide interfaces for various token requestors (e.g., mobile device, issuers, merchants, mobile wallet providers, etc.), merchants, acquirers, issuers, and payment processing network systems to request generation, use and management of tokens. The network token system further provides services
(Continued)

such as card registration, token generation, token issuance, token authentication and activation, token exchange, and token life-cycle management.

20 Claims, 12 Drawing Sheets

Related U.S. Application Data continuation of application No. 15/974,599, filed on May 8, 2018, now Pat. No. 11,093,936, which is a continuation of application No. 14/340,464, filed on Jul. 24, 2014, now Pat. No. 9,996,835.

(60) Provisional application No. 61/935,036, filed on Feb. 3, 2014, provisional application No. 61/863,863, filed on Aug. 8, 2013, provisional application No. 61/858,087, filed on Jul. 24, 2013.

(52) U.S. Cl.
CPC ...... *H04L 2209/42* (2013.01); *H04L 2209/56* (2013.01)

(56) References Cited

U.S. PATENT DOCUMENTS

| | | | |
|---|---|---|---|
| 5,883,810 A | 3/1999 | Franklin et al. |
| 5,953,710 A | 9/1999 | Fleming |
| 5,956,699 A | 9/1999 | Wong et al. |
| 6,000,832 A | 12/1999 | Franklin et al. |
| 6,014,635 A | 1/2000 | Harris et al. |
| 6,044,360 A | 3/2000 | Picciallo |
| 6,163,771 A | 12/2000 | Walker et al. |
| 6,227,447 B1 | 5/2001 | Campisano |
| 6,236,981 B1 | 5/2001 | Hill |
| 6,267,292 B1 | 7/2001 | Walker et al. |
| 6,327,578 B1 * | 12/2001 | Linehan ............ G06Q 20/02 713/172 |
| 6,341,724 B2 | 1/2002 | Campisano |
| 6,385,596 B1 | 5/2002 | Wiser et al. |
| 6,422,462 B1 | 7/2002 | Cohen |
| 6,425,523 B1 | 7/2002 | Shem-Ur et al. |
| 6,592,044 B1 | 7/2003 | Wong et al. |
| 6,636,833 B1 | 10/2003 | Flitcroft et al. |
| 6,748,367 B1 | 6/2004 | Lee |
| 6,805,287 B2 | 10/2004 | Bishop et al. |
| 6,879,965 B2 | 4/2005 | Fung et al. |
| 6,891,953 B1 | 5/2005 | DeMello et al. |
| 6,901,387 B2 | 5/2005 | Wells et al. |
| 6,931,382 B2 | 8/2005 | Laage et al. |
| 6,938,019 B1 | 8/2005 | Uzo |
| 6,941,285 B2 | 9/2005 | Sarcanin |
| 6,980,670 B1 | 12/2005 | Hoffman et al. |
| 6,990,470 B2 | 1/2006 | Hogan et al. |
| 6,991,157 B2 | 1/2006 | Bishop et al. |
| 6,999,943 B1 | 2/2006 | Johnson et al. |
| 7,051,929 B2 | 5/2006 | Li |
| 7,069,249 B2 | 6/2006 | Stolfo et al. |
| 7,103,576 B2 | 9/2006 | Mann, III et al. |
| 7,113,930 B2 | 9/2006 | Eccles et al. |
| 7,136,835 B1 | 11/2006 | Flitcroft et al. |
| 7,177,835 B1 | 2/2007 | Walker et al. |
| 7,177,848 B2 | 2/2007 | Hogan et al. |
| 7,194,437 B1 | 3/2007 | Britto et al. |
| 7,209,561 B1 | 4/2007 | Shankar et al. |
| 7,264,154 B2 | 9/2007 | Harris |
| 7,287,692 B1 | 10/2007 | Patel et al. |
| 7,292,999 B2 | 11/2007 | Hobson et al. |
| 7,350,230 B2 | 3/2008 | Forrest |
| 7,353,382 B2 | 4/2008 | Labrou et al. |
| 7,379,919 B2 | 5/2008 | Hogan et al. |
| RE40,444 E | 7/2008 | Linehan |
| 7,415,443 B2 | 8/2008 | Hobson et al. |
| 7,444,676 B1 | 10/2008 | Asghari-Kamrani et al. |
| 7,469,151 B2 | 12/2008 | Khan et al. |
| 7,548,889 B2 | 6/2009 | Bhambri et al. |
| 7,559,464 B2 | 7/2009 | Routhenstein |
| 7,567,934 B2 | 7/2009 | Flitcroft et al. |
| 7,567,936 B1 | 7/2009 | Peckover et al. |
| 7,571,139 B1 | 8/2009 | Giordano et al. |
| 7,571,142 B1 | 8/2009 | Flitcroft et al. |
| 7,580,898 B2 | 8/2009 | Brown et al. |
| 7,584,153 B2 | 9/2009 | Brown et al. |
| 7,593,896 B1 | 9/2009 | Flitcroft et al. |
| 7,606,560 B2 | 10/2009 | Labrou et al. |
| 7,627,531 B2 | 12/2009 | Breck et al. |
| 7,627,895 B2 | 12/2009 | Gifford et al. |
| 7,650,314 B1 | 1/2010 | Saunders |
| 7,685,037 B2 | 3/2010 | Reiners et al. |
| 7,702,578 B2 | 4/2010 | Fung et al. |
| 7,707,120 B2 | 4/2010 | Dominguez et al. |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II et al. |
| 7,784,685 B1 | 8/2010 | Hopkins, III |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,818,264 B2 | 10/2010 | Hammad |
| 7,828,220 B2 | 11/2010 | Mullen |
| 7,835,960 B2 | 11/2010 | Breck et al. |
| 7,841,523 B2 | 11/2010 | Oder, II et al. |
| 7,841,539 B2 | 11/2010 | Hewton |
| 7,844,550 B2 | 11/2010 | Walker et al. |
| 7,848,980 B2 | 12/2010 | Carlson |
| 7,849,020 B2 | 12/2010 | Johnson |
| 7,853,529 B1 | 12/2010 | Walker et al. |
| 7,853,995 B2 | 12/2010 | Chow et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,890,393 B2 | 2/2011 | Talbert et al. |
| 7,891,563 B2 | 2/2011 | Oder, II et al. |
| 7,896,238 B2 | 3/2011 | Fein et al. |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein et al. |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders et al. |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen et al. |
| 8,095,113 B2 | 1/2012 | Kean et al. |
| 8,104,679 B2 | 1/2012 | Brown |
| RE43,157 E | 2/2012 | Bishop et al. |
| 8,109,436 B1 | 2/2012 | Hopkins, III |
| 8,121,942 B2 | 2/2012 | Carlson et al. |
| 8,121,956 B2 | 2/2012 | Carlson et al. |
| 8,126,449 B2 | 2/2012 | Beenau et al. |
| 8,171,525 B1 | 5/2012 | Pelly et al. |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza et al. |
| 8,219,489 B2 | 7/2012 | Patterson |
| 8,224,702 B2 | 7/2012 | Mengerink et al. |
| 8,225,385 B2 | 7/2012 | Chow et al. |
| 8,229,852 B2 | 7/2012 | Carlson |
| 8,265,993 B2 | 9/2012 | Chien et al. |
| 8,280,777 B2 | 10/2012 | Mengerink et al. |
| 8,281,991 B2 | 10/2012 | Wentker et al. |
| 8,327,142 B2 | 12/2012 | Lund et al. |
| 8,328,095 B2 | 12/2012 | Oder, II et al. |

(56) References Cited

U.S. PATENT DOCUMENTS

| | | |
|---|---|---|
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren |
| 8,433,116 B2 | 4/2013 | Butler et al. |
| 8,447,699 B2 | 5/2013 | Batada et al. |
| 8,447,983 B1 | 5/2013 | Beck et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,478,898 B2 | 7/2013 | Harvey et al. |
| 8,484,134 B2 | 7/2013 | Hobson et al. |
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,528,067 B2 | 9/2013 | Hurry et al. |
| 8,533,860 B1 | 9/2013 | Grecia |
| 8,538,845 B2 | 9/2013 | Liberty |
| 8,555,079 B2 | 10/2013 | Shablygin et al. |
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | McGuire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,613,055 B1 | 12/2013 | Tomilson et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | von Behren et al. |
| 8,651,374 B2 | 2/2014 | Brabson et al. |
| 8,656,180 B2 | 2/2014 | Shablygin et al. |
| 8,682,802 B1 * | 3/2014 | Kannanari ......... G06Q 20/3274 705/64 |
| 8,726,361 B2 | 5/2014 | Radhakrishnan |
| 8,751,391 B2 | 6/2014 | Freund |
| 8,762,263 B2 | 6/2014 | Gauthier et al. |
| 8,793,186 B2 | 7/2014 | Patterson |
| 8,813,243 B2 | 8/2014 | Parkinson |
| 8,838,982 B2 | 9/2014 | Carlson et al. |
| 8,856,539 B2 | 10/2014 | Weiss |
| 8,887,308 B2 | 11/2014 | Grecia |
| 8,887,994 B1 | 11/2014 | Thomas et al. |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,680,942 B2 | 6/2017 | Dimmick |
| 9,792,611 B2 | 10/2017 | Hammad et al. |
| 9,818,108 B2 | 11/2017 | von Mueller et al. |
| 9,996,825 B1 | 6/2018 | Casey et al. |
| 9,996,835 B2 * | 6/2018 | Dill ................. G06Q 20/40 |
| 10,496,986 B2 * | 12/2019 | Narayan .......... G06Q 20/38215 |
| 10,891,610 B2 * | 1/2021 | Powell ............... G06Q 20/40 |
| 11,023,890 B2 | 6/2021 | Shastry et al. |
| 11,093,936 B2 | 8/2021 | Dill et al. |
| 2001/0029485 A1 | 10/2001 | Brody et al. |
| 2001/0034720 A1 | 10/2001 | Armes |
| 2001/0051915 A1 | 12/2001 | Ueno et al. |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0038292 A1 | 3/2002 | Quelene |
| 2002/0073045 A1 | 6/2002 | Rubin et al. |
| 2002/0116341 A1 | 8/2002 | Hogan et al. |
| 2002/0120584 A1 | 8/2002 | Hogan et al. |
| 2002/0133467 A1 | 9/2002 | Hobson et al. |
| 2002/0147913 A1 | 10/2002 | Lun Yip |
| 2003/0028481 A1 | 2/2003 | Flitcroft et al. |
| 2003/0061170 A1 * | 3/2003 | Uzo ................. G06Q 20/29 705/37 |
| 2003/0101348 A1 | 5/2003 | Russo et al. |
| 2003/0115142 A1 | 6/2003 | Brickell et al. |
| 2003/0120554 A1 | 6/2003 | Hogan et al. |
| 2003/0130955 A1 | 7/2003 | Hawthorne |
| 2003/0191709 A1 | 10/2003 | Elston et al. |
| 2003/0191945 A1 | 10/2003 | Keech |
| 2004/0010462 A1 | 1/2004 | Moon et al. |
| 2004/0050928 A1 | 3/2004 | Bishop et al. |
| 2004/0059682 A1 | 3/2004 | Hasumi et al. |
| 2004/0093281 A1 | 5/2004 | Silverstein et al. |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0260646 A1 | 12/2004 | Berardi et al. |
| 2005/0037735 A1 | 2/2005 | Coutts |
| 2005/0080730 A1 | 4/2005 | Sorrentino |
| 2005/0108178 A1 | 5/2005 | York |
| 2005/0149440 A1 | 7/2005 | Michelassi et al. |
| 2005/0199709 A1 | 9/2005 | Linlor |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2005/0278542 A1 | 12/2005 | Pierson et al. |
| 2006/0235795 A1 | 10/2006 | Johnson et al. |
| 2006/0235796 A1 | 10/2006 | Johnson et al. |
| 2006/0237528 A1 | 10/2006 | Bishop et al. |
| 2006/0278704 A1 | 12/2006 | Saunders et al. |
| 2007/0106815 A1 | 5/2007 | Harvey et al. |
| 2007/0107044 A1 | 5/2007 | Yuen et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0150387 A1 | 6/2007 | Seubert et al. |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0288377 A1 | 12/2007 | Shaked |
| 2007/0291995 A1 | 12/2007 | Rivera |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0154770 A1 | 6/2008 | Rutherford et al. |

(56) References Cited

U.S. PATENT DOCUMENTS

| | | |
|---|---|---|
| 2008/0189214 A1 | 8/2008 | Mueller et al. |
| 2008/0201264 A1 | 8/2008 | Brown et al. |
| 2008/0201265 A1 | 8/2008 | Hewton |
| 2008/0203152 A1 | 8/2008 | Hammad et al. |
| 2008/0223918 A1 | 9/2008 | Williams et al. |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0283591 A1 | 11/2008 | Oder, II et al. |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048953 A1 | 2/2009 | Hazel et al. |
| 2009/0048971 A1 | 2/2009 | Hathaway et al. |
| 2009/0106112 A1 | 4/2009 | Dalmia et al. |
| 2009/0106160 A1 | 4/2009 | Skowronek |
| 2009/0112793 A1 | 4/2009 | Ahmed |
| 2009/0117883 A1 | 5/2009 | Coffing et al. |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |
| 2010/0008535 A1 | 1/2010 | Abulafia et al. |
| 2010/0010930 A1 | 1/2010 | Allen et al. |
| 2010/0011215 A1 | 1/2010 | Lior et al. |
| 2010/0063895 A1 | 3/2010 | Dominguez et al. |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru et al. |
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235280 A1 | 9/2010 | Boyd et al. |
| 2010/0235284 A1 | 9/2010 | Moore |
| 2010/0258620 A1 | 10/2010 | Torreyson et al. |
| 2010/0291904 A1 | 11/2010 | Musfeldt et al. |
| 2010/0299267 A1 | 11/2010 | Faith et al. |
| 2010/0306076 A1 | 12/2010 | Taveau et al. |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0029504 A1 | 2/2011 | King et al. |
| 2011/0040640 A1 | 2/2011 | Erikson |
| 2011/0047076 A1 | 2/2011 | Carlson et al. |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0099377 A1 | 4/2011 | Hoornaert et al. |
| 2011/0125597 A1 | 5/2011 | Oder, II et al. |
| 2011/0125638 A1 | 5/2011 | Davis et al. |
| 2011/0153437 A1 | 6/2011 | Archer et al. |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178925 A1 | 7/2011 | Lindelsee et al. |
| 2011/0178926 A1 | 7/2011 | Lindelsee et al. |
| 2011/0191244 A1 | 8/2011 | Dai |
| 2011/0225643 A1 | 9/2011 | Faynberg et al. |
| 2011/0237224 A1 | 9/2011 | Coppinger |
| 2011/0238511 A1 | 9/2011 | Park et al. |
| 2011/0238573 A1 | 9/2011 | Varadarajan |
| 2011/0238576 A1 | 9/2011 | Patterson |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0276485 A1 | 11/2011 | Varga |
| 2011/0295745 A1 | 12/2011 | White et al. |
| 2011/0302081 A1 | 12/2011 | Saunders et al. |
| 2011/0307710 A1 | 12/2011 | McGuire et al. |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0031969 A1 | 2/2012 | Hammad |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0060207 A1 | 3/2012 | Mardikar et al. |
| 2012/0066078 A1 | 3/2012 | Kingston et al. |
| 2012/0066758 A1 | 3/2012 | Kasturi |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0116976 A1 | 5/2012 | Hammad et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0143767 A1 | 6/2012 | Abadir |
| 2012/0143772 A1 | 6/2012 | Abadir |
| 2012/0150669 A1 | 6/2012 | Langley et al. |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0203700 A1 | 8/2012 | Ornce et al. |
| 2012/0209778 A1 | 8/2012 | Delany |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0259782 A1 | 10/2012 | Hammad |
| 2012/0259784 A1 | 10/2012 | Carlson et al. |
| 2012/0265631 A1 | 10/2012 | Cronic et al. |
| 2012/0271770 A1 | 10/2012 | Harris et al. |
| 2012/0278236 A1 | 11/2012 | Jain et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |

(56) References Cited

U.S. PATENT DOCUMENTS

| | | |
|---|---|---|
| 2013/0017784 A1 | 1/2013 | Fisher |
| 2013/0018757 A1 | 1/2013 | Anderson et al. |
| 2013/0018793 A1 | 1/2013 | Wong et al. |
| 2013/0019098 A1 | 1/2013 | Gupta et al. |
| 2013/0031006 A1 | 1/2013 | McCullagh et al. |
| 2013/0036048 A1 | 2/2013 | Campos et al. |
| 2013/0047202 A1 | 2/2013 | Radhakrishnan |
| 2013/0047245 A1 | 2/2013 | Radhakrishnan |
| 2013/0047254 A1 | 2/2013 | Radhakrishnan et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder ("J.D."), II et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166456 A1 | 6/2013 | Zhang et al. |
| 2013/0168450 A1 | 7/2013 | Von Mueller et al. |
| 2013/0173736 A1 | 7/2013 | Krzeminski et al. |
| 2013/0174244 A1 | 7/2013 | Taveau et al. |
| 2013/0185202 A1 | 7/2013 | Goldthwaite et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204781 A1 | 8/2013 | Flitcroft et al. |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0268776 A1 | 10/2013 | Motoyama |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0282589 A1 | 10/2013 | Shoup et al. |
| 2013/0297501 A1 | 11/2013 | Monk et al. |
| 2013/0297504 A1 | 11/2013 | Nwokolo et al. |
| 2013/0297508 A1 | 11/2013 | Belamant |
| 2013/0304642 A1 | 11/2013 | Campos |
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040148 A1 | 2/2014 | Ozvat et al. |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0074724 A1 | 3/2014 | Gordon et al. |
| 2014/0108172 A1 | 4/2014 | Weber et al. |
| 2014/0108263 A1 | 4/2014 | Ortiz et al. |
| 2014/0108265 A1 | 4/2014 | Hayhow et al. |
| 2014/0114857 A1 | 4/2014 | Griggs et al. |
| 2014/0143137 A1 | 5/2014 | Carlson |
| 2014/0149746 A1 | 5/2014 | Yau |
| 2014/0164243 A1 | 6/2014 | Aabye et al. |
| 2014/0165179 A1 | 6/2014 | Taveau et al. |
| 2014/0188586 A1 | 7/2014 | Carpenter et al. |
| 2014/0249945 A1 | 9/2014 | Gauthier et al. |
| 2014/0258123 A1 | 9/2014 | Fernandes |
| 2014/0289809 A1 | 9/2014 | Taylor et al. |
| 2014/0294701 A1 | 10/2014 | Dai et al. |
| 2014/0297534 A1 | 10/2014 | Patterson |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019317 A1 | 1/2015 | Mitchell |
| 2015/0019443 A1 | 1/2015 | Sheets et al. |
| 2015/0032625 A1 | 1/2015 | Dill et al. |
| 2015/0032626 A1* | 1/2015 | Dill ............ H04L 9/32 705/44 |
| 2015/0032627 A1 | 1/2015 | Dill et al. |
| 2015/0046338 A1* | 2/2015 | Laxminarayanan ........ G06Q 20/38215 705/67 |
| 2015/0046339 A1 | 2/2015 | Wong et al. |
| 2015/0052064 A1 | 2/2015 | Karpenko et al. |
| 2015/0066768 A1 | 3/2015 | Williamson et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0161608 A1 | 6/2015 | Gilbert et al. |

(56) References Cited

U.S. PATENT DOCUMENTS

| | | |
|---|---|---|
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1* | 7/2015 | Kumnick ........... G06Q 20/3674 705/67 |
| 2015/0220917 A1 | 8/2015 | Aabye et al. |
| 2015/0235198 A1 | 8/2015 | Liezenberg et al. |
| 2015/0237038 A1 | 8/2015 | Grajek et al. |
| 2015/0237074 A1 | 8/2015 | Mardikar et al. |
| 2015/0269566 A1 | 9/2015 | Gaddam et al. |
| 2015/0278729 A1 | 10/2015 | Hu et al. |
| 2015/0278799 A1 | 10/2015 | Palanisamy |
| 2015/0287037 A1 | 10/2015 | Salmon et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0332264 A1 | 11/2015 | Bondesen et al. |
| 2015/0339664 A1 | 11/2015 | Wong et al. |
| 2015/0356560 A1 | 12/2015 | Shastry et al. |
| 2015/0363781 A1 | 12/2015 | Badenhorst |
| 2016/0028550 A1 | 1/2016 | Gaddam et al. |
| 2016/0036790 A1 | 2/2016 | Shastry et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0092874 A1 | 3/2016 | O'Regan et al. |
| 2016/0103675 A1 | 4/2016 | Aabye et al. |
| 2016/0119296 A1 | 4/2016 | Laxminarayanan et al. |
| 2016/0132878 A1 | 5/2016 | O'Regan et al. |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0197725 A1 | 7/2016 | Hammad |
| 2016/0210628 A1 | 7/2016 | McGuire |
| 2016/0218875 A1 | 7/2016 | Le Saint et al. |
| 2016/0224976 A1 | 8/2016 | Basu et al. |
| 2016/0224977 A1 | 8/2016 | Sabba et al. |
| 2016/0232527 A1 | 8/2016 | Patterson |
| 2016/0239842 A1 | 8/2016 | Cash et al. |
| 2016/0308995 A1 | 10/2016 | Youdale et al. |
| 2017/0046696 A1 | 2/2017 | Powell et al. |
| 2017/0103387 A1 | 4/2017 | Weber |
| 2017/0109745 A1 | 4/2017 | Al-Bedaiwi et al. |
| 2017/0186001 A1 | 6/2017 | Reed et al. |
| 2017/0220818 A1 | 8/2017 | Nagasundaram et al. |
| 2017/0228723 A1 | 8/2017 | Taylor et al. |
| 2017/0295155 A1 | 10/2017 | Wong |
| 2017/0364903 A1 | 12/2017 | Lopez |

FOREIGN PATENT DOCUMENTS

| | | |
|---|---|---|
| AU | 2014331673 | 5/2016 |
| AU | 2018213991 | 9/2019 |
| CA | 2862334 A1 | 7/2013 |
| CA | 2918788 | 1/2015 |
| CA | 2919199 | 1/2015 |
| CA | 2927052 | 4/2015 |
| CN | 1347540 | 5/2002 |
| CN | 101562621 | 10/2009 |
| CN | 102341817 A | 2/2012 |
| CN | 102754116 A | 10/2012 |
| CN | 102844776 | 12/2012 |
| CN | 103023657 | 4/2013 |
| CN | 103236009 | 8/2013 |
| CN | 105580038 | 5/2016 |
| CN | 105874495 | 8/2016 |
| CN | 106464492 | 2/2017 |
| EP | 2156397 | 2/2010 |
| EP | 3025292 | 6/2016 |
| EP | 3025293 | 6/2016 |
| EP | 3078156 | 10/2016 |
| IN | 201647016067 | 8/2016 |
| JP | 2000194770 | 7/2000 |
| JP | 2001344545 | 12/2001 |
| JP | 2002007921 | 1/2002 |
| JP | 2002508550 | 3/2002 |
| JP | 2002366869 | 12/2002 |
| JP | 2004509390 | 3/2004 |
| JP | 2005523505 | 8/2005 |
| JP | 2009524741 | 7/2009 |
| JP | 2009534741 | 9/2009 |
| JP | 2009541858 | 11/2009 |
| JP | 2009301211 | 12/2009 |
| JP | 2010165374 | 7/2010 |
| JP | 6386567 | 8/2018 |
| JP | 6518244 | 5/2019 |
| JP | 6642920 | 1/2020 |
| KR | 1020090036560 | 4/2009 |
| KR | 1020120076502 | 7/2012 |
| KR | 1020160035028 | 3/2016 |
| KR | 102070451 | 1/2020 |
| RU | 2263347 | 10/2005 |
| RU | 2292589 | 1/2007 |
| RU | 2388053 | 4/2010 |
| RU | 2016105768 | 8/2017 |
| RU | 2016117997 | 11/2017 |
| RU | 2669081 | 10/2018 |
| RU | 2681366 | 3/2019 |
| RU | 2691843 | 6/2019 |
| SG | 11201600427 R | 2/2016 |
| SG | 11201600520 | 2/2016 |
| SG | 10201800626 | 2/2018 |
| SG | 10201800629 W | 2/2018 |
| SG | 11201602835 | 9/2018 |
| WO | 01035304 | 5/2001 |
| WO | 0193129 | 12/2001 |
| WO | 0135304 | 5/2002 |
| WO | 2004042536 | 5/2004 |
| WO | 2005004026 | 1/2005 |
| WO | 2005043436 | 5/2005 |
| WO | 2005096117 | 10/2005 |
| WO | 2006062998 | 6/2006 |
| WO | 2006113834 | 10/2006 |
| WO | 2007149775 | 12/2007 |
| WO | 2008144555 | 11/2008 |
| WO | 2009032523 | 3/2009 |
| WO | 2009112793 | 9/2009 |
| WO | 2010078522 | 7/2010 |
| WO | 2011075450 | 6/2011 |
| WO | 2012068078 | 5/2012 |
| WO | 2012098556 | 7/2012 |
| WO | 2012142370 | 10/2012 |
| WO | 2012151590 | 11/2012 |
| WO | 2012167941 | 12/2012 |
| WO | 2013048538 | 4/2013 |
| WO | 2013056104 | 4/2013 |
| WO | 2013119914 | 8/2013 |
| WO | 2013179271 | 12/2013 |
| WO | 2015013522 | 1/2015 |
| WO | 2015013548 | 1/2015 |
| WO | 2015054697 | 4/2015 |
| WO | 2015179637 | 11/2015 |

OTHER PUBLICATIONS

AU2021200807, "Third Examination Report", Feb. 28, 2023, 4 pages.

Dass et al., "Security Framework for Addressing the Issues of Trust on Mobile Financial Services", 7th International Conference on Next Generation Web Services Practices, 2011, pp. 99-104.

Pirker et al., "A Framework for Privacy-Preserving Mobile Payment on Security Enhanced ARM TrustZone Platforms", IEEE 11th International Conference on Trust, Security and Privacy in Computing and Communications, 2012, pp. 1155-1160.

Application No. CN202110833113.X, Office Action, Mailed On Apr. 25, 2023, 21 pages.

(56) References Cited

OTHER PUBLICATIONS

JP2021-028173, "Office Action", May 19, 2022, 4 pages.
SG10201800626R, "Written Opinion", Jul. 1, 2022, 12 pages.
SG10201800629W, "Written Opinion", Jun. 28, 2022, 12 pages.
U.S. Appl. No. 17/307,861, Notice of Allowance, Mailed On Sep. 30, 2022, 13 pages.
AU2021200807, "Second Examination Report", Sep. 27, 2022, 4 pages.
Application No. RU2019114941, Office Action, Mailed On Oct. 25, 2022, 16 pages.
U.S. Appl. No. 17/020,472, Notice of Allowance, Mailed On Oct. 18, 2023, 12 pages.
Application No. EP21174537.7, Office Action, Mailed On Sep. 1, 2023, 7 pages.
Application No. SG10201800626R, Further Written Opinion, Mailed On Jan. 19, 2024, 9 pages.
Application No. JP2023-001118, Office Action, Mailed On Jan. 31, 2024, 4 pages.
AU2021200807, "First Examination Report", Apr. 13, 2022, 6 pages.
Application No. CN201480052318.2, Office Action, Mailed On Feb. 25, 2022, 34 pages.
"Device Fingerprinting and Fraud Protection Whitepaper Review", Avaiable Online At: https://web.archive.org/web/20131001000000*/http://www.cse.iitd.ernet.in/-siy117527/sil765/readings/Device-Fingerprinting-and-Online-Fraud-Protection-Whitepaper.pdf, Oct. 8, 2011, 3 pages.
"Petition for Inter Partes Review of U.S. Pat. No. 8,533,860 Challenging Claims 1-30 Under 35 U.S.C. § 312 and 37 C.F.R. § 42.104", USPTO Patent Trial and Appeal Board, IPR 2016-00600, Feb. 17, 2016, 65 pages.
U.S. Appl. No. 14/340,344, Final Office Action, Mailed On Sep. 26, 2017, 26 pages.
U.S. Appl. No. 14/340,344, Final Office Action, Mailed On Apr. 15, 2020, 33 pages.
U.S. Appl. No. 14/340,344, Final Office Action, Mailed On Apr. 4, 2019, 43 pages.
U.S. Appl. No. 14/340,344, Non-Final Office Action, Mailed On Jan. 31, 2017, 19 pages.
U.S. Appl. No. 14/340,344, Non-Final Office Action, Mailed On Nov. 26, 2019, 21 pages.
U.S. Appl. No. 14/340,344, Non-Final Office Action, Mailed On Jul. 27, 2018, 37 pages.
U.S. Appl. No. 14/340,344, filed Jul. 24, 2014, 70 pages.
U.S. Appl. No. 14/340,444, Final Office Action, Mailed On Jun. 26, 2017, 17 pages.
U.S. Appl. No. 14/340,444, Final Office Action, Mailed On Aug. 7, 2018, 28 pages.
U.S. Appl. No. 14/340,444, Final Office Action, Mailed On Aug. 5, 2019, 38 pages.
U.S. Appl. No. 14/340,444, Non-Final Office Action, Mailed On Jan. 11, 2017, 19 pages.
U.S. Appl. No. 14/340,444, Non-Final Office Action, Mailed On Dec. 14, 2017, 27 pages.
U.S. Appl. No. 14/340,444, Non-Final Office Action, Mailed On Dec. 28, 2018, 28 pages.
U.S. Appl. No. 14/340,444, Non-Final Office Action, Mailed On Jun. 5, 2020, 49 pages.
U.S. Appl. No. 14/340,444, Systems and Methods for Interoperable Network Token Processing, Jul. 24, 2014, 130 pages.
U.S. Appl. No. 14/340,464, Final Office Action, Mailed On May 20, 2016, 24 pages.
U.S. Appl. No. 14/340,464, Final Office Action, Mailed On May 2, 2017, 38 pages.
U.S. Appl. No. 14/340,464, Non-Final Office Action, Mailed On Dec. 4, 2015, 23 pages.
U.S. Appl. No. 14/340,464, Non-Final Office Action, Mailed On Dec. 1, 2016, 33 pages.
U.S. Appl. No. 14/340,464, "Notice of Allowability", Apr. 16, 2018, 3 pages.
U.S. Appl. No. 14/340,464, Notice of Allowance, Mailed On Feb. 7, 2018, 16 pages.
U.S. Appl. No. 14/340,464, Systems and Methods for Communicating Token Attributes Associated With a Token Vault, Jul. 24, 2014, 134 pages.
U.S. Appl. No. 14/514,290, Advisory Action, Mailed On Jan. 26, 2018, 4 pages.
U.S. Appl. No. 14/514,290, Final Office Action, Mailed On May 5, 2016, 17 pages.
U.S. Appl. No. 14/514,290, Final Office Action, Mailed On Oct. 4, 2017, 20 pages.
U.S. Appl. No. 14/514,290, Final Office Action, Mailed On May 10, 2019, 21 pages.
U.S. Appl. No. 14/514,290, Non-Final Office Action, Mailed On Dec. 10, 2015, 13 pages.
U.S. Appl. No. 14/514,290, Non-Final Office Action, Mailed On Jun. 6, 2017, 17 pages.
U.S. Appl. No. 14/514,290, Non-Final Office Action, Mailed On Nov. 28, 2018, 19 pages.
U.S. Appl. No. 14/514,290, Notice of Allowance, Mailed On Sep. 3, 2020, 10 pages.
U.S. Appl. No. 14/514,290, Network Token System, Oct. 14, 2014, 93 pages.
U.S. Appl. No. 14/600,523, Secure Payment Processing Using Authorization Request, Jan. 20, 2015, 42 pages.
U.S. Appl. No. 14/719,014, "Restriction Requirement", May 26, 2016, 6 pages.
U.S. Appl. No. 14/732,458, Final Office Action, Mailed On Aug. 2, 2019, 28 pages.
U.S. Appl. No. 14/732,458, Final Office Action, Mailed On Jun. 8, 2018, 34 pages.
U.S. Appl. No. 14/732,458, Non-Final Office Action, Mailed On Jul. 31, 2020, 14 pages.
U.S. Appl. No. 14/732,458, Non-Final Office Action, Mailed On Nov. 15, 2017, 24 pages.
U.S. Appl. No. 14/732,458, Non-Final Office Action, Mailed On Apr. 16, 2019, 31 pages.
U.S. Appl. No. 14/732,458, Notice of Allowance, Mailed On Feb. 1, 2021, 13 pages.
U.S. Appl. No. 14/952,444, Tokenization Request Via Access Device, Nov. 25, 2015, 78 pages.
U.S. Appl. No. 14/952,514, Systems Communications With Non-Sensitive Identifiers, Nov. 25, 2015, 72 pages.
U.S. Appl. No. 14/955,716, Provisioning Platform for Machine-To-Machine Devices, Dec. 1, 2015, 61 pages.
U.S. Appl. No. 14/966,948, Automated Access Data Provisioning, Dec. 11, 2015, 52 pages.
U.S. Appl. No. 15/004,705, Cloud-Based Transactions With Magnetic Secure Transmission, Jan. 22, 2016, 161 pages.
U.S. Appl. No. 15/008,388, Methods for Secure Credential Provisioning, Jan. 27, 2016, 90 pages.
U.S. Appl. No. 15/011,366, Token Check Offline, Jan. 29, 2016, 60 pages.
U.S. Appl. No. 15/019,157, Token Processing Utilizing Multiple Authorizations, Feb. 9, 2016, 62 pages.
U.S. Appl. No. 15/041,495, Peer Forward Authorization of Digital Requests, Feb. 11, 2016, 63 pages.
U.S. Appl. No. 15/265,282, Self-Cleaning Token Valut, Sep. 14, 2016, 52 pages.
U.S. Appl. No. 15/462,658, Replacing Token On a Multi-Token User Device, Mar. 17, 2017, 58 pages.
U.S. Appl. No. 15/585,077, System and Method Using Interaction Token, May 2, 2017, 36 pages.
U.S. Appl. No. 15/974,599, Final Office Action, Mailed On May 1, 2020, 33 pages.
U.S. Appl. No. 15/974,599, Non-Final Office Action, Mailed On Oct. 1, 2019, 25 pages.
U.S. Appl. No. 15/974,599, Notice of Allowance, Mailed On Apr. 13, 2021, 12 pages.
U.S. Appl. No. 61/738,832, Management of Sensitive Data, Dec. 18, 2012, 22 pages.
U.S. Appl. No. 61/751,763, Payments Bridge, Jan. 11, 2013, 64 pages.

(56) References Cited

OTHER PUBLICATIONS

U.S. Appl. No. 61/879,632 , Systems and Methods for Managing Mobile Cardholder Verification Methods, Sep. 18, 2013, 24 pages.
U.S. Appl. No. 61/892,407 , Issuer Over-The-Air Update Method and System, Oct. 17, 2013, 28 pages.
U.S. Appl. No. 61/894,749 , Methods and Systems for Authentication and Issuance of Tokens in a Secure Environment, Oct. 23, 2013, 67 pages.
U.S. Appl. No. 61/926,236 , Methods and Systems for Provisioning Mobile Devices With Payment Credentials and Payment Token Identifiers, Jan. 10, 2014, 51 pages.
U.S. Appl. No. 62/000,288 , Payment System Canonical Address Format, May 19, 2014, 58 pages.
U.S. Appl. No. 62/003,717 , Mobile Merchant Application, May 28, 2014, 58 pages.
U.S. Appl. No. 62/024,426 , Secure Transactions Using Mobile Devices, Jul. 14, 2014, 102 pages.
U.S. Appl. No. 62/037,033 , Sharing Payment Token, Aug. 13, 2014, 36 pages.
U.S. Appl. No. 62/038,174 , Customized Payment Gateway, Aug. 15, 2014, 42 pages.
U.S. Appl. No. 62/042,050 , Payment Device Authentication and Authorization System, Aug. 26, 2014, 120 pages.
U.S. Appl. No. 62/053,736 , Completing Transactions Without a User Payment Device, Sep. 22, 2014, 31 pages.
U.S. Appl. No. 62/054,346 , Mirrored Token Vault, Sep. 23, 2014, 38 pages.
U.S. Appl. No. 62/103,522 , Methods and Systems for Wallet Provider Provisioning, Jan. 14, 2015, 39 pages.
U.S. Appl. No. 62/108,403 , Wearables With NFC HCE, Jan. 27, 2015, 32 pages.
U.S. Appl. No. 62/117,291 , Token and Cryptogram Using Transaction Specific Information, Feb. 17, 2015, 25 pages.
U.S. Appl. No. 62/128,709 , Tokenizing Transaction Amounts, Mar. 5, 2015, 30 pages.
AU2014292980 , "First Examination Report", Feb. 16, 2018, 7 pages.
AU2014292980 , "Second Examination Report", Jul. 2, 2018, 6 pages.
Application No. AU2014292980 , Substantive Examination Report, Mailed On Jan. 17, 2019, 5 pages.
AU2014292980 , "Third Examination Report", Nov. 30, 2018, 4 pages.
AU2014293042 , "First Examination Report", Nov. 8, 2017, 3 pages.
AU2014293042 , "Fourth Examination Report", Oct. 18, 2018, 3 pages.
AU2014293042 , "Second Examination Report", Apr. 5, 2018, 3 pages.
AU2014293042 , "Third Examination Report", Jul. 13, 2018, 4 pages.
AU2014331673 , "First Examination Report", Jan. 16, 2018, 4 pages.
AU2014331673 , "Notice of Acceptance", May 2, 2018, 3 pages.
AU2018213991 , "First Examination Report", Mar. 19, 2019, 2 pages.
AU2018213991 , "Notice of Acceptance", May 8, 2019, 3 pages.
AU2018260860 , "First Examination Report", Nov. 22, 2019, 3 pages.
AU2019201056 , "First Examination Report", Feb. 10, 2020, 5 pages.
AU2019201056 , "Fourth Examination Report", Feb. 5, 2021, 7 pages.
AU2019201056 , "Second Examination Report", Jun. 3, 2020, 5 pages.
AU2019201056 , "Third Examination Report", Nov. 4, 2020, 4 pages.
Application No. BR112016001306-9 , Office Action, Mailed On Mar. 10, 2020, 6 pages.
Application No. BR112016001502-9 , Office Action, Mailed On Mar. 10, 2020, 7 pages.
Application No. BR1120160080050 , Office Action, Mailed On Jun. 16, 2020, 4 pages.
Burr et al., "Electronic Authentication Guideline", NIST Special Publication 800-63, Version 1.0, Jun. 2004, 62 pages.
CA2,918,788 , "Notice Of Allowance", Oct. 15, 2019, 1 page.
Application No. CA2,918,788 , Office Action, Mailed On Oct. 4, 2017, 4 pages.
Application No. CA2,918,788 , Office Action, Mailed On Oct. 12, 2018, 5 pages.
CA2,919,199 , "Notice of Allownace", Oct. 16, 2019, 1 page.
Application No. CA2,919,199 , Office Action, Mailed On Oct. 4, 2017, 4 pages.
Application No. CA2,919,199 , Office Action, Mailed On Oct. 9, 2018, 4 pages.
Application No. CA2,927,052 , Notice of Allowance, Mailed On May 18, 2021, 1 page.
Application No. CA2,927,052 , Office Action, Mailed On Apr. 8, 2020, 4 pages.
Application No. CA2,927,052 , Office Action, Mailed On Feb. 4, 2019, 5 pages.
Application No. CN201480052318.2 , Office Action, Mailed On Dec. 4, 2019, 23 pages.
Application No. CN201480052318.2 , Office Action, Mailed On Jan. 28, 2019, 24 pages.
Application No. CN201480052318.2 , Office Action, Mailed On Aug. 20, 2019, 30 pages.
Application No. CN201480052347.9 , Notice of Decision to Grant, Mailed On May 7, 2021, 4 pages.
Application No. CN201480052347.9 , Office Action, Mailed On Jul. 9, 2020, 16 pages.
Application No. CN201480052347.9 , Office Action, Mailed On Jan. 23, 2019, 17 pages.
Application No. CN201480052347.9 , Office Action, Mailed On Dec. 26, 2019, 18 pages.
Application No. CN201480052347.9 , Office Action, Mailed On Aug. 14, 2019, 20 pages.
Application No. CN201480052347.9 , Office Action, Mailed On Jan. 14, 2021, 9 pages.
Application No. CN201480068053.5 , Notice of Decision to Grant, Mailed On Nov. 8, 2019, 4 pages.
Application No. CN201480068053.5 , Office Action, Mailed On Jan. 3, 2019, 16 pages.
Application No. CN201480068053.5 , Office Action, Mailed On Aug. 1, 2019, 6 pages.
Application No. EP14829301.2 , Extended European Search Report, Mailed On Feb. 28, 2017, 8 pages.
Application No. EP14829301.2 , Office Action, Mailed On Jan. 22, 2018, 8 pages.
EP14829301.2 , "Summons to Attend Oral Proceedings", Jul. 10, 2018, 13 pages.
Application No. EP14829561.1 , Extended European Search Report, Mailed On Feb. 28, 2017, 8 pages.
Application No. EP14829561.1 , Office Action, Mailed On Jan. 22, 2018, 6 pages.
EP14829561.1 , "Summons to Attend Oral Proceedings", Jul. 5, 2018, 10 pages.
Application No. EP14853006.6 , Extended European Search Report, Mailed On Jun. 9, 2017, 7 pages.
Application No. EP14853006.6 , Office Action, Mailed On Jul. 26, 2018, 7 pages.
EP14853006.6 , "Summons to Attend Oral Proceedings", May 14, 2020, 11 pages.
Application No. EP21174537.7 , Extended European Search Report, Mailed On Nov. 4, 2021, 16 pages.
IN201647016067 , "First Examination Report", Aug. 25, 2020, 6 pages.
Application No. JP2016-530052 , Notice of Decision to Grant, Mailed On Jun. 23, 2020, 3 pages.
Application No. JP2016-530052 , Office Action, Mailed On Jul. 3, 2018, 10 pages.

(56) References Cited

OTHER PUBLICATIONS

Application No. JP2016-530052 , Office Action, Mailed On Jul. 31, 2018, 10 pages.
Application No. JP2016-530052 , Office Action, Mailed On Dec. 20, 2019, 5 pages.
Application No. JP2016-530052 , Office Action, Mailed On Apr. 2, 2019, 7 pages.
Application No. JP2016-530054 , Notice of Decision to Grant, Mailed On Apr. 2, 2019, 3 pages.
Application No. JP2016-530054 , Office Action, Mailed On Feb. 5, 2019, 9 pages.
Application No. JP2016-530054 , Office Action, Mailed On Mar. 23, 2018, 9 pages.
Application No. JP2016-548003 , Notice of Decision to Grant, Mailed On Jul. 10, 2018, 3 pages.
Application No. JP2016-548003 , Office Action, Mailed On Jan. 4, 2018, 6 pages.
Application No. JP2018-150829 , Notice of Decision to Grant, Mailed On Nov. 27, 2019, 3 pages.
Application No. JP2019-044443 , Notice of Decision to Grant, Mailed On Jan. 26, 2021, 2 pages.
Application No. JP2019-044443 , Office Action, Mailed On May 26, 2020, 11 pages.
Application No. KR2016-7004754 , Notice of Decision to Grant, Mailed On Oct. 31, 2019, 3 pages.
Application No. KR2016-7004754 , Office Action, Mailed On Apr. 1, 2019, 10 pages.
Application No. KR2016-7004754 , Office Action, Mailed On Jul. 20, 2018, 10 pages.
Application No. PCT/US2014/048038 , International Preliminary Report on Patentability, Mailed On Feb. 4, 2016, 9 pages.
Application No. PCT/US2014/048038 , International Search Report and Written Opinion, Mailed On Nov. 11, 2014, 12 pages.
Application No. PCT/US2014/048083 , International Preliminary Report on Patentability, Mailed On Feb. 4, 2016, 8 pages.
Application No. PCT/US2014/048083 , International Search Report and Written Opinion, Mailed On Nov. 7, 2014, 11 pages.
Application No. PCT/US2014/060523 , International Preliminary Report on Patentability, Mailed On Apr. 21, 2016, 7 pages.
Application No. PCT/US2014/060523 , International Search Report and Written Opinion, Mailed On Jan. 15, 2015, 8 pages.
Application No. PCT/US2015/031968 , International Search Report and Written Opinion, Mailed On Jul. 27, 2015, 7 pages.
Application No. RU2016105768 , Notice of Decision to Grant, Mailed On Aug. 2, 2018, 29 pages.
Application No. RU2016105768 , Office Action, Mailed On Mar. 21, 2018, 21 pages.
Application No. RU2016105772 , Notice of Decision to Grant, Mailed On Jan. 10, 2019, 15 pages.
Application No. RU2016105772 , Office Action, Mailed On May 16, 2018, 14 pages.
Application No. RU2016117997 , Notice of Decision to Grant, Mailed On Apr. 8, 2019, 17 pages.
Application No. RU2016117997 , Office Action, Mailed On Jul. 16, 2018, 8 pages.
Application No. SG11201602835W , Notice of Decision to Grant, Mailed On Jul. 17, 2018, 5 pages.
Application No. SG11201602835W , Written Opinion, Mailed On Apr. 11, 2017, 5 pages.
Application No. SG11201602835W , Written Opinion, Mailed On Jan. 4, 2018, 6 pages.
White , "How Computers Work", Illustrated by Timothy Edward Downs, Seventh Edition, Oct. 15, 2003, 23 pages.
U.S. Appl. No. 18/152,108 , Non-Final Office Action, Mailed On Nov. 12, 2024, 10 pages.
Application No. CN202211150392.0 , Office Action, Mailed On Jan. 24, 2025, 21 pages.

* cited by examiner

| Token Registry Database Token Record | |
|---|---|
| Token | 4900 0000 0000 0001 |
| Primary Account Number | 4147 0900 0000 1234 |
| Token Requestor Identifier | 11 2345 6789 |
| Token Presentment Mode | QR code |
| Token Type | Dynamic |
| Token Expiration Date | 7/16/2014, 14:35:00 |
| Merchant Restrictions | Merchant Category Code: 5111 |
| Token Assurance Level | Issuer Authenticated |
| Token Timestamp | 7/15/2014, 14:35:00 |
| Token Status | Active |
| Consumer Account Details | Jane Doe, 123 Street, A city - 99998 |

FIG. 4

| Token BIN Range | Issuer BIN | Network Token | PAN |
|---|---|---|---|
| 49000000-49000001 | 414709 | 4900 0000 0000 0001<br>4900 0000 7896 6543<br>4900 0000 0000 0004<br>4900 0001 9098 6401 | 4147 0900 0000 1234<br>4147 0900 0000 1234<br>4147 0900 3254 8976<br>4147 0900 1234 1234 |
| 49000002-49000004 | 478950 | 4900 0002 0000 0001<br>4900 0003 0000 0001<br>4900 0004 0000 0004<br>4900 0004 0560 0333 | 4789 5000 1234 1234<br>4789 5000 1234 1234<br>4789 5000 1234 1234<br>4789 5000 9468 0347 |
| 55000000-55000002 | 518314 | 5500 0000 0000 0001<br>5500 0001 0620 4621<br>5500 0002 0000 0001<br>5500 0002 8074 8643 | 5183 1400 0000 2222<br>5183 1400 0000 2222<br>5183 1400 9840 4444<br>5183 1400 5421 5032 |

FIG. 6

| Field Name | PAN based value | TOKEN based value |
|---|---|---|
| Account Identifier | PAN | Token value (16 digits) |
| | 4147 0900 0000 1234 | 4900 0000 0000 0001 |
| Expiry Date | 0515 | 0515 |
| Token Presentment Mode | Not applicable | QR Code |
| Token Requestor ID | Not applicable | 46780123 |
| Merchant Data | | |
| Card Acceptor ID | 12345 | 12345 |
| Merchant Descriptor | Merchant Name | Merchant Name |
| MCC Code | 5072 | 5072 |
| Merchant City | New York | New York |
| Merchant State code | NY | NY |
| Merchant Postal code | 12345 | 12345 |
| Dynamic Card Verification (dCVV) | Not applicable | 123 |
| Application Cryptogram | Card Generated for CHIP transaction | Device generated for CHIP transaction |
| Issuer Discretionary Data | Available in Track 2 | Token Issuer / Card Issuer |
| Assurance Level Code | Not applicable | 1 - Issuer authenticated |

FIG. 7

SYSTEMS AND METHODS FOR COMMUNICATING RISK USING TOKEN ASSURANCE DATA

CROSS-REFERENCES TO RELATED APPLICATIONS

This application is a continuation of U.S. application Ser. No. 17/020,472, filed Sep. 14, 2020, which is continuation of U.S. application Ser. No. 15/974,599, filed May 8, 2018, now U.S. Pat. No. 11,093,936, issued Aug. 17, 2021, which is a continuation of Ser. No. 14/340,464, filed Jul. 24, 2014, now U.S. Pat. No. 9,996,835, issued Jun. 12, 2018, which is a non-provisional application of and claims the benefit of priority to U.S. Provisional Application No. 61/858,087, filed on Jul. 24, 2013, U.S. Provisional Application No. 61/863,863, filed on Aug. 8, 2013, and U.S. Provisional Application No. 61/935,036, filed on Feb. 3, 2014, which are herein incorporated by reference in their entirety for all purposes.

This application is related to U.S. non-provisional patent application Ser. No. 14/340,344, entitled "Systems and Methods for Communicating Risk Using Token Assurance Data" and U.S. non-provisional patent application Ser. No. 14/340,444, entitled "Systems and Methods for Interoperable Network Token Processing", all of which are filed on the same day as the present application.

BACKGROUND

In a traditional electronic payment transaction, a consumer's PAN (primary account number) information is exposed to various entities involved during the transaction life-cycle. The PAN is passed from a merchant terminal, to an acquirer system, a payment processing network, payment gateways, etc.

Because the PAN can be exposed at various points in the transaction life-cycle, some have suggested that payment "tokens" be used to conduct payment transactions. A token serves as an additional security layer to the PAN and in effect becomes a proxy/surrogate to the PAN and may be used in place of PAN while submitting transactions. The use of payment tokens instead of PANs can reduce the risk of fraudulent activity since the real PAN is never exposed. It can also reduce or eliminate the need for merchants and other entities to be PCI DSS (Payment Card Industry Data Security Standard) compliant. PCI DSS is a standard that all organizations, including online retailers, must follow when storing, processing and transmitting their customer's credit card data. To be PCI complaint companies must use a firewall between any wireless network and their consumer data environment, use the latest security and authentication such as WPA/WPA2 and also change default settings for wired privacy keys, and use a network intrusion detection system.

Tokens can be of two types: payment tokens and non-payment tokens. Payment tokens can be used in lieu of PANs to generate and conduct original and subsequent payment transactions. Payment tokens can be sub categorized into static and dynamic tokens, both of which can be used to submit payment transactions once they are activated.

Static tokens can have longer life and can be used to submit multiple transactions. Dynamic tokens can be short lived tokens, and can be valid until the configured timeline. Once expired, they cannot be reused until reissued. In some cases, one dynamic token can be used to submit only one transaction.

Non-payment tokens can be used by merchant/acquirer systems for analytics, offers and any other purpose. Non-payment tokens cannot be used to submit a transaction. Non-payment tokens are often used by merchant and acquirer systems to keep track of transactions while avoiding the need to be PCI-DSS compliant.

While conventional efforts to use payment tokens have been useful, a number of additional problems need to be solved. For example, because the real PAN is not apparent from a corresponding token, it is difficult to identify the source of the token or the issuer of the token. On the one hand, the token is intended to hide information. On the other hand, it would be useful to identify from the payment token the origin or the issuer of the token. For example, it is difficult to route token based messages to the correct issuers since the routing information of a normal PAN is obfuscated.

Another problem to be solved is that various parties in the payment transaction processing system may need information about the token for various reasons. The various entities that need information about the token do not currently have a way to obtain such information. For example, because token are obfuscated PANs, it is not possible to run traditional fraud analyses on the tokens. Entities such as merchants may want to perform fraud analyses, but may not have a way to do so since they do not have the underlying account information to make the appropriate inquires to either their own databases of information or others' databases of information.

Embodiments of the invention address these and other problems, individually and collectively.

BRIEF SUMMARY

In embodiments of the invention, a network token system is provided. The network token system provides a platform that can be leveraged by various entities such as third party wallet providers, merchants, acquirers, payment processors, etc. that use tokens to facilitate payment transactions. In the network token system, a token registry vault can provide interfaces for various entities (e.g., mobile devices, issuers, merchants, mobile wallet providers, acquirers, etc.) to request payment tokens, request information about payment tokens or otherwise process payment tokens. The network token system further provides for services such as card registration, token generation, token issuance, token authentication and activation, token exchange, and token life-cycle management. In embodiments of the invention, a token can support interoperability and can be accepted, processed and routed by the entities within the payment system.

One embodiment of the invention is directed to a method comprising receiving, by a server computer, an authorization request message comprising a payment token, wherein the payment token comprises a payment token issuer identifier, wherein the payment token issuer identifier is a substitute for a real issuer identifier for an issuer and is static for the issuer. The method further comprises determining, by the server computer, a real account identifier associated with the payment token and generating a modified authorization request message comprising the real account identifier. The method further comprises transmitting, by the server computer, the modified authorization request message to the issuer for approval.

Another embodiment of the invention is directed to a server computer comprising a processor and a computer readable medium comprising code, executable by the processor, for implementing a method. The method comprises receiving an authorization request message comprising a payment token, wherein the payment token comprises a payment token issuer identifier, wherein the payment token issuer identifier is a substitute for a real issuer identifier for an issuer and is static for the issuer. The method further comprises determining a real account identifier associated with the payment token and generating a modified authorization request message comprising the real account identifier. The method further comprises transmitting the modified authorization request message to the issuer for approval.

Another embodiment of the invention is directed to a server computer for use in a payment processing system. The payment processing system comprises at least two entities operating at least two entity computers, where the at least two entities are capable of processing different parts of a single payment transaction. The server computer comprises a) a processor; b) a computer readable medium comprising code, executable by the processor for implementing a method. The method comprises receiving a first token request message from a first entity. After receiving the first token request message, the method comprises analyzing the first token request message, determining that the first token request message includes a request for a token; determining a first token, and transmitting the first token to the first entity. The method also comprises receiving a second token request message from a second entity, analyzing the second token request message, determining that the second token request message includes a token request associated with the first token, determining token attributes associated with the first token, and transmitting the determined token attributes to the second entity.

Yet another embodiment of the invention is directed to a method. The method comprises receiving, by a server computer, a first token request message from a first entity. After receiving the first token request message, the method comprises analyzing, by the server computer, the first token request message, determining, by the server computer, that the first token request message includes a request for a token, determining, by the server computer, a first token, and transmitting, by the server computer, the first token to the first entity. The method also comprises receiving, by the server computer, a second token request message from a second entity, analyzing, by the server computer, the second token request message, determining, by the server computer, that the second token request message includes a token request associated with the first token, determining, by the server computer, token attributes associated with the first token, and transmitting, by the server computer, the determined token attributes to the second entity.

These and other embodiments of the invention are described in further detail below.

BRIEF DESCRIPTION OF THE DRAWINGS

FIG. 4 shows exemplary entries in a token registry database according to an embodiment of the invention.

FIG. 6 shows a table illustrating examples of token BIN ranges mapped to issuer BINs according to one embodiment of the invention.

FIG. 7 shows a table illustrating exemplary fields for an authorization request message with PAN based values and token based values according to one embodiment of the invention.

DETAILED DESCRIPTION

Figure 1:
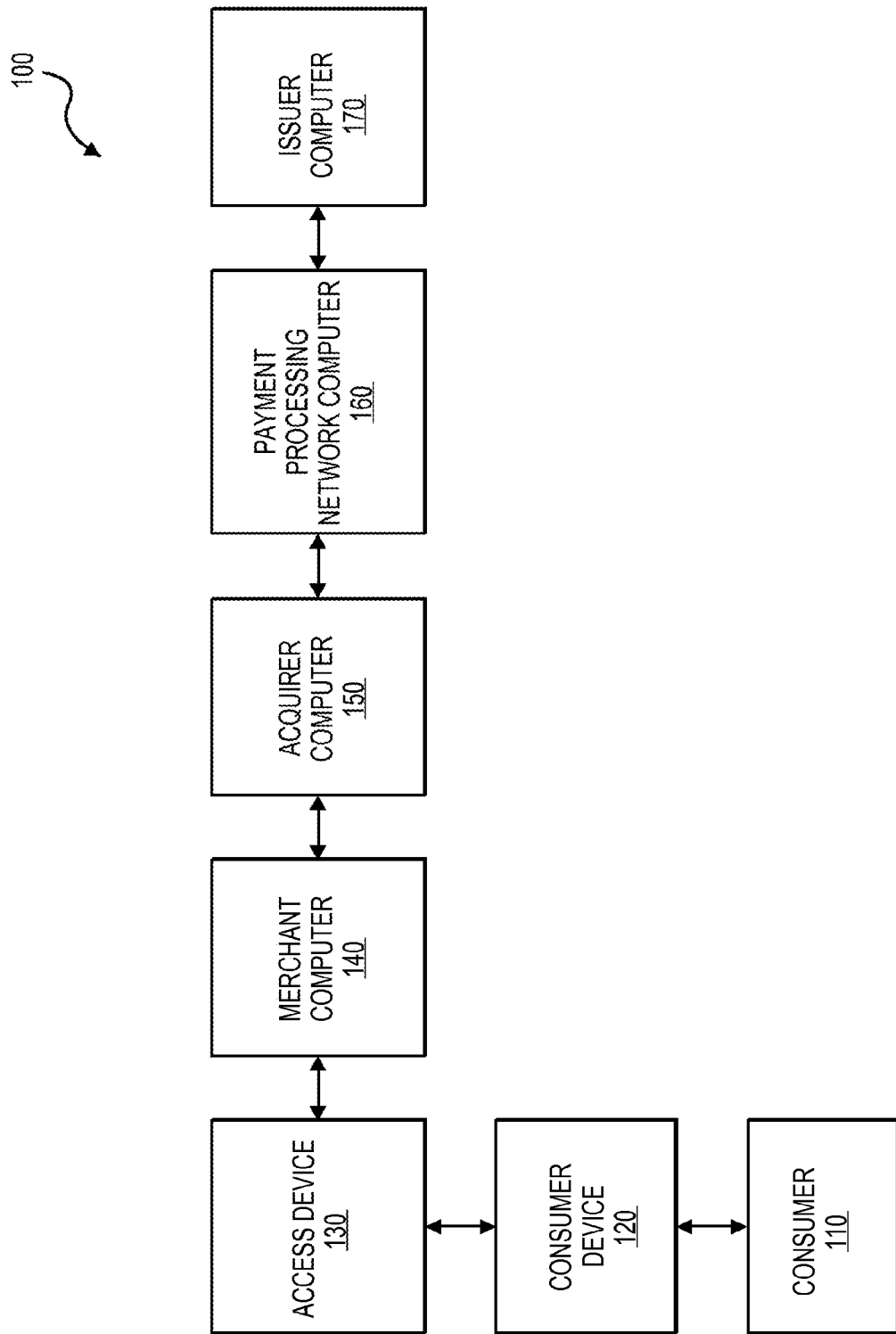
FIG. 1 shows a block diagram of a typical transaction processing system for electronic payment transactions using issuer accounts.

Embodiments are directed at systems, methods, and devices for providing a secure, easily scalable, and flexible network token processing system. As explained above, tokenization can involve the replacement or exchange of original payment credentials (e.g., a primary account number (PAN)) for substitute data (e.g., a non-financial identifier or a substitute PAN). A token can be used to initiate or manage transaction activity. Tokens can also improve transaction security and increase service transparency. Furthermore, tokenization can reduce merchant and issuer costs by improving data security and reducing or eliminating the need to be PCI-DSS compliant.

According to some embodiments, a token may be bound, mapped or somehow affiliated with underlying payment credentials. In addition, it is desirable for a token to be distinct and identifiable in the payment system and to be able to be passed or routed by the existing payment processing system participants. Further, a token may be compatible with the current and further payment technologies, may be interoperable with Bank Identification Number (BIN) enabled payment processing networks (e.g., Visa®, MasterCard®, Discover®, etc.), and may be able to support authentication by different entities (e.g., issuers, wallet providers, merchants, etc.) in the payment system.

In some embodiments, a payment processing network can process financial and non-financial tokens. For example, the payment processing network can issue, authenticate, exchange, and provide information for financial and non-financial tokens.

In some embodiments, the tokens that are used can be format preserving tokens. Format preserving tokens are tokens that are formatted like typical PANs. They typically contain 16, 18, or 19 digits. Format preserving tokens are desirable, since they can be used in existing payment systems. This results in minimal infrastructure changes and increases the chance that such tokens will be used by the participants in the payment system.

In some embodiments, a payment processing network and/or issuers can provision tokens to third parties before transactions are initiated (e.g., when a consumer is enrolling a payment account with an electronic wallet). The payment processing network (or a server computer therein) can authenticating tokens during and after transactions, thus ensuring that consumers are authorized to complete purchases using the tokens. The payment processing network can also link the payment tokens to the original payment credentials and accountholders associated with the payment tokens. In embodiments of the invention, when a token is passed to the payment processing network, the payment processing network can validate the token, exchange the token with the original 16-digit PAN, and provide a connection between authorization, risk, settlement and administration of the payment tokens.

Embodiments of the invention include a network token system that provides a platform that can be leveraged by external entities (e.g., third party wallets, e-commerce merchants, payment enablers/payment service providers, etc.) or internal payment processing network systems that have the need to use the tokens to facilitate payment transactions. A token registry (also referred to as a token vault or token database) can provide interfaces for various token requestors (e.g., mobile device, issuers, merchants, mobile wallet providers, etc.), merchants, acquirers, issuers, and payment processing network systems. The interfaces can be used to request, use, manage and request information about tokens. In some embodiments, the token registry vault can provide registration capability to any entity that wants to interface with the network token system. The network token system can further provide services such as card registration (e.g., PAN registration), token generation, token issuance, token authentication and activation, token exchange and token life-cycle management.

In embodiments of the invention, the token vaults can also store and manage token BIN/PAN ranges. The token vaults may be managed by an issuer, network or an authorized third party. In embodiments of the invention, a token can support interoperability and can be accepted, processed and routed by the entities (e.g., merchants, acquirer, issuers, processors, networks, etc.) within the payment system.

The network token system can also provide token processing capabilities such as authorization processing, authentication for transactions, capture processing, clearing processing, settlement and reconciliation processing, interchange criteria for payment transactions, liability and dispute processing for token payment transactions, reporting for token transaction processing and other value added services with token.

In some embodiments of the invention, a payment token can be a numerical value that can conform to the account number rules in an ISO message (e.g., ISO 8583). For example, in some embodiments, a token can be sixteen, eighteen or nineteen digits in length.

In some embodiments of the invention, tokens can include static token BIN ranges that are mapped to identify each issuing BIN/card range. Each token BIN can be a substitute for a real BIN, but is not the real BIN. The token BIN can be the same for all tokens issued by a particular entity. The pre-designated token BIN ranges can additionally or alternatively help identify a token as a credit or debit product that can be routed and processed as appropriate.

In some embodiments of the invention, tokens can be limited to specific presentment modes (e.g., QR™ Code, contactless, remote e-commerce, proximity e-commerce, etc.) for submitting a token as part of a transaction. Also, payment tokens may be used to originate payment transactions, while non-payment tokens may be used for ancillary processes such as disputes, loyalty, etc.

In embodiments of the invention, an entity (e.g., third party wallets, issuers, payment service providers, payment enablers, etc.) can register with the network token system to request a token requestor identifier. The network token system can store the token to PAN relationship and the token requestor relationship in a token vault. The registered entity can provide their respective token requestor identifier with a token request to the network token system to use its services. For example, the token requestor can request the issuance of a token via an API (Application Programming Interface) messaging or a batch request. The network token system can identify and validate the requesting entity based on the token requestor identifier before responding to the token request.

In some embodiments of the invention, a set of token attributes can be provided for each token. In some cases, the token attributes can govern how a token corresponding to a PAN may be subsequently used. For example, the token attributes may include a type of token, frequency of use, token expiration date and time, number of tokens, transaction life-cycle expiration period, etc.

In embodiments of the invention, token request messages may allow a token requestor to request a token to thereby tokenize a PAN. After the token is received by the token requester, the token may be provided to a merchant to conduct a payment transaction. The token may then be subsequently provided to an acquirer, payment processing network, and/or an issuer in an authorization request message and/or clearing messages. In some cases, the token may be replaced by a real PAN before an authorization or clearing message is received by an issuer.

In embodiments of the invention, token ranges may be defined and provided to different entities in the payment system (e.g., in routing files). In embodiments of the invention, token BIN/PAN ranges may reflect product attributes (e.g., debit cards, cards for affluent customers, etc.). In some embodiments, token BIN/PAN ranges may be introduced by a payment processing network level for token use, and those BIN/PAN ranges may be reallocated at an issuer level for token use.

Embodiments of the invention can also provide support for debit products (e.g., PIN and signature) and PIN debit routing solutions for other networks. For example, Hardware Security Module (HSM) functionality (e.g., PIN translation between token and PAN functionality) may be supported for PIN debit solutions. An HSM is a hardware device that can be used for securing encryption keys and performing encryption activities.

In embodiments of the invention, the network token system can provide life-cycle management services to the registered entities. For example, entities that have registered with the network token system may utilize the services of the network token system when a token is compromised or the consumer's payment device is lost. For example, a token and its association with its real PAN can be deactivated when the token is inactive, suspended or temporarily locked. A token can be deactivated by temporarily locking or suspending the token for a specific token requestor. A token can be cancelled to mark the token as deleted to prevent the token from being used in any future transactions. Embodiments of the invention can also allow for entities to update attributes of a token. For example, in embodiments of the invention, the validity timeframe of a token or the frequency of use of a token may be updated in embodiments of the invention. Further, an account identifier associated with a token may be updated at a token database without changing or re-provisioning the underlying token.

Some embodiments of the invention can provide an assurance level for a token in a transaction. The token assurance level may indicate a trust level of the token to PAN/consumer binding. In some embodiments, a token assurance level can be determined based on a type of identification and verification process performed and the entity that performed the identity and verification process.

For example, the network token system can determine a token assurance level based on the authentication of the consumer, payment account credentials and the token by executing one or more authentication methods. The authentication process can be performed by a payment network and can be network authenticated or can be performed by an issuer to be issuer authenticated. The token assurance level may be determined when issuing a token and may be updated if additional identity and verification processes are performed.

Embodiments of the invention provide improved protection against the misuse of payment accounts by providing usage controls for tokens. Usage controls may include limiting tokens to a specific domain (e.g., a specified merchant, an assigned presentment mode or channel, etc.). For example, during transaction processing in some embodiments, a number of a validation steps may be performed including (1) validating the presence of the token as being provisioned to a device and being associated with a token record in the token vault, (2) validating the status of the token as active, and (3) verifying domain restriction controls including token entry mode, application authentication cryptogram validation, and token requestor identifier with the transaction information. Additionally, at the time that a token is issued, steps may be taken to ensure that the provisioned token is replacing a PAN that was being used legitimately by the token requestor and/or a consumer associated with the token requestor. The token assurance level may also be used to drive transaction fraud liability requirements. Additionally, life-cycle management requests may be validated by (1) ensuring entities requesting life-cycle management are authorized to do so (e.g., validating a token requestor identifier matches the token requestor stored in the token record in the token vault and (2) verifying the status of the token is appropriate for the type off request (e.g., a suspend request may only be performed on a token in an active state).

Using embodiments of the invention, consumers and issuers may benefit from new and more secure ways to pay and improved approval levels. Since tokens can be limited to a specific domain, the risk of account number theft as a result of a large data breach is decreased as the potential for cross-channel fraud is diminished. Additionally, merchants and acquirers can obtain new benefits associated with the higher assurance levels that some tokens may offer.

Prior to discussing embodiments of the invention, description of some terms may be helpful in understanding embodiments of the invention.

A "token" may include any identifier for a payment account that is a substitute for an account identifier. For example, a token may include a series of alphanumeric characters that may be used as a substitute for an original account identifier. For example, a token "4900 0000 0000 0001" may be used in place of a primary account identifier or primary account number (PAN) "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. For example, a token may have a random association with a particular real PAN so that the real PAN is not computationally derivable from the token. A lookup table may be used to associate a real PAN and a corresponding random token. Further, in some embodiments, the token format may be configured to allow the entity receiving the token to identify it as a token and recognize the entity that issued the token.

In some embodiments, the token format may allow entities in the payment system to identify the issuer associated with the token. For example, the format of the token may include a token issuer identifier that allows an entity to identify an issuer. For instance, the token issuer identifier may be associated with an issuer's BIN of the underlying PAN in order to support the existing payment flow. The token issuer identifier may be a different number than the issuer's BIN and may be static. For example, if the issuer's BIN for an issuer is 412345, the token issuer identifier may be 528325 and this number may be static for all tokens issued from or for that issuer. In some embodiments, the token issuer identifier range (e.g., issuer BIN range) may have the same attributes as the associated issuer card range and can be included in an issuer identifier routing table (e.g., BIN routing table). The issuer identifier routing table may be provided to the relevant entities in the payment system (e.g., merchants and acquirers).

In some embodiments, a token issuer identifier range (e.g., token BIN range) may be a unique identifier (e.g., of 6 to 12 digits length) originating from a set of pre-allocated token issuer identifiers (e.g., 6 digit token BINs) associated with issuing tokens. For example, in some embodiments, one or more token BIN ranges can be allocated to each issuer BIN/card range that is associated with an issuer per card volumes for that range. In some embodiments, the token BIN range and allocation can have the same format and definition of the existing BIN routing table format used by relevant entities in the payment processing system. In some embodiments, the token BIN ranges may be used to generate a payment token and may not be used to generate a non-payment token. As such, the non-payment tokens may comprise different token issuer identifiers or may not comprise token issuer identifiers. In some embodiments, a token may pass the basic validation rules of an account number including, for example, a LUHN check or checksum validation that may be set up by different entities with the payment system.

In some embodiments, tokens may be device-specific such that each device associated with an account may be provisioned with a particular token. As such, if a transaction uses a token that is initiated by a different device than the device that the token was provisioned into, the transaction may be fraudulent. Accordingly, device information may be stored in the token vault and used to ensure that the device used in a transaction is associated with the token that is being used in the transaction. Additionally, because each token may be associated with a single device, one PAN or account may have multiple tokens associated with it, where each PAN may have a different token for the different devices that may be used to initiate a transaction associated with the PAN using a specific token. This provides additional security for transactions because network token systems have additional information to validate in order to control the use of sensitive information in a transaction processing system.

"Provisioning" may include a process of providing data for use. For example, provisioning may include providing, delivering, or enabling a token on a device. Provisioning may be completed by any entity within or external to the transaction system. For example, in some embodiments, tokens may be provisioned by an issuer or a payment processing network onto a mobile device. The provisioned tokens may have corresponding token data stored and maintained in a token vault or token registry. In some embodiments, a token vault or token registry may generate a token that may then be provisioned or delivered to a device. In some embodiments, an issuer may specify a token range from which token generation and provisioning can occur. Further, in some embodiments, an issuer may generate and notify a token vault of a token value and provide the token record information (e.g., token attributes) for storage in the token vault.

"Token attributes" may include any feature or information about a token. For example, token attributes may include any information that can determine how a token can be used, delivered, issued, or otherwise how data may be manipulated within a transaction system. For example, token attributes may determine how a token may be used in place of a real account identifier (e.g., PAN) for a transaction. For example, the token attributes may include a type of token, frequency of use, token expiration date and/or expiration time, a number of associated tokens, a transaction life-cycle expiration date, and any additional information that may be relevant to any entity within a transaction processing system. For example, token attributes may include a wallet identifier associated with the token, an additional account alias or other user account identifier (e.g., an email address, username, etc.), a device identifier, an invoice number, etc. In some embodiments, a token requestor may provide token attributes at the time of generation of tokens. In some embodiments, a network token system, payment processing network associated with the network token system, an issuer, or any other entity associated with the token may determine and/or provide the token attributes associated with a particular token.

A type of token may include any information or indicator of how a token may be used. For example, a type of token may be "payment" or "non-payment" to identify the token as being a payment token or a non-payment token. A payment token may include a high value token that can be used in place of a real account identifier (e.g., PAN) to generate original and/or subsequent transactions for a consumer account and/or card.

Another token type may be a "static" or "dynamic" token type for static and dynamic tokens, respectively. For example, a static token may include a token that may be issued by a payment processing network or issuer that may be issued in place of an account identifier (e.g., PAN) and may be used for the duration of the underlying account identifier (e.g., PAN). As such, static tokens may be used to submit any number of transactions and may not change for each transaction. Static tokens may be securely stored on the consumer device (e.g., stored in a secure memory or secure element of a mobile device) or in the cloud by the token requestor and may be delivered securely to a mobile device. However, static tokens may include sensitive information that may be protected as they may be used to perform multiple transactions over long periods of time.

Alternatively, dynamic tokens can include tokens that are limited or restricted in use (e.g., limited by time, amount threshold (aggregated amount or single-transaction amount), or by number of uses). As such, dynamic tokens can be generated and delivered on a per-transaction or on an as needed basis to the end user to initiate a payment transaction through a registered and authenticated device and/or channel. For example, a one-time use dynamic token can be used at electronic-commerce (e-commerce) websites and if the dynamic token is intercepted by a third party, the dynamic token may be useless because it has been used and is thus worthless for future transactions.

Non-payment tokens may include tokens which are not substitutes for real account identifiers (e.g., PANs). For example, non-payment tokens may be used by merchant/acquirer systems for analytics, offers, customer support, marketing, etc. However, non-payment tokens may not be used to generate original and subsequent transactions using real account identifiers (e.g., PANs) or other account identifiers. Accordingly, non-payment tokens may include low value tokens that may be used for non-payment transactions or transaction services by an entity within the transaction processing system.

A "frequency of use" of a token may indicate how many times a token can be used in a transaction. For example, a frequency of use may indicate how many times a token may successfully be used in a payment transaction. For example, a token may include a frequency of use of single-use or multiple-use. A single-use token may be used to generate one transaction. After the first-use of the single-use token, any subsequent use for initiating a transaction can be deemed invalid and a subsequent transaction may be denied. A multi-use token can be used to initiate multiple transactions.

A token expiration date and/or expiration time can determine a duration (e.g., days/hours/minutes) for which a token is valid. In some embodiments, a token expiration date may match the underlying account identifier's (e.g., PAN's) expiration date. In some embodiments, token expiration date may be defined as less than the associated real account identifier's (e.g., PAN's) expiration date. If a transaction is initiated after a token's expiration date, the token can be deemed as invalid and the transaction initiated with the corresponding token can be declined.

A life-cycle expiration date may include a time or date where the network token system may recycle or reuse a previously issued token. For example, the life-cycle expiration date may be maintained by the network token system for the entire life-cycle of a token once a token has been used for a transaction. This can allow various entities to submit subsequent transactions (or other service requests) with the token for a set period. Once this period is expired, the expired token can be recycled for re-use.

A number of tokens can include a number of dynamic tokens that can be requested for the same account identifier (e.g., PAN) and/or same device at one time. In some embodiments, the number of tokens can be optionally provided to the token requestor at the time of a token generation request. In some embodiments, tokens may be provided with overlapping time to live (TTL) so that one or more tokens may be active at any given time.

A "real account identifier" may include an original account identifier associated with a payment account. For example, a real account identifier may be a primary account number (PAN) issued by an issuer for a card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

A "payment token issuer identifier" may include any series of characters, numbers, or other identifiers that may be used to identify an issuer associated with a payment token. For example, a payment token issuer identifier may include a token BIN that identifies a particular issuer associated with an account identified using the token. In some embodiments, a payment token issuer identifier may be mapped to a real issuer identifier (e.g., a BIN) for an issuer. For example, a payment token issuer identifier may include a six digit numerical value that may be associated with an issuer. For instance, any token including the payment token issuer identifier may be associated with a particular issuer. As such, the issuer may be identified using the corresponding issuer identifier range associated with the token issuer identifier. For example, a payment token issuer identifier "490000" corresponding to a payment token "4900 0000 0000 0001" can be mapped to an issuer identifier "414709" corresponding to a payment account identifier "4147 0900 0000 1234." In some embodiments, a payment token issuer identifier is static for an issuer. For example, a payment token issuer identifier (e.g., "490000") may correspond to a first issuer and another payment token issuer identifier (e.g., "520000") may correspond to a second issuer, and the first and second payment token issuer identifiers may not be changed or altered without informing all entities within the network token processing system. In some embodiments, a payment token issuer identifier range may correspond to an issuer identifier. For example, payment tokens including payment token issuer identifiers from "490000"-"490002" may correspond to a first issuer (e.g., mapped to issuer identifier "414709") and payment tokens including payment token issuer identifiers from "520000"-"520002" may correspond to a second issuer (e.g., mapped to real issuer identifier "417548").

A "token presentment mode" may indicate a method through which a token is submitted for a transaction. Some non-limiting examples of the token presentment mode may include machine readable codes (e.g., QR™ code, bar code, etc.), mobile contactless modes (e.g., near-field communication (NFC) communication), e-commerce remote modes, e-commerce proximity modes, and any other suitable modes in which to submit a token.

Tokens may be provided through any number of different methods. For example, in one implementation, a token may be embedded in machine-readable code which may be generated by a wallet provider, mobile application, or other application on mobile device and displayed on a display of the mobile device. The machine readable code can be scanned at the POS through which the token is passed to the merchant. A mobile contactless mode may include passing the token through NFC in a contactless message. An e-commerce remote mode may include submitting a token by a consumer or a wallet provider through an online transaction or as an e-commerce transaction using a merchant application or other mobile application. An e-commerce proximity mode may include transmitting a token by a consumer from a wallet application on a mobile device to an access device at a merchant location.

The token presentment mode may include any identifier or method for indicating the mode through which a token is provided. For example, the token presentment mode may include a number associated with a particular type of transaction (e.g., 5 for NFC transaction, 3 for QR Code, etc.). Further, in some embodiments, the token presentment mode could be provided through a type of cryptogram or other dynamic data generated for a transaction. For example, each type of transaction presentment mode may have a different cryptogram algorithm associated with that type of presentment mode (e.g., NFC vs. QR Code), and the type of cryptogram used by be determined during validation of the cryptogram. Additionally, a token presentment mode may be provided by a mobile device or may be populated by a merchant access device (e.g., a POS terminal) or other entity within the transaction processing system (e.g., acquirer computer, merchant processor, etc.).

"Tokenization" is a process by which data is replaced with substitute data. For example, a payment account identifier (e.g., a primary account number (PAN)) may be tokenized by replacing the primary account identifier with a substitute number that may be associated with the payment account identifier. Further, tokenization may be applied to any other-information which may be replaced with a substitute value (i.e., token).

"Token exchange" or "de-tokenization" is a process of restoring the data that was substituted during tokenization. For example, a token exchange may include replacing a payment token with an associated primary account number (PAN) that was associated with the payment token during tokenization of the PAN. Further, de-tokenization or token exchange may be applied to any other information. In some embodiments, token exchange may be achieved via a transactional message, such as an ISO message, an application programming interface (API), or another type of web interface (e.g., web request).

"Authentication" is a process by which the credential of an endpoint (including but not limited to applications, people, devices, processes, and systems) can be verified to ensure that the endpoint is who they are declared to be.

An "original" transaction may include any transaction including an authorization provided by an issuer or an authorization provided on-behalf-of an issuer.

A "substitute" transaction may be any transaction that is associated with an original transaction and that takes place after the original transaction, including repeat, refunds, reversals or exceptions (chargebacks, re-presentments, etc.).

A "requestor" may be an application, a device, or a system that is configured to perform actions associated with tokens. For example, a requestor can request registration with a network token system, request token generation, token activation. token de-activation, token exchange, other token life-cycle management related processes, and/or any other token related processes. A requestor may interface with a network token system through any suitable communication networks and/or protocols (e.g., using HTTPS, simple object access protocol (SOAP) and/or an extensible markup language (XML) interface). Some non-limiting examples of a requestor may include third party wallet providers, issuers, acquirers, merchants, and/or payment processing networks. A requestor may be referred to as a token requestor when requesting generation of a new token or requesting a new use of an existing token from a network token system. In some embodiments, a token requestor can request tokens for multiple domains and/or channels. Token requestors may include, for example, card-on-file merchants, acquirers, acquirer processors, and payment gateways acting on behalf of merchants, payment enables (e.g., original equipment manufacturers, mobile network operators, etc.), digital wallet providers, and/or card issuers.

A "token requestor identifier" may include any characters, numerals, or other identifiers associated with an entity associated with a network token system. For example, a token requestor identifier may be associated with an entity that is registered with the network token system. In some embodiments, a unique token requestor identifier may be assigned for each domain for a token request associated with the same token requestor. For example, a token requestor identifier can identify a pairing of a token requestor (e.g., a mobile device, a mobile wallet provider, etc.) with a token domain (e.g., e-commerce, contactless, etc.). A token requestor identifier may include any format or type of information. For example, in one embodiment, the token requestor identifier may include a numerical value such as a ten digit or an eleven digit number (e.g., 4678012345).

In some embodiments, a token requestor identifier may uniquely identify the pairing of a token requestor with a token domain. As such, in some embodiments, if a token requestor may request tokens for multiple domains, the token requestor may have multiple token requestor identifiers, one for each domain.

For example, in some embodiments, a token requestor identifier may include an 11 digit numeric value assigned by the network token system and the token requestor identifier may be unique within the token registry for each entity (and each domain). For instance, the token requestor identifier may include a code for a token service provider (e.g., first 3 digits) such as the network token system and the remaining digits (e.g., last 8 digits) may be assigned by the token service provider for each requesting entity (e.g., mobile wallet provider) and for each token domain (e.g., contactless, e-commerce, etc.).

In some embodiments, a token requestor identifier may be used in a transaction during authorization processing. For example, a token requestor identifier may be passed through a transaction request message to validate that the entity that is initiating the transaction is the same as the entity that requested and manages the token. In some embodiments, an entity (e.g., digital or mobile wallet provider, merchant, merchant of record, payment enabler, etc.) can be assigned a token requestor identifier during an on-boarding or registration process. In some embodiments, an acquirer/acquirer processor/payment enabler (i.e., payment service provider) may populate the token requestor identifier for each merchant, mobile wallet provider, consumer, etc. into the authorization message field prior to submitting the authorization request message to a payment processing network.

An "end-user" may include any application, consumer, process, or system that is configured to interact with a requestor for tokenization/de-tokenization/token management services. For example, an end-user may include a consumer, a merchant, a mobile device, or any other suitable entity that may be associated with a requestor in the network token system.

A "consumer" may include an individual or a user that may be associated with one or more personal accounts and/or consumer devices. The consumer may also be referred to as a cardholder, accountholder, or user.

A "card-on-file (COF)" holder may include any entity that stores account details (e.g., card details, payment account identifiers, PANs, etc.) for use in transactions. For example, a COF entity may store payment information on file for various types of periodic payments such as monthly utility payments, periodic shopping transactions, or any other periodic or future transaction. Because payment credentials and/or associated tokens are stored at an entity for a future transaction, the transactions initiated by a COF entity include card-not-present (CNP) transactions. Another type of card-not-present (CNP) transaction includes e-commerce or electronic commerce transactions that are initiated between remote parties (e.g., a consumer device and a merchant web server computer).

An "authorization request message" may be an electronic message that is sent to a payment processing network and/or an issuer of a payment account to request authorization for a transaction. An authorization request message according to some embodiments may comply with ISO 8583, which is a standard for systems that exchange electronic transaction information associated with a payment made by a consumer using a payment device or a payment account. In some embodiments of the invention, an authorization request message may include a payment token, an expiration date, a token presentment mode, a token requestor identifier, an application cryptogram, and an assurance level data. The payment token may include a payment token issuer identifier that may be a substitute for a real issuer identifier for an issuer. For example, the real issuer identifier may be part of a BIN range associated with the issuer. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include an authorization code, which may be a code that a credit card issuing bank returns in response to an authorization request message in an electronic message (either directly or through the payment processing network) to the merchant's access device (e.g., POS terminal) that indicates approval of the transaction. The code may serve as proof of authorization. As noted above, in some embodiments, a payment processing network may generate or forward the authorization response message to the merchant.

An "interface" may include any software module configured to process communications. For example, an interface may be configured to receive, process, and respond to a particular entity in a particular communication format. Further, a computer, device, and/or system may include any number of interfaces depending on the functionality and capabilities of the computer, device, and/or system. In some embodiments, an interface may include an application programming interface (API) or other communication format or protocol that may be provided to third parties or to a particular entity to allow for communication with a device. Additionally, an interface may be designed based on functionality, a designated entity configured to communicate with, or any other variable. For example, an interface may be configured to allow for a system to field a particular request or may be configured to allow a particular entity to communicate with the system.

A "server computer" may typically be a powerful computer or cluster of computers. For example, the server computer can be a large mainframe, a minicomputer cluster, or a group of servers functioning as a unit. The server computer may be associated with an entity such as a payment processing network, a wallet provider, a merchant, an authentication cloud, an acquirer or an issuer.

I. Exemplary Network Token Processing Systems

FIG. 1 shows a block diagram of a typical transaction processing system 100 configured to use real issuer identifiers (e.g., bank identification numbers (BINs)) to route authorization request messages during transaction processing. For example, payment credentials issued for consumers may include real issuer identifiers (e.g., BINs) that may be used to identify the issuer (and payment processing network) associated with the account being used to initiate the transaction.

The system 100 may include a consumer 110, a consumer device 120, an access device 130, a merchant computer 140, an acquirer computer 150, a payment processing network computer 160 and an issuer computer 170. In some implementations, different entities in FIG. 1 may communicate with each other using one or more communication networks such as the Internet, a cellular network, a TCP/IP network or any other suitable communication network. Note that one or more entities in the system 100 may be associated with a computer apparatus that may be implemented using some of the components as described with reference to FIG. 11.

The consumer 110 may be a person or an individual. The consumer 110 may utilize the consumer device 120 to initiate a transaction with a merchant by interacting with the access device 130 (e.g., point-of-sale (POS) device).

The consumer device 120 may be associated with a payment account of the consumer 110. In some implementations, the consumer device 120 may be a mobile device such as a mobile phone, a tablet, a PDA, a notebook, a key fob or any suitable mobile device. For example, the consumer device 120 may include a wallet or a payment application that may be associated with one or more payment accounts of the consumer 110. In some implementations, the consumer device 120 may be configured to display a machine readable code (e.g., QR™ code, bar code, etc.). The consumer device 120 may also include a camera or a scanning device capable of scanning a machine readable code. In some implementations, the consumer device 120 may be capable of communicating with the access device 130 using a short range communication technology such as NFC. For example, the consumer 110 may interact with the access device 130 by tapping or waving the consumer device 120 in proximity of the access device 130. In some implementations, the consumer device 120 may be a payment card such as a credit card, debit card, prepaid card, loyalty card, gift card, etc.

The access device 130 may be an access point to a transaction processing system that may comprise the acquirer computer 150, the payment processing network computer 160, and the issuer computer 170. In some implementations, the access device 130 may be associated with or operated by the merchant computer 140. For example, the access device 130 may be a point of sale device that may include a contactless reader, an electronic cash register, a display device, etc. In some implementations, the access device 130 may be configured to display transaction information in a format that may be read by the consumer device 120 (e.g., mobile phone) including a QR™ code, bar code, or any other information transfer mechanism. In some implementations, the access device 130 may be a personal computer that may be used by the consumer 110 to initiate a transaction with the merchant computer 140 (e.g., an online transaction).

The merchant computer 140 may be associated with a merchant. In some embodiments, the merchant computer 140 may be associated with a card-on-file (COF) merchant. For example, the card-on-file merchant may store consumer account information on file (e.g., at a merchant database) for future payment purposes such as various types of periodic payments (e.g., monthly utilities payments). In some implementations, a consumer may register with one or more merchants for card-on-file services. The merchant computer 140 may be configured to generate an authorization request for a transaction initiated by the consumer 110 using the access device 130.

The acquirer computer 150 may represent a traditional acquirer/acquirer processor. The acquirer is typically a system for an entity (e.g., a bank) that has a business relationship with a particular merchant, a wallet provider or another entity. The acquirer computer 150 may be communicatively coupled to the merchant computer 140 and the payment processing network 160 and may issue and manage a financial account for the merchant. The acquirer computer 150 may be configured to route the authorization request for a transaction to the issuer computer 170 via the payment processing network computer 160 and route an authorization response received via the payment processing network computer 160 to the merchant computer 140.

The payment processing network computer 160 may be configured to provide authorization services, and clearing and settlement services for payment transactions. The payment processing network computer 160 may include data processing subsystems, wired or wireless networks, including the internet. An example of the payment processing network computer 160 includes VisaNet™, operated by Visa®. Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. The payment processing network computer 160 may include a server computer. In some implementations, the payment processing network computer 160 may forward an authorization request received from the acquirer computer 150 to the issuer computer 170 via a communication channel. The payment processing network computer 160 may further forward an authorization response message received from the issuer computer 170 to the acquirer computer 150.

The issuer computer 170 may represent an account issuer and/or an issuer processor. Typically, the issuer computer 170 may be associated with a business entity (e.g., a bank) that may have issued an account and/or payment card (e.g., credit account, debit account, etc.) for payment transactions. In some implementations, the business entity (bank) associated with the issuer computer 170 may also function as an acquirer (e.g., the acquirer computer 150).

Figure 2:
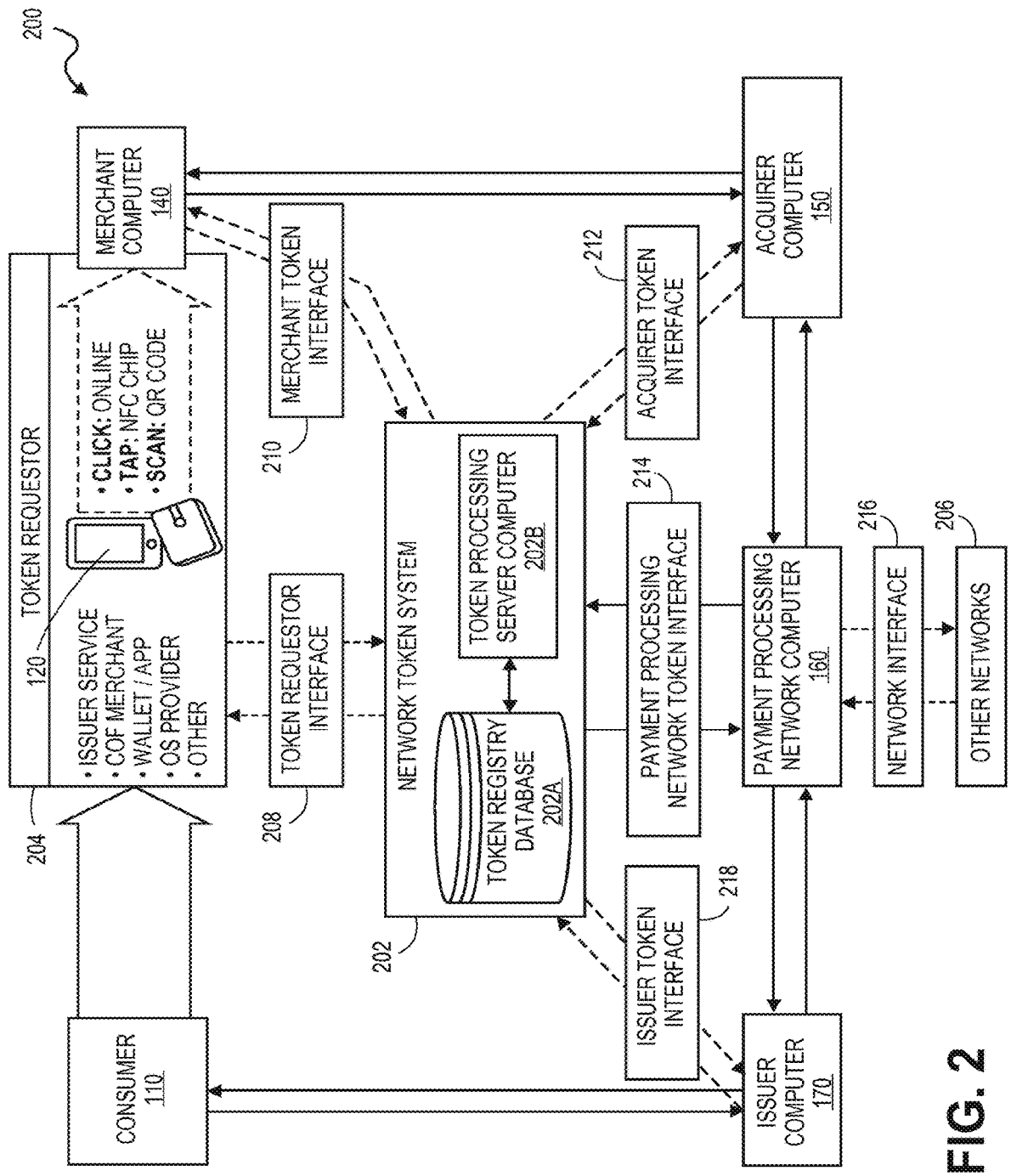
FIG. 2 shows a block diagram of a transaction processing system utilizing a network token system according to an embodiment of the invention.

FIG. 2 illustrates a transaction processing system 200 utilizing a network token system, according to one embodiment of the invention.

The system 200 may include a network token system 202 in addition to one or more components of the traditional payment system 100 as shown in FIG. 1. For example, the system 200 may include a consumer 110, a merchant computer 140, an acquirer computer 150, a payment processing network computer 160 and an issuer computer 170. The system 200 may also include token interfaces 208-218 with the network token system 202 including a token requestor interface 208, a merchant token interface 210, an acquirer token interface 212, a payment processing network token interface 214, a network interface 216, and an issuer token interface 218. In some embodiments of the invention, communication amongst different entities of the system 200 may be encrypted. In some embodiments of the invention, different entities in the system 200 may communicate with one another using one or more communication networks such as TCP/IP, cellular network, etc. In one embodiment, a web service environment for the network token system 202 can provide one or more of the communication interfaces with the network token system and may provide services associated with communication including entity authentication, request authorization, message security, etc.

The consumer 110 may be able to initiate a transaction using a payment account identifier that may be payment card branded such as Visa®, MasterCard®, American Express®, Discover®, etc. In addition, the consumer 110 may be capable to utilize the consumer device 120 to initiate a transaction using any suitable transaction channel such as through a scan of a mobile device (e.g., using a QR™ code or bar code), a tap of a mobile device to a merchant access device (e.g., near-field communication (NFC) transaction or other contactless/proximity transaction), a click on a computer or other mobile device in order to initiate an e-commerce transaction (e.g., online transaction), or through any other channel in which a transaction may be initiated and a token may be passed to a merchant computer. For example, in some embodiments, a mobile device may be used to initiate a remote transaction from a mobile device with a token provisioned onto a secure element or other secure memory of a mobile device.

A token requestor 204 may include an application, a process, a device, or a system that can request a token from the network token system 202. For example, the token requestor 204 can be a consumer, an issuer, an acquirer, a card-on-file merchant (also referred to as a merchant of record (MOR)), a mobile device (e.g., a wallet application or a payment application installed on the mobile device), a payment enabler, a payment service provider (PSP), a digital wallet provider (also referred to as a mobile wallet provider), an operating system (OS) provider, a telecommunications network provider, or any other entity that may be use a token or store a token for a third party. The token requestor 204 may interact with the network token system 202 using a token requestor interface 208 for the generation, use and management of tokens.

In one embodiment, each token requestor 204 may have to undergo an onboarding or registration process to ensure that the token requestor meets integration and security standards in order to use the tokenization services provided by the network token system 202. For example, the network token system 202 may provide services such as card registration, token generation, token issuance, token authentication and activation, token exchange, and token life-cycle management to the registered entities.

As part of the onboarding process, the token requestor 204 may register with the network token system 202 and may receive a token requestor identifier provided by the network token system 202. The token requestor 204 may specify configuration preferences or token attributes associated with tokens requested by the token requestor including, for example, token type (e.g., static or dynamic), supported token presentment modes (e.g., scan, contactless, e-commerce, etc.) and any other relevant token configuration information during the onboarding process. Further, the token requestor 204 may include limitations to certain channels (e.g., card-on-file, contactless, etc.) for use of requested tokens.

The token processing server computer 202B may generate a unique token requestor identifier for each registered token requestor. Thereafter, the registered token requestor 204 can provide the token requestor identifier as part of every network token service request to the network token system 202 as a form of identification.

The network token system 202 can provide registration for each entity that interacts with the network token system. Registration entries for such entities are show in FIG. 4 and are described in further detail below.

The token requestor 204 may be configured to request a new token or request life-cycle management actions for an existing token (e.g., change an existing token, deactivate a token, etc.). In some embodiments, a token requestor 204 may provide an account identifier (e.g., a PAN) and an expiration date with a request for a new token. The network token system 202 may use the token requestor identifier to identify and validate the token requestor 204 as well as validate a token based transaction when processing a transaction initiated using a token.

The network token system 202 may include a token registry database 202A and a token processing server computer 202B. The token registry database 202A may also be referred to as a "token vault." The token registry database 202A may store and maintain issued or generated tokens as well as any other relevant information to the tokens. For example, the token registry may include a token requestor identifier and an account identifier (e.g., PAN) for each token. The token registry database 202A and the token processing computer 202B may be configured to provide services associated with the token registry including, for example, payment account registration, token generation, token issuance, token authentication and activation, token exchange, token routing, token assurance level generation, token life-cycle management, and token processing to the entities that are registered with the network token system 202. In some embodiments, different entities can communicate with and obtain services provided by the network token system 202 using their respective interfaces with the network token system 202.

Tokens in the token registry database 202A may include different token states that may determine whether a token may be used in a transaction as well as the actions necessary to allow a token to be used in a transaction. For example, token states may include active, inactive, suspended, on hold, deactivated, or any other indication of the availability for a token to be used in a transaction. For instance, in some embodiments, a token may be generated by the token vault and may be immediately active and available for transacting. Further, issuers may notify the payment processing network computer 160 or the network token processing server computer of tokens that are "inactive" or not currently in use. In some embodiments, the token value associated with an inactive token may be treated in the same manner as "not found," by a token processing server computer. A token may be changed to "suspended" which includes a temporary state in which no authorizations or full financial original transactions can be performed with the token. A "deactivated" token status may include a token that may be permanently suspended and no authorizations or full financial original transactions may be performed. In some embodiments, tokens may reflect certain attributes relevant to the account identifier (e.g., PAN) being tokenized. For example, in some embodiments, the token may reflect funding source and the country associated with the underlying account identifier.

In some embodiments, the merchant computer 140 and the acquirer computer 150 may be provided with a token in lieu of a real account identifier (e.g., PAN) for various transaction use cases. For example, the merchant computer 140 and/or acquirer computer 150 may receive a token in the traditional PAN field of authorization request message and may forward the authorization request message to the payment processing network computer 160 for processing. The payment processing network computer 160 may replace the token with the real account identifier (e.g., PAN) and send a modified authorization request message to the issuer computer 170. In some embodiments, the authorization request message may further have the token moved to a new field in the authorization message and/or clearing message for the issuer computer 170 to receive so that the issuer may receive both the account identifier (e.g., PAN) and the token in such messages.

Accordingly, in some embodiments, the issuer computer 170 may be configured to receive both the real account identifier (e.g., PAN) and the token in the authorization request messages and in transaction clearing messages received from the payment processing network computer 160. Chargebacks and chargeback reversal messages may also contain both the token and the real account identifier (e.g., PAN). In some embodiments, the issuer computer 170 may choose to have the payment processing network computer 160 call out to have the issuer computer 170 provision the tokens. In some embodiments, the issuer computer 170 may provide the payment processing network computer 160 with its current token database via a bulk file interface.

In some embodiments, the token requestor interface 208 may be used by the token requestor 204 to interact with the network token system 202. For example, the token requestor 204 may send requests for multiple actions including token issuance, token life-cycle management (e.g., activation, deactivation, account credential update, etc.), and token authentication. In some embodiments, the token requestor interface 208 may include an application programming interface (API) or any other relevant messaging formats may be used. For example, the token requestor 204 may send a token issuance request that includes account information (e.g., a PAN and any other account details) and a token requestor identifier. Additionally, in some embodiments, the token requestor 204 may provide a bulk token request file that includes a plurality of account identifiers (e.g., PANs) and a token requestor identifier. The network token system 202 may generate and return a plurality of tokens, where each token is associated with an account identifier (e.g., PAN) from the bulk file request. In some embodiments, the token requestor 204 may optionally provide one or more token attributes with the request such as, for example, a frequency of use (e.g., single-use or multi-use), a type of token (e.g., payment or non-payment), a token expiration date and/or time, a number of requested tokens, a transaction life-cycle expiration date, etc. In some embodiments, the token request may further include one or more of an MSISDN (Mobile Subscriber Integrated Services Digital Network-Number), an account nickname (e.g., an alias), a UUID (Universally Unique Identifier) associated with the account or consumer, an IMEI (International Mobile Station Equipment Identity), an IMSI (International Mobile Subscriber Identity), a mobile application identifier, a purchase amount, etc. Additionally, in some embodiments, merchants can use the token requestor interface 208 to make a request for non-payment tokens (e.g., to use in analytics, loyalty, rewards, or any other business related processes).

Further, a token requestor 204 may request that the network token system 202 add a token to the account identifier (e.g., PAN) relationship to the token registry database 202A. The token requestor 204 may also request that the network token system 202 change the attributes for a token to account identifier (e.g., PAN) relationship in the token registry database 202A. For example, the token requestor 204 may request that the network token system 202 suspend a token due to the loss of a device by the consumer. The token requestor 204 may request that the network token system 202 deactivate a token in the token registry database 202A. In some embodiments, the corresponding record in the token registry database 202A may be marked deactivated (e.g., no longer valid for new purchases), but may remain available for exception processing for a limited period of time and may then be subsequently removed. In some embodiments, the network token system 202 may purge the tokens that have expired or that have been deactivated for a period of time on a periodic basis. Token requestors may also create batch files of token requests (e.g., add, delete or deactivate) and send them to the network token system 202 on a periodic basis.

In some embodiments, the token vault may comprise the following records and/or data as shown in Table 1 below.

TABLE 1

Exemplary Token Record Data in Token Registry

| Element | Description |
|---|---|
| Token | A token may be an identifier or a key. In embodiments of the invention, one or more tokens may be mapped to a PAN. A token may include a numerical value, e.g., a sixteen, eighteen, or a nineteen digit number. |
| PAN | A PAN may be a primary account number mapped to one or more tokens. A PAN may include a numerical value, e.g., a sixteen, eighteen, or nineteen digit number. |
| User BID | A user business identifier may be associated with an issuer associated with the PAN. The user BID may be used to facilitate maintenance and tracking. A user BID may include an six, seven, or eight digit numerical value. |
| Token Type | A token type of indicate the type of token, such as a token specifically used for e-commerce, card-on-file, NFC, etc. transactions. A token type may include an assigned number, e.g., 5 for card-on-file, 2 for NFC, etc. |
| Allowed MCCs | An MCC may be a merchant category code that can be used for token use. The allowed MCC fields may include any suitable number of values (e.g., up to 24 assigned numbers). |
| Merchant of Record (MOR) | A merchant of record identifier may identify the merchant. The MOR field may include any suitable number of values (e.g., an 8 digit number). |
| Token Service | A token service indicator may identify the entity that provides the token service. It may identify a payment processing network if the token service was provided by the payment processing network or the payment processing network on behalf of the issuer. The token service field may include an assigned number, e.g., 1 for on behalf of the issuer. |
| Token Class | A token class indicator may indicate that the token is assigned to a payment processing network token range or issuer assigned range. The token class field may include an assigned number, e.g., 1 for issuer. |
| Token Expiration Date | The token expiration date may refer to the expiration date of the token. The token expiration date can be equal to or less than the PAN expiration date. If expired, the token may be unusable. The token expiration date may be updated by a token requestor, an issuer, or via an internal process run by the network token system 202. The token expiration date field may include 4 digit unassigned numbers, e.g., 0517 for May 2017. |
| State of Token | The state of token indicator may indicate whether the token is active or deactivated. If it is deactivated, it may be valid only for exception transactions. It may be updated through token requestor change records. The state of token field may include an assigned number, e.g., 1 for active, 2 for de-activated, etc. |
| De-activation Date | The deactivation date indicator may indicate the deactivation date for the token. It may be updated through the token requestor change records. The deactivation date field may include any number of digits including a 4 digit unassigned number, e.g., 0314 for March 2014. |

TABLE 1-continued

Exemplary Token Record Data in Token Registry

| Element | Description |
|---|---|
| Token Requestor Identifier | A token requester identifier may identify a token requestor. The token requestor identifier may restrict the token use to the token requestor associated with this identifier. A token requester identifier in the token registry database 202A may be matched with a token requestor identifier in an authorization request message in a transaction. The token requestor identifier field may hold any suitable number of digits, including a 11 digit number, e.g., 45590790789. |
| Token Assurance Level | A token assurance level indicator may include a level of authentication assurance at the time of token issuance. It may be updated through the token requestor change records. The token assurance level field may include any suitable number of digits including a 2 digit assigned number, e.g., 25. |
| Purge Date | A purge date indicator may indicate a date on which the token is to be entirely removed from the token vault. The purge date field may include any suitable number of digits including a 4 digit unassigned number, e.g., 0814 for August 2014. |

In some embodiments of the invention, for NFC token requests, a token requestor identifier, a real account identifier (e.g., PAN), a token expiration date and a token assurance level may be stored in the token vault for each token entry/record.

For card-on-file e-commerce merchant requests, the token requestor interface 208 may be used by the token requestor 204 to interact with the network token system 202. For example, the token request may include whether the request is for a new token, change of an existing token, or deactivation of a token. The token requestor 204 may also provide a token requestor identifier, a PAN, an expiration date, a token type with the token request. In one embodiment, the AVS and CAW data presented for the identity and verification process may only be used for authentication and is not stored in the token vault.

The network token system 202 may generate a token that has the same format as a PAN to minimize disruption across the payment system and has a value that does not collide with any real PAN or an active token. In some embodiments, if a token has not been used in an authorization request by the intended expiration date/time, the token may be reissued by the network token system 202.

In some embodiments, the network token system 202 may provide token life-cycle management services to the registered entities. Life-cycle management can be useful when a token is compromised or a payment device is lost. For example, the network token system 202 may de-activate a token and its associations when the token becomes inactive, suspended or temporarily locked. The network token system 202 may deactivate a token by temporarily locking or suspending the token for a specific token requestor. The network token system 202 may also cancel a token to permanently mark a token as deleted to prevent any future transactions. A deleted token can be used during returns/chargebacks if the same token was used to submit the corresponding original transaction for a specific token requestor. The network token system 202 may also update token attributes such as token validity timeframes (e.g., extend or reduce the timeframe) or frequencies of permitted token use. The token validity timeframe can refer to a specific number of days, hours, minutes, or a specific expiration date.

In some embodiments, the network token system 202 may allow the registered entities to allow the consumers to update information about the PAN, e.g., assign a different PAN to a static token. For example, the entity may provide a token requestor identifier, an old PAN and a new PAN to the network token system 202 using its interface. The network token system 202 may generate a new static token and associate it to the new PAN. The old token association could then be deactivated.

In some embodiments, the network token system 202 may support tokens generated by other entities such as issuers or wallet provider systems. For example, the token registry database 202A may be configured to store the PAN and token mapping and any other attributes for external tokens. The entities can provide the external tokens using their respective interfaces with the network token system 202.

In some embodiments, the network token system 202 may allow the registered entities to request CVV2 (Card Verification Value) values (or other types of verification values, cryptograms, etc.) for tokens using their respective interfaces. The network token system 202 may use the token to determine the real account identifier (e.g., a PAN) and can communicate with the payment processing network computer 160 (e.g., using an API) to request CVV2 values associated with the real account identifiers. These CVV2 values may be provided to the requesting entities.

In some embodiments of the invention, the network token system 202 may allow the registered entities to provide details of the transactions submitted using tokens using their respective interfaces. For example, a registered entity may provide a token requestor identifier, a transaction identifier, a transaction amount, a transaction date and time, a merchant identifier, a merchant address, an MSISDN, a UUID, an IMEI, etc. This data may be stored in the token registry database 202A. These details may be used for loyalty or other types of programs. For example, the transaction details can be used to identify relevant offers that might be of interest to the consumers conducting the transactions.

In some embodiments, the network token system 202 may allow the registered entities to request transactions made using tokens by providing the token requestor identifier, a token or token alias, and a date range (e.g., start and end date). The network token system 202 may provide a list of transactions conducted with the token or the alias within the identified date range.

In some embodiments, the network token system 202 may allow the registered entities to request authorization and settlement data for a given token/PAN combination and date range by providing a token requestor identifier, a PAN, a token and a date range.

In some embodiments, the network token system 202 may allow the registered entities to request all the tokens and their attributes assigned for a given PAN and a date range by providing a token requestor identifier, a PAN and a date range.

In some embodiments, the network token system 202 may allow the registered entities to request details for a specific token and PAN combination by providing a token requestor identifier, a PAN and a date range.

In some embodiments, the network token system 202 may provide an interface for e-commerce merchants to integrate into their web applications to initiate token generation requests for card-on-file transactions during checkout processes. For example, e-commerce merchants may provide a token requestor identifier, a PAN (card-on-file), a CVV2, an expiration date and optionally a consumer user identifier used for an e-commerce web application using the merchant token interface 210. The network token system 202 may provide in return a token and dCVV to the merchant computer 140. The token and the dCVV may be validated by the payment processing network computer 160 when it is received from the merchant computer in an authorization request message during a payment transaction.

In some embodiments, the network token system 202 may provide an interface for e-commerce merchants to provide an option for the consumers to request a token during checkout to use in place of a PAN. For example, the e-commerce merchants may provide a token requestor identifier, a PAN (card-on-file), a CVV2, an expiration date and optionally the consumer's first and last name, and billing address using the merchant token interface 210. The network token system 202 may authenticate the consumer/PAN before generating a token. The network token system 202 may provide a token and dCVV to the merchant computer. The token and the dCVV may be validated by the payment processing network computer 160 when it is received from the merchant computer in an authorization request message during a payment transaction.

In some embodiments, the network token system 202 may provide a user interface for the consumer 110. The user interface may allow the consumer to perform operations such user registration, payment account registration, token request generation, token deactivation, etc. In some embodiments, the network token system 202 may authenticate the consumer 110 and/or the PAN before generating and supplying a token to the consumer 110.

In some embodiments, the network token system 202 may provide a notification advice message to notify participating issuers or other entities that one of their consumers has requested a token (e.g., requested that their phone be provisioned with a token) using the network token system provisioning service. The advice message may include a message reason code (e.g., token create, token deactivate, token suspend or token resume), a token number, a token assurance level and a token requestor identifier.

In some embodiments, the merchant token interface 210 may allow the merchant computer 140 to communicate with the network token system 202 for tokenization and de-tokenization services such as token exchange, token processing and routing, etc. In some embodiments, the merchant token interface 210 may include an API. For example, the merchant computer 140 may use the merchant token interface 210 to request PAN information associated with a given token from the network token system 202 by providing a token requestor identifier, a token value and a date (e.g., transaction date or date range). In some embodiments, de-tokenization of a token may be requested during authorization and clearing process for a transaction. In some embodiments, the token exchange may be requested for bulk tokens.

In some embodiments, the acquirer token interface 212 (which may be in the form of an API) may allow the acquirer computer 150 to communicate with the network token system 202 for tokenization and de-tokenization services. Tokenization and de-tokenization services may include token exchange, token processing and routing, etc. For example, using the acquirer token interface 212, the acquirers may request that the network token system 202 provision a token on their behalf. A merchant, acquirer or a wallet provider may receive the token in response to a provisioning request message originating from an acquirer. The provisioning request message may support card-on-file provisioning and NFC provisioning. For example, the provisioning request message may include a PAN, a transaction amount, a transaction date and time, an expiration date, a merchant type, an acquirer's country code, a POS entry mode code (e.g., manual key entry, contactless device read, etc.), an acquirer's identifier code, an AVS result code, a CVV2 result code, a CAW result code, CAV data, and any other relevant data.

In other embodiments, the acquirer computer 150 may use the acquirer token interface 212 to request PAN information associated with a given token from the network token system 202. This can be accomplished by providing the token along with a token requestor identifier, a token value and a date (e.g., transaction date or date range) to the acquirer token interface 212. In some embodiments, de-tokenization of a token may be requested during authorization and clearing process for a transaction via the acquirer token interface 212. In some embodiments, a token exchange process for bulk tokens can be conducted through the acquirer token interface 212.

In some embodiments, the payment processing network token interface 214 may allow the payment processing network computer 160 to communicate with the network token system 202 for tokenization and de-tokenization services such as token exchange, token processing and routing, etc. For example, the payment processing network computer 160 may provide a token to the network token system 202 in exchange for a PAN or vice-versa.

In some embodiments, network interface 216 may allow a gateway or other networks 206 (e.g., MasterCard®, American Express®, Discover®, etc.) to communicate with the network token system 202 for tokenization and de-tokenization services via the payment processing network computer 160, e.g., token exchange, token routing, etc. For example, the other networks 206 may interact with the network token system 202 or the issuer computer 170 for the exchange of a token with a PAN for transactions initiated using debit card accounts.

In some embodiments, the issuer token interface 218 may allow the issuer computer 170 to communicate with the network token system 202 for tokenization and de-tokenization services, e.g., token registration, token authentication, etc. In some embodiments, the participating issuers may request that the network token system 202 tokenize PANs and manage existing tokens. For example, the issuer computer 170 may provide a request via the issuer token interface 218 that the network token system 2020 create a token, deactivate a token, suspend a token, or resume a token. Further, the issuer token interface may allow an issuer to perform a token inquiry, update an account identifier (e.g., PAN) expiration date, replace an account identifier (e.g., a PAN) associated with a token, or update card art or other information associated with a token (e.g., terms and conditions, etc.). Additionally, the token processing server computer 202B may provide notifications and other information through the issuer token interface 218. For example, the notifications may include token creation notifications, device provisioning notifications, authentication results, and deactivate, suspension, and resuming token notifications.

In some embodiments, an issuer may generate and provide tokens to the network token system. For example, an issuer may provide the token to the payment processing network computer 160 to store in the token vault on the issuer's behalf. For example, the issuer computer 170 may provide information such as an account identifier (e.g., PAN), a token, a token assurance level, a token requestor identifier, a token expiration date, a token type, and a state of the token to the token processing server computer 202B. The token processing server computer may validate that there is no conflict with the token (i.e., that a token already exists for that value) and may generate a token record/entry associated with the provided token information in the token registry database 202A.

Additionally, in some embodiments, the issuer computer 170 may request that the payment processing network 160 generate tokens using an issuer's own account range, and not the payment processing network's token range. If the issuer token range does not conflict with another token or account issuer identifier range that is already in use, the token processing server computer 202B may generate an association or linkage between the issuer's token account range and the issuer's real issuer identifier (e.g., BIN) range. In some embodiments, the issuer token interface 218 may allow the issuers to submit bulk registration file containing the tokens generated by the issuer. In some embodiments, if the issuer computer 170 fails to respond to a token request (for individual or bulk requests) in the instances of issuer token provisioning, then the token request to the token requestor 204 may be declined. For example, the token requestor 204 may receive a notification informing the token requester that an issuer timeout has occurred.

Figure 3:
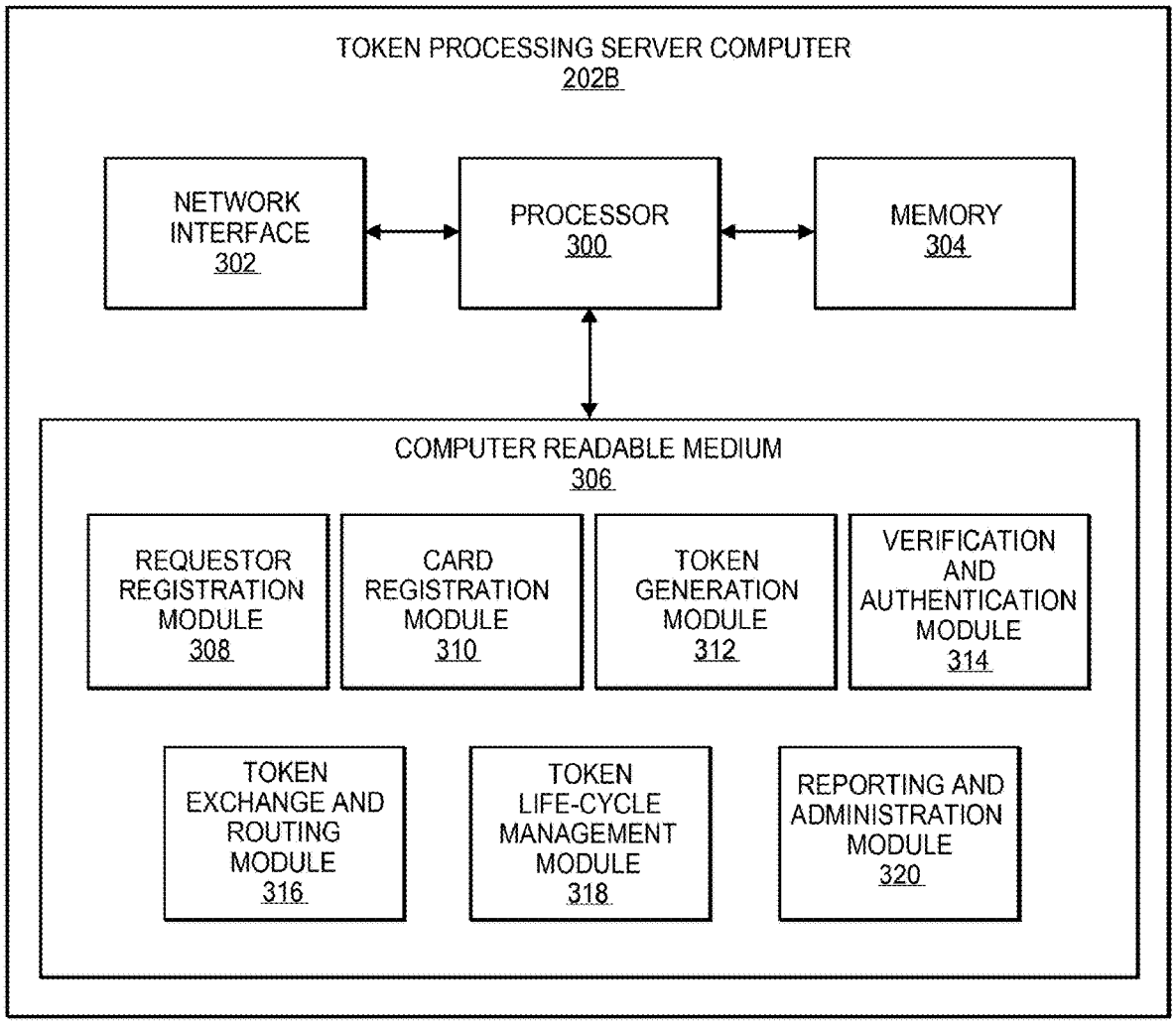
FIG. 3 shows a block diagram of a token processing server computer according to an embodiment of the invention.

FIG. 3 illustrates components of the token processing server computer 202B in one embodiment of the invention.

The token processing server computer 202B may include a processor 300 communicatively coupled to a network interface 302, a memory 304 and a computer readable medium 306.

The processor can comprise a CPU, which comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The CPU interacts with memory through signal passing through conductive conduits to execute stored signal program code according to conventional data processing techniques.

The network interface 302 may be configured to allow the network token system 202 to communicate with other entities such as the consumer device 120, merchant computer 140, acquirer computer 150, payment processing network computer 160, issuer computer 170, etc. using one or more communications networks. Network interfaces may accept, communicate, and/or connect to a communications network. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

The memory 304 may be used to store data. The memory 304 may be coupled to the processor 300 internally or externally (e.g., cloud based data storage) and may comprise any combination of volatile and/or non-volatile memory, for example, RAM, DRAM, ROM, flash, or any other suitable memory device.

The computer readable medium 306 may be in the form of a memory (e.g., flash, ROM, etc.) and may comprise code, executable by the processor 300 for implementing methods described herein. The computer readable medium 306 may include a requestor registration module 308, a card registration module 310, a token generation module 312, a verification and authentication module 314, a token exchange and routing module 316, a token life-cycle management module 318 and, a reporting and administration module 320. The computer readable medium 306 may also comprise code, executable by the processor 300 to implement a method comprising: receiving a first token request message from a first entity; analyzing the first token request message; determining the first token request message includes a request for a token; determining a first token; transmitting the first token to the first entity; receiving a second token request message from a second entity; analyzing the second token request message; determining the second token request message includes a token request associated with the first token; determining token attributes associated with the first token; and transmitting the determined token attributes to the second entity.

The requestor registration module 308 may comprise code which can cause the processor 300 to register each token requestor entity with the token registry database 202A and to generate a token requestor identifier for the registered entity. Some non-limiting examples of the token requestor entities may include issuers, wallet providers, payment enablers (e.g., merchant, wallet providers or OEMs having a card-on-file repository), merchants, e-commerce merchants, transit authorities, payment processing networks, acquirers, mobile devices (e.g., wallet application, payment application, etc.), or subcomponents and applications thereof. Each registered entity can use the token requestor identifier as part of each token service request with the network token system 202 which can help identify and validate the entity. In one embodiment, the registered application can provide token requestor information to the requestor registration module 308 such as an entity name, contact information, an entity type (e.g., merchant, wallet provider, payment service provider or PSP, issuer, payment enabler, acquirer, acquirer processor, etc.), token presentment modes (e.g., scan, contactless, e-commerce, etc.), token type (e.g., static/dynamic, payment/non-payment), integration and connectivity parameters, and services subscribed (e.g., token request, authentication and verification, life-cycle management, etc.) and any other relevant information for the onboarding process.

Referring back to FIG. 2, in some embodiments, each token requestor 204 can register with the token registry database 202A using the token requestor interface 208. For example, a graphical user interface may be used to provide token requestor information to the network token system 202. The user interface may be a conventional graphic user interface as provided by, with, and/or atop operating systems and/or operating environments such as Apple Macintosh OS, e.g., Aqua, GNUSTEP, Microsoft Windows (NT/XP), Unix X Windows (KDE, Gnome, and/or the like), mythTV, and/or the like. The user interface may allow for the display, execution, interaction, manipulation, and/or operation of program components and/or system facilities through textual and/or graphical facilities. The user interface provides a facility through which users may affect, interact, and/or operate a computer system.

The requestor registration module 308 may validate the information and upon successful validation may store the token requestor details in the token registry database 202A. The requestor registration module 308 may also generate a token requestor identifier after successful registration. In one embodiment, the token requestor identifier is a ten digit numerical value. However, other formats of the token requestor identifier are possible. In some embodiments, as part of the registration process, the token registry database 202A may store requestor entity information such as a business identifier, a token requestor identifier, a token requestor type (e.g., payment enabler, merchant of record, merchant, acquirer, issuer, etc.), and a platform type (e.g., a payment enabler mobile application, payment enabler online, merchant application, payment service provider application, issuer wallet application, etc.).

The card registration module 310 may comprise code that can be used by the processor 300 to perform card registration by different entities. In some embodiments, the network token system 202 may allow the registered entities to register their payment cards or accounts with the network token system 202 using their respective interfaces. For example, the registered entities may provide a token requestor identifier (e.g., received at the time of registration from the requestor registration module 308), a payment account number, a CVV2, an expiration date, consumer name and contact information, a token type, an OS type/version, and any other relevant information for individual card registration or bulk card registration. In one embodiment, the card registration module 310 may store the details of all of the consumers' account details in the token registry database 202A for all successful activation and registration requests. In one embodiment, the token registry database 202A may store a token requestor identifier, a MSISDN, a payment account number, a CVV2, an expiration date, a PAN nickname or alias, a consumer postal code, a UUID, a IMEA, an IMSI, a mobile application identifier, consumer first and last name, etc. In one embodiment, the registered entities may use their respective interfaces to unregister payment accounts by providing the necessary information to network token system 202.

The token generation module 312 may be configured to generate a token in response to a request for a token from a token requestor. In one embodiment, the token generation module 312 may receive a token requestor identifier, an account number (e.g., PAN), an expiration date and a CVV2. In some embodiments, the token generation module 312 may also receive optional information such as a consumer name, a consumer address and zip code, a requested token type (e.g., payment static, payment dynamic, non-payment, etc.), a card verification status (e.g., AVS/CVV check status), a MSISDN, a UUID, an IMEI, an OS type/version and any other suitable information. In one embodiment, the token generation module 312 may generate a token response with a token number, a token expiration date and a token assurance level. In one embodiment, the token generation module 312 may validate the token requestor identifier, determine the PAN type and generate a token from the respective token BIN ranges. The token registry database 202A may maintain the correlation between the card and the associated requestor and the token. In one embodiment, the token generation module 312 may determine if a token already exists in the token registry database 202A for the token request before generating a new token. In some embodiments, if a token cannot be provisioned, the token response may include a corresponding reason code. The token generation module 312 may also provide an interface to the token requestors to submit a bulk token request file.

In one embodiment, the tokens may be generated on-the-fly via API calls (e.g., using the token requestor interface 208). For example, when a request is received to tokenize a PAN, the token generation module 312 may determine a token range to assign the token. For example, the token range may be assigned based on whether the issuer is provisioning the token (e.g., issuer assigned token range) or the payment processing network is provisioning the token on-behalf-of the issuer (e.g., payment processing network assigned token range). As an example, if the payment processing network assigned token range includes "442400000-442400250," then "4424000000005382" may be assigned as a token value. The token vault may store the relationship of the token range to the PAN and a token add record may be logged. In some embodiments, the token generation module 312 may consider the token range list associated with the PAN range before assigning a token.

In one embodiment, the token generation module 312 may access a token range table that represents available token ranges provisioned by the payment processing network computer 160 and token ranges have not been associated with PAN ranges. The token generation module 312 may access another table that includes minimum and maximum account ranges for the PAN and the associated token ranges. The token ranges may include the token ranges provisioned by the payment processing network computer 160 and the token ranges provisioned by the issuer computer 170.

In some embodiments, the tokens may be algorithmically derived. For example, some such embodiments, an encryption process using encryption algorithms such as DES, triple DES, and AES may be used to encrypt a real PAN to create a token. In other embodiments, the tokens may not be algorithmically derivable. For instance, a token may be random with respect to the real PAN and the association of the token to the PAN may be provide by a lookup table.

In one embodiment, the merchant token interface 210 may allow the e-commerce merchants to initiate token generation requests for cards-on-file during checkout processes using those cards on file. For example, the token generation module 312 may receive a token requestor identifier, a card-on-file PAN, a CVV2, an expiration date, and optionally a consumer identifier for the e-commerce web application. The token generation module 312 may provide a token and dCVV which may be validated by the payment processing network computer 160 during the authorization process. For example, the token and dCVV may be provided to the merchant computer, which may then generate an authorization request messaging using the token and dCVV. The payment processing network may then receive the authorization request message and may validate the token and dCVV, or possibly replace the token and dCVV with the real account number and CVV2 value corresponding to the account number.

In one embodiment, the merchant token interface 210 may allow the e-commerce merchants to provide an option to the consumer 110 to request a token during checkout in place of the PAN. In such embodiments, the token generation module 312 may authenticate the consumer and/or PAN before generating a token. For example, the token generation module 312 may receive a token requestor identifier, a card-on-file PAN, a CVV2, an expiration date, and optionally a consumer name and billing address, and may provide a token and dCVV to the consumer, which may be validated by the token processing server computer 202B during transit. For example, the token and dCVV may be provided to the consumer's computer, which may be provided to the merchant computer, which may then generate an authorization request messaging using the token and dCVV. The payment processing network may then receive the authorization request message and may validate the token and dCVV, or possibly replace the token and dCVV with the real account number and CVV2 value corresponding to the account number.

The verification and authentication module 314 may be configured to execute a consumer verification and authentication process and determine a token assurance level based on the outcome of the verification and authentication process. For example, the verification and authentication module 314 can perform consumer authentication and verification through a configured authentication scheme. In one embodiment, the authentication scheme may include verification of the payment account number, CVV2 and the expiration date based on the customer information stored in a database associated with the payment processing network. In one embodiment, the authentication scheme may include direct verification of the consumer by the issuer computer 170 with consumer credentials for their online banking system.

In one embodiment, the authentication scheme may include verification of the consumer credentials through the issuer ACS (Access Control Server). For example, the issuer ACS service may be part of an authentication protocol such as 3-D secure protocol by Visa®. The ACS server may be associated with the issuer computer 170 that may include registered consumer account and access information. The ACS can give issuers the ability to authenticate consumers during an online purchase, thereby reducing the likelihood of fraudulent use of payment accounts. For example, the ACS can validate that the consumer is registered, performs consumer verification at the time of the transaction and provides digitally signed responses to the merchants.

In one embodiment, the authentication scheme may include verification of the payment account using a payment processing network consumer authentication service (e.g., Visa™ Consumer Authentication Service (VCAS)). For example, the VCAS service can authenticate the consumer on-behalf of the issuer prior to the authorization process.

In some embodiments, the authentication scheme may be based on the use of one-time password (OTP) or zero dollar authorization request message. For example, the OTP may be provided to the consumer 110 by the payment processing network computer 160 or the issuer computer 170. The consumer 110 can utilize the consumer device 120 to provide the OTP to the network token system 202 for authentication. In other embodiments of the invention, a zero dollar authorization request message may be sent by a merchant computer 140 to the issuer computer 170 via the acquire computer 150 and the payment processing network computer 160 to verify the identity of the consumer and/or the validity of a payment account. In one embodiment, a zero dollar transaction (i.e., an authorization request message with a zero dollar amount) may be used to verify the payment account number, any personal identifier (e.g., a PIN), address, and/or verification values (e.g., CVV, CVV2, or other variants, etc.).

In some embodiments, token assurance level may include assurance information such as an assurance indicator, an entity that performed the authentication or assurance process (e.g., requestor, network issuer, others), the date that the assurance processing was performed, a wallet/consumer device identification indicator, an assurance level score (based on authentication method used), and any other information relevant to assurance.

In some embodiments, requests to provision tokens may combine consumer authentication requests with the token request. For example, authentication may be performed prior to tokenization using any of the previously discussed authentication methods. In the authentication methods, where the issuer computer 170 performs the authentication, tokenization may be performed after receiving an authentication response from the issuer computer 170.

In some embodiments, account or card registration, token generation, and verification and authentication may be performed as part of a single token request process. In some embodiments, for bulk requests, card registration and token generation may be performed by processing a bulk file from the token requestor 204. In such embodiments, consumer verification and authentication may be performed in a separate step. In some embodiments, the token requestor 204 can request that the authentication and verification process be performed independently multiple times for a particular card or account to reflect any changes to the levels of assurance for the token over time.

The token exchange and routing module 316 may comprise code, executable by the processor, to cause the processor to allow registered applications to request payment account number information for a given token. For example, the payment processing network 160, acquirer computer 150, etc., may issue a request for a token exchange during a payment transaction. In one embodiment, a registered entity can provide at least one, two or more of a token requestor identifier, a token number, a token expiration date, a token presentment mode, a transaction identifier, a transaction timestamp, a request timestamp and any other relevant information to request the payment account number information. The token exchange and routing module 316 may validate that the requesting entity is entitled to make a request for a token exchange. In one embodiment, the token exchange and routing module 316 may validate the PAN/token mapping and presentment mode based on the request timestamp and the token expiration timestamp. The token exchange and routing module 316 may retrieve the payment account number information from the token registry database 202A and provide it along with the assurance level to the requestor entity. In one embodiment, if the PAN/token mapping is not valid for the requested timestamp and presentment mode, an error message may be provided.

The token life-cycle management module 318 may comprise code, executable by the processor 300 to perform life-cycle operations. Life-cycle operations may include canceling a token, activating or deactivating a token, updating token attributes, renewing token with a new PAN expiration date, etc. In one embodiment, a token requestor entity may provide a token requestor identifier, a token number, a life-cycle operation identifier and one or more token attributes to the network token system 202 to perform the requested life-cycle operation on the given token. The token life-cycle management module 318 may verify the token requestor identifier and the token association based on the token registry database 202A. The token life-cycle management module 318 may perform the requested life-cycle operation on the given token number and update all the corresponding association in the token registry database 202A.

The token requestor 204 request a life-cycle operation using an interface. The life-cycle operation may be associated with a lost or stolen consumer device, a compromised payment account number or the token, a change in the payment account number, unsubscribing a card-on-file, etc. In another example of a life-cycle operation, a token activation operation may be requested to activate an inactive, suspended or temporarily locked token and its associations. A token de-activation operation may be requested to temporarily lock or suspend a token. A cancel token operation may be requested to permanently mark a token and its associations as deleted to prevent any future transactions. In some embodiments, a deleted token may be used during returns/chargebacks if the same token was used to submit the corresponding original transactions. A token update operation may be requested to update token attributes such as expiration date (e.g., extend or reduce the validity timeframe), timestamp, frequency of usage (based on token details provided), etc. Validity timeframe can be number of days/hours/minutes or specific expiration date.

Additional life-cycle management requests that may be processed by the network token system are provided in Table 2 below. Any of the following life-cycle management token requests may be initiated by a token requestor, a consumer, a payment processing network, the network token system, an issuer, and/or any combination thereof (e.g., an issuer may initiate the request based on a consumer request).

TABLE 2

Exemplary Life-cycle Management Requests

| | |
|---|---|
| Activate Token | Request to activate a payment token after a successful authentication method of a consumer is completed. |
| De-activate Token | Request to deactivate a specific token. The token processing computer may terminate a token & PAN mapping in Token Vault and trigger notifications to Issuer that token is no longer valid. |
| Suspend Token | Request to suspend a token. A suspend action is temporary and can be resumed. No transactions will be processed/approved while in suspend mode. |
| Resume Token | Request to resume a suspended token. A resume action may restore token to active status and may allow transactions to be processed and approved. |
| Token Inquiry | Request to obtain Token to real account identifier (e.g., PAN) mapping/record data for a given PAN or for a specific Token. A response to the token inquiry may include all token record information that a requesting entity may be authorized to obtain (e.g., authorized token information) including a corresponding token for a PAN (and vice versa). |
| Update PAN Expiry | Request to update/extend the expiry date of the PAN. The token processing computer may update the expiry date in the token vault to extend the use of the token/PAN combination. |
| Replace PAN | Request to replace the original PAN to the Token PAN mapping. |
| Update PAN Card Art | Request to update the card art images based on product BIN range. Payment processor may present new card art images to token requestor to refresh display on device. |
| Update PAN T&C | Request to update / revised terms and condition to consumer by product BIN range. |

In some embodiments, the network token system 202 may allow consumers to request update the association between a PAN and a static token. For example, the consumer 110 may request that his PAN be updated. This update can occur through the token requestor interface 208 or the issuer computer 170 may request that the PAN be updated via the issuer token interface 218. The registered entity may provide a token requestor identifier, the old PAN and optionally the new PAN to the token life-cycle management module 318, which can associate the new PAN to the static token or can generate a new static token for the new PAN.

The reporting and administration module 316 may allow the token requestors to request transaction details made using tokens by providing a token requestor identifier, a token or PAN alias and a transaction date range (e.g., a start and end date). In one embodiment, the network token system 202 may retrieve all the token transactions from the payment processing network 160 and maintain in a date store to provide the transaction details to the requesting registered entity to handle returns, chargebacks and disputes and to support analytics. The reporting and administration module 316 may provide the transaction details made using the given tokens (or tokens associated to the given PAN alias) between the given date range.

In some embodiments, the reporting and administration module 316 may allow the registered entities to request authorization and settlement data from a given token/PAN combination and date range. In some embodiments, the reporting and administration module 316 may allow the registered entities to request all the tokens and their attributes assigned for a given PAN and from a given date range.

FIG. 4 illustrates exemplary entries for the token registry database 202A, in one embodiment of the invention.

As illustrated in a table 400, the exemplary entries in the token registry database 202A may include a token 402, a personal account number 404, a token requestor identifier 406, a token presentment mode 408, a token type 410, a token expiration date 412, merchant restrictions 414, a token assurance level 416, a token timestamp 418, a token status 420, and consumer account details 422.

The token 402 may be a sixteen digit numerical value. In one embodiment, the token 402 conforms to the account number rules in an ISO message. The token 402 corresponds to the sixteen digit payment account number 404. The token BIN "490000" is mapped to the issuer BIN "414709." The token requestor identifier 406 is a ten digit numerical value that corresponds to an entity that is registered with the network token system 202. For example, the token requestor identifier 406 may correspond to an e-commerce merchant associated with the merchant computer 140. The token presentment mode 408 shows that the token may be presented in the form of a QR™ code as part of the transaction. The token type 410 is shown as dynamic which may indicate that the token 402 may be for one time use only or may expire on Jul. 16, 2014 at 2:35 pm as indicated by the token expiration date 412. Merchant restrictions 414 indicate that the token 402 may be restricted to merchants with merchant category code 5111. The token assurance level 416 indicates "issuer authenticated," meaning, for example, that the issuer computer 170 interacted with the consumer 110 through a standard protocol (ACS) and authenticated the original credential and the consumer 110. The token timestamp 418 indicates that token was issued on Jul. 15, 2014 at 2:35 pm. The token status 420 indicates that the status of the token 402 is active. The consumer name and address 422 indicates the name and address of the consumer 110 initiating the transaction. Note that the entries shown in FIG. 4 are for illustrative purposes only and the token registry database 202A may include more or less entries. For example, the token registry database 202A may also include a PAN expiration date, MSISDN, PAN alias, UUID, IMEI, IMSI, MAID, authorization code of consumer verification done, etc.

Figure 5:
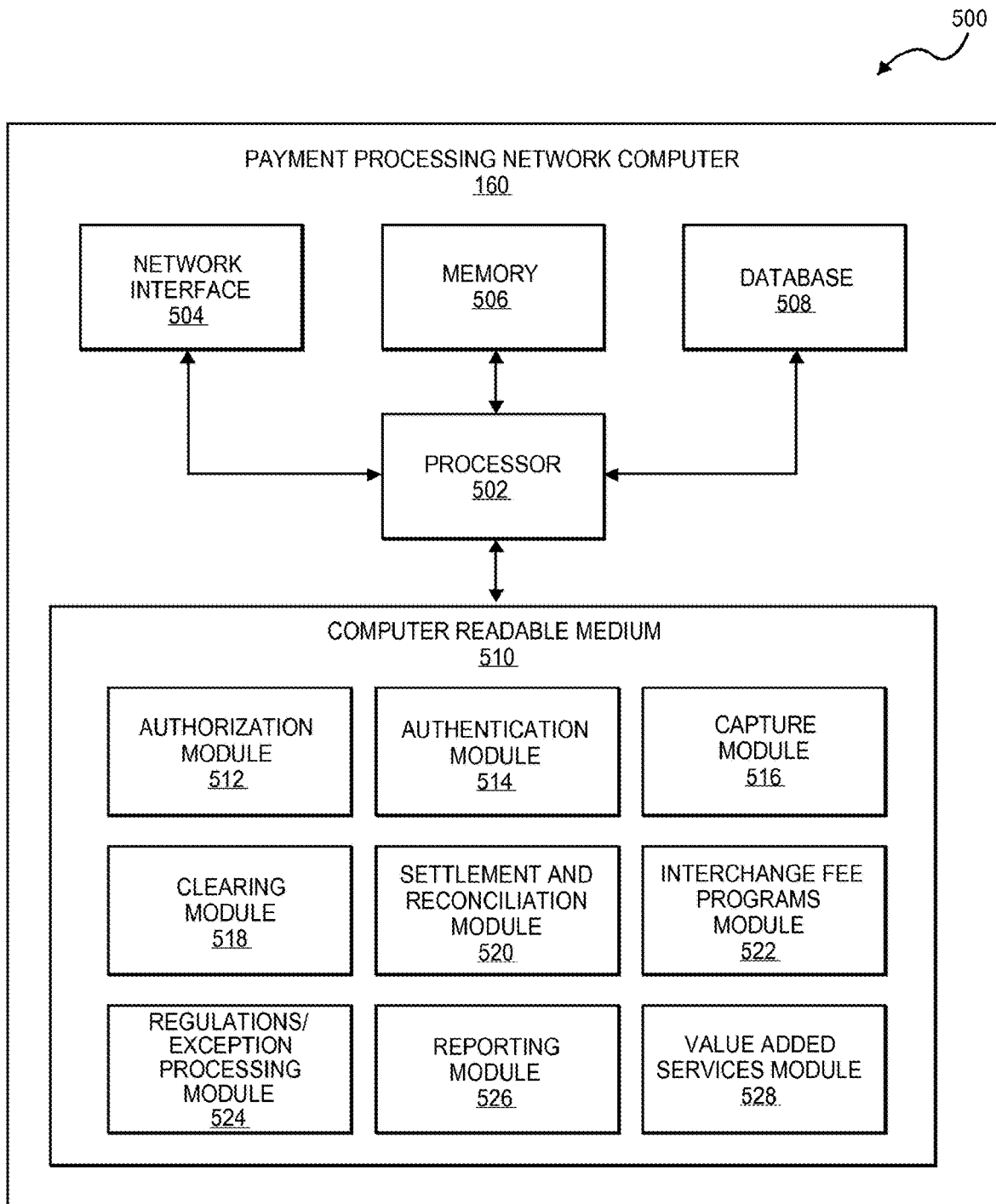
FIG. 5 shows a block diagram of a processing network computer according to one embodiment of the invention.

FIG. 5 illustrates components of the payment processing network computer 160 in one embodiment of the invention.

The payment processing network computer 160 may include a processor 502 communicatively coupled to a network interface 504, a memory 506, a database 508 and a computer readable medium 510.

The network interface 504 may be configured to allow the payment processing network computer 160 to communicate with other entities such as the acquirer computer 150, issuer computer 170, other networks 206, etc. using one or more communications networks.

The memory 506 may be used to store data. The memory 506 may be coupled to the processor 502 internally or externally (e.g., cloud based data storage) and may comprise any combination of volatile and/or non-volatile memory, for example, RAM, DRAM, ROM, flash, or any other suitable memory device.

The database 508 may store data associated with a plurality of consumers such as consumer personal and payment account information.

The computer readable medium 510 may be in the form of a memory (e.g., flash, ROM, etc.) and may comprise code, executable by the processor 502 for implementing methods described herein. The computer readable medium 510 may include an authorization module 512, an authentication module 514, a capture module 516, a clearing module 518, a settlement and reconciliation module 520, an interchange fee programs module 522, a regulations and exception processing module 526, a reporting module 526 and a value added services module 528.

The authorization module 512 may comprise code, executable by the processor 502 to validate token data elements, to provide a token assurance level, to provide support for lost and stolen devices and for token exchange.

The authorization module 512 may also comprise code, executable by the processor 502, to process an authorization request message comprising a token. In one embodiment, the authorization module 512, in conjunction with the processor 502, may validate the token requestor identifier to determine if the transaction can be approved or declined. For example, the token requestor identifier may be associated with a wallet application that may be used by the consumer 110 to initiate a transaction using the consumer device 120. The token requestor identifier may be provided by the network token system 102 to the wallet application during the onboarding process.

In one embodiment, the authorization module 512, in conjunction with the processor 502, may validate the token presentment mode. For example, the token presentment mode may be limited to specific presentment modes (e.g., QR™ Code, contactless, remote e-commerce, proximity e-commerce, etc.). A specific presentment mode indicator may be present in an authorization request message and the code in the authorization module 512 may be used to confirm that the presentment mode indicator matches the presentment mode associated with the token.

In one embodiment, the authorization module 512, in conjunction with the processor 502, may validate the token number, the token timestamp and expiration date based on the timestamp of the authorization request message.

In one embodiment, the authorization module 512, in conjunction with the processor 502, may provide a token assurance level based on how the consumer's credentials and the token have been authenticated by the network on-behalf-of. For example, the token issuance level may be captured during token issuance and can be passed in the original or subsequent transactions. In one embodiment, it may be optional for the issuers to receive this information.

In one embodiment, the authorization module 512, in conjunction with the processor 502, may provide support for lost and stolen devices. For example, if the authorization module 512 and processor 502 determine that the token is inactive or has been deactivated, the authorization module 512 and the processor 502 may block the deactivated token and may decline the transaction. The authorization module 512 and the processor 502 may also generate and send a notification message to any issuers for blocked accounts.

In one embodiment, the authorization module 512, working in conjunction with the processor 502, may provide support for token exchange. For example, the authorization module 512 may modify the authorization request message to replace the token with a PAN and send the modified authorization request message to the issuer 170. The authorization module 512 may also restore the token in the authorization response message received from the issuer 170 before forwarding it to the acquirer computer 150. In some embodiments, records of the authorization may be contained in an authorization log database that can be transmitted to the participating acquirers. The data contained in the authorization log database can be in a plurality of file formats.

The authentication module 514 may comprise code that can be executed to the processor 502 to apply one or more authentication methods (as discussed previously) to authenticate token transactions based on the presentment modes. In one embodiment, the authentication module 514 may comprise code for authenticating the QR™ code token transactions using existing authentication schemes (e.g., entering personal information into a keypad). In another example, the authentication module 514 may comprise code for authenticating contactless EMV token transactions based on dCVVs that are formed with our without ATCs (Application Transaction Counters) or cryptograms.

The authentication module 514 may also comprise code for authenticating e-commerce card on file (COF) token transactions using PAN credentials. The authentication module 514 may comprise code for providing issuers with decline notifications for token authentication failures. The authentication module 514 may also comprise code for using appropriate keys based on the PAN BINs that can be used to perform token authentication. The authentication module 514 may also provide issuers with the modified track/CHIP indicator that indicates that that the track/CHIP data has been augmented by the payment processing network computer 160.

The capture module 516 may comprise code for processing a capture file. For example, the merchant computer 140 may send the token requestor identifier in the capture file that is sent to the acquirer computer 150. The payment processing network computer 160 can convert the token into a PAN and provide the PAN to the acquirer computer 150 in the capture file to prepare clearing drafts pursuant to existing processing rules.

The clearing module 518 may be configured to process clearing transactions with tokens. A clearing process may be performed to reconcile orders among the transacting entities such as the issuer computer 170 and the acquirer computer 150/merchant computer 140. When a token is used in a clearing draft message, a token requestor identifier may be present in the appropriate data field. In one embodiment, for Base II processing, the clearing module 518 can substitute clearing draft messages received with a token with the PAN for related clearing processing. In some embodiments, if the authorization was conducted with a token, the token is replaced with a PAN in the authorization data files provided to the acquirer computer 150. The token number and expiration date can be processed pursuant to existing rules and can be provided in the clearing draft message (e.g., in the expiration date field).

In some embodiments, the clearing draft message may include a token assurance level. In one embodiment, at the time of transaction processing, if the token requestor identifier is present, the token can be validated against the token requestor identifier to which the token was originally issued. If the validation fails, the payment processing network computer 160 may return an appropriate code in the clearing draft message. In some embodiments, based on the issuer option of receiving the token requestor identifier, the payment processing network computer 160 may forward the token requestor identifier in the clearing draft message to the issuer computer 170. In some embodiments, the acquirer computer 150 may retain and return the token requestor identifier value used in the original transaction in all the subsequent transactions. In one embodiment, the POS condition code and the POS entry mode code fields can reflect the applicable token presentment mode in the clearing draft message.

The settlement and reconciliation module 520 may be configured to process settlement and reconciliation transactions with tokens. The settlement and reconciliation module 520 may provide support for the token requestor identifier and its validation in the reports and raw data files associated with the settlement and reconciliation processing of the transactions. In one embodiment, the settlement and reconciliation module 520 may include the tokens and the token requestor identifier in the reports and raw data files destined to the acquirer computer 150. In one embodiment, the settlement and reconciliation module 520 may include the real PAN and optionally the token requestor identifier in the reports and raw data files destined to the issuer computer 170. In some embodiments, the interface for processing transaction files (e.g., edit package) may be enhanced to process tokens in place of the PANs.

The interchange fee programs module 522 may comprise code for determining interchange rates and fees for token based transactions. Payment transactions conducted with tokens can qualify for existing fee programs and interchange rates applicable to the respective presentment modes and available card products.

The regulations/exception processing module 524 may be configured to apply operating regulations and perform liability and dispute processing for token payment transactions. Payment transactions with tokens can qualify for existing liability rules applicable to the respective presentment modes and available card products. For example, acquires and issuers can qualify for existing chargeback rules based on the presentment modes. The regulations/exception processing module 524 can map the tokens used in the original transactions to facilitate dispute processing related to chargebacks.

The reporting module 526 may be configured to provide reporting for token payment transactions. In some embodiments, the reporting module 526 may provide reports for each country and regions based on token attributes such as the token number and token ranges, token requestor identifier, consumer token assurance level, token expiration date, COF (card on file) indicator and the token presentment mode.

The value added services module 528 may comprise code for supporting value added services to support token transactions. For example, account update functions of merchant enquiry and setup of payment controls can be supported for tokens.

FIG. 6 shows a table 600 illustrating examples of token BIN ranges mapped to issuer BINs, in one embodiment of the invention.

The table 600 illustrates exemplary token BIN ranges 602, issuer BINs 604, network tokens 606 and PANs 608 for a plurality of PANs in rows 610, 612 and 614.

As shown in the row 610, the first six digits of the PAN "4147 0900 0000 1234" include issuer BIN "414709." The network token "4900 0000 0000 0001" corresponding to this PAN include the token BIN range "490000-4900001" mapped to the issuer BIN "414709." In some embodiments of the invention, the same PAN number may be mapped to different network token numbers as shown in the rows 610 and 614.

As illustrated in FIG. 6, a static tokenized issuer identifier (e.g., token BIN) may be provided in a token to replace the real issuer identifier (e.g., BIN) in an account identifier (e.g., PAN). This provides a number of advantages. For example, the actual BIN is still obfuscated, so that the corresponding token is less sensitive than a corresponding account identifier (e.g., PAN including a BIN). In addition, because the token issuer identifier (e.g., token BIN) is static, the token issuer identifier can be used to define a certain range of tokens. That range may correspond to a particular issuer, as well as a particular account or product segment (e.g., a platinum account, signature account, etc.) within a particular issuer. Further, the static nature of the tokenized BIN allows the network token system to more effectively manage the assignment and distribution of tokens in the payment system because a distributed routing table including token issuer identifiers may be delivered to existing transaction processing entities within the payment system and may be implemented without extensive infrastructure investment and reconfiguration.

The routing table may include a real issuer identifier (e.g., a BIN), a token issuer identifier (e.g., token BIN), product/token account range attributes associated with the real issuer identifier or token issuer identifier, payment processing network information, and corresponding issuer information (e.g., name, issuer computer address, configuration details for token related transactions, etc.). For example, an exemplary network token routing table is shown in Table 3 shown below.

TABLE 3

Exemplary Token Routing Table

| Token Issuer Identifier (e.g., token BIN) | Token Account Range | Token Account Range Attributes | Payment Processing Network Assigned | Real Issuer Identifier (e.g. BIN) | Issuer Assigned |
|---|---|---|---|---|---|
| 48887600 | 48887600000-449 | Region = US, Credit, Signature | Payment Processing Network A | 414403 | Issuer A |
| 48887600 | 48887600450-699 | Region = US, Debit, Traditional | Payment Processing Network A | 414403 | Issuer A |
| 49950010 | 48887600000-449 | Region = US, Credit, Platinum | Payment Processing Network A | 458505 | Issuer B |
| 49950011 | 48887600450-699 | Region = US, Credit, Silver | Payment Processing Network A | 458505 | Issuer B |

As can be seen in Table 3 above, the token routing table may include a plurality of payment token issuer identifiers (e.g., token BIN) each of which may be associated with one of a plurality of real issuer identifiers (e.g., real BIN) for a plurality of issuers. Additionally, the routing table may include a designated payment processing network assigned to the token BIN or a network token system assigned to the token BIN. Further, the routing table may include account attributes associated with the token BIN (e.g., identifying a type of underlying account (e.g., credit, debit, pre-paid, etc.), a product type or other associated program or status with the underlying account (e.g., platinum, silver, gold, etc.) as well as payment processing network and issuer information identifying the underlying payment processor and issuer of the account associated with the token issuer identifier (or token issuer identifier range). Accordingly, the routing table file may identify a server computer (e.g., payment processing network computer or issuer computer) for processing each of the plurality of payment token issuer identifiers and their corresponding tokens.

The network token system, payment processing network, and/or an issuer may update a routing table file to include issued, generated, or designated token issuer identifiers and/or token issuer identifier ranges. In some embodiments, the updating entity (e.g., network token system, payment processing network, or issuer) may send the updated information to a third party that manages the token routing table and updates the token routing table file and sends to transaction processing entities. In other embodiments, the updating entity may alter the routing table file to include the new definitions of the token issuer identifiers (e.g., token BINs) and other token related information and may send to entities as may be a typical or periodic update. Any suitable manner may be used to update and distribute the token routing table file. In some embodiments, the token routing table may include routing information for both tokens and real issuer identifiers. Accordingly, a single routing table file may be updated and sent to registered and/or existing transaction processing entities for routing and processing token (as well as non-token) based transactions.

After updating a routing table file, the routing table file may be distributed or sent to the transaction processing entities (e.g., a merchant computer, an acquirer computer, and/or a payment service provider computer). The routing table file may be sent through any suitable method including a "push" messaging process or a "pull" messaging process. For example, in a push messaging process, a payment processing network or network token system may periodically (e.g., hourly, daily, weekly, etc.) or based on each update to the token routing table (e.g., routing table update based), the payment processing network or network token system may send the updated routing table to registered entities within the transaction system. Alternatively or in combination, in a pull messaging process, a recipient system (e.g., a merchant, POS device, POS manufacturer, acquirer computer, issuer computer, etc.) may ask for an updated routing table periodically or based on a transaction (e.g., during a token based transaction). In some embodiments, the routing table file may be sent to a central database (BIN routing table manager or other third party) that then forwards the token routing table to the recipients.

Accordingly, by periodically updating and distributing the token routing tables, the transaction processing eco-system may remain updated and current with new tokens and token issuers that are registered and/or configured with the network token system. Further, the system may leverage existing routing table distribution methods and updating systems to incorporate token issuer identifiers and easily configure transaction processing systems to process token transactions without requiring individual updating of each device, entity, computer, and/or processor in the transaction processing eco-system. Accordingly, the central updating and distribution system may provide an efficient system for distributing token issuer identifier and routing table information to the entities within the transaction processing system.

II. Exemplary Methods for Network Token Processing

FIG. 7 shows a table 700 illustrating exemplary fields of an authorization request message with PAN based values initiated using a portable consumer device (e.g., a credit card) and token based values (initiated using a mobile device with the token provisioned thereon), according to one embodiment of the invention.

The table 700 illustrates fields 702 of an authorization request message. The authorization request message may be generated by the merchant computer 140 in response to a transaction initiation request by a consumer 110. The fields 702 of the authorization request message may include a primary account number (PAN) field 702A, an expiration date field 702B, a token presentment mode field 702C, a token requestor identifier field 702D, a merchant data field 702E, a dynamic card verification (dCVV) field 702F, an application cryptogram field 702G, an issuer discretionary data field 702H and an assurance level code field 702I. As shown in the table 700, the table 700 provides a comparison of an authorization request message initiated using a portable device with a PAN based value (e.g., a traditional credit card, debit card, etc.) and an authorization request message generated using a mobile device with a token provisioned thereon and provided by a mobile payment application or other application on the mobile device. As such, the table 700 provides a comparison of the transaction fields 702 included in a traditional transaction initiated using a PAN based value 704 from a credit card (or other portable device) and a transaction initiated using a token based value 706 from a mobile device.

As can be seen in the table 700, embodiments provide additional data elements to be passed during transaction processing that are not available to traditional payment processing systems using credit, debit, smart cards, or any other traditional account identifier systems. For example, the token based transaction may include a format preserving token value 706A, a token presentment mode 706C, a token requestor identifier 706D, a dynamic card verification value (dCVV) 706F, as well as a token assurance level code 706I. These values may not be present or available during traditional PAN based card transactions.

For example, the primary account number field 702A can include a token based value 706A "4900 0000 0000 0001" in place of the corresponding PAN "4147 0900 0000 1234." The use of a token value allows the system more flexibility and security than traditional PAN based values. For instance, if the authorization request message is intercepted at the time of transaction initiation or by an infected device in the payment system, sensitive payment information (e.g., PAN, expiration date, CVV, etc.) may not be intercepted. Instead, a token may be used that may be more easily updated, managed, and controlled by the payment processing system. For example, the token may be device specific such that if a transaction is initiated by a different device, the transaction may be determined to be fraudulent.

Further, the payment processing network may easily update token based relationships in the token vault and may more easily control the status of a token than previous PAN based transaction accounts. For instance, the network token system may receive status and maintenance updates from an issuer, token requestor, merchant, or any other relevant party regarding a lost or stolen device and may change the status of a token to inactive, hold, deactivate, or any other relevant status to control the use of the token in transactions. Accordingly, the token values provide additional control by a payment processor or other token management party to control the use and processing of transactions.

Additionally, token based transactions may include a token presentment mode that may be included in any transaction based on how the token is provided to a merchant, merchant server computer, acquirer, or any other payment service provider for processing of a transaction. The token presentment mode field 702C may not be applicable for the PAN based value. However, for token based transactions, the token presentment mode field 702C may include a presentment mode 706C for the token such as a QR™ code, NFC, e-commerce or online, etc.

The token presentment mode may be provided by the merchant computer or other device that receives a token from a consumer device or otherwise (e.g., card-on-file merchants may receive token from the network token system) and generates the authorization request message. The token presentment mode may be indicated through any suitable manner. For example, as shown in FIG. 7, the token presentment mode may include a name of a token reception type (e.g., QR Code, COF, e-commerce, NFC, etc.). In other embodiments, the token presentment mode may include an alphanumeric indicator that is associated with each possible type of token presentment (e.g., 1=NFC, 2=e-commerce, etc.).

The token presentment mode allows the network token vault an additional level of control over token based transactions that may not be available to traditional PAN based transactions. For example, token based transactions may be channel limited meaning that each token may be limited to a particular type of transaction (e.g., NFC, e-commerce, QR Code, etc.). As such, if the network token system receives an authorization request message comprising a token presentment mode of an NFC transaction (meaning that the authorization request message was generated in response to a transaction being initiated from a mobile device using a merchant NFC access device which received the token) but the token requestor or the network token system limited the token to transactions initiated using QR codes, the network token system and/or payment processing network may determine that the token has been intercepted or otherwise stolen and that the transaction is fraudulent. As such, the token presentment mode allows a payment processing network, issuer, and/or network token system additional control over financial transactions and additional security tools to minimize fraudulent transactions.

The token requestor identifier field 702D may include an identifier 706D for the registered entity that initiated the tokenization request such as a wallet provider, a payment enabler, etc. The token requestor identifier may be provided by any entity associated with the authorization request message. For example, in some embodiments, a payment enabler (e.g., a digital wallet provider) can orchestrate the population of the token requestor identifier 706D into the authorization request message before passing it to the merchant computer 140 when acting as a payment enabler. In one embodiment, the acquirer computer 150 associated with an acquirer or an acquirer processor can populate the token requestor identifier 706D for each merchant into the authorization request message field (e.g., 702D) prior to the submitting the authorization request message to the payment processing network computer 160. In such embodiments, the network token system may deliver a list of registered token requestor identifiers to acquirer computers on a periodic basis to ensure the acquirers have accurate token requestor identifiers for each merchant or other payment initiator.

The token requestor identifier may allow the network token system to ensure that a token is being provided by the entity that initially asked for the token. As such, by including the token requestor identifier, the network token system, the payment processing network, and/or the issuer may limit fraudulent transactions initiated using sniffed or otherwise intercepted account credentials. For example, if a malicious third party intercepts a token value and attempts to use the token value in a transaction initiated by a mobile device the populated token requestor identifier associated with the mobile device or mobile wallet of the malicious third party would not match the token requestor identifier stored in the token vault for the token. As such, any transaction associated with the authorization request message may be denied as being fraudulent. Further, the token record may be inactivated and/or otherwise indicated as being compromised. The network token system may further inform the consumer, an issuer, and any other interested parties associated with the compromised token record.

The dynamic card verification field 702F may not be applicable for the PAN based transaction authorization request message 704 but may have a relevant token based value 706F (e.g., 123). The dynamic card verification field may be provided by a mobile payment application or other application that initiates a transaction with a merchant or other third party and may be provided by applying transaction information to a shared secret or other shared algorithm. The transaction information may be shared between the payment processing network and the consumer device so that the payment processing network may validate the dynamic card verification value using the shared algorithm and the shared transaction information. For example, a mobile payment application of a mobile device may use a shared algorithm that uses a time, a transaction counter, and/or other dynamic data as well as a portion of the token to generate a dynamic card verification value (dCVV) for each transaction and may pass the dCVV in the authorization request message. The payment processing network may then use the shared algorithm and the transaction information (e.g., token, time, transaction counter, etc.) to generate a dynamic card verification value and compare the generated dCVV value to the received dCVV value. If the values match, the dCVV is verified and the payment processing network (or issuer) may know that the mobile payment application and/or token information is authentic.

The application cryptogram field 702G may include a dynamic cryptogram that is generated using an algorithm and may be different for each transaction. The application cryptogram field 702G may be card generated for a CHIP transaction for the PAN based value 704 and the token based transaction 706G. Additionally, the application cryptogram may be dependent on the transaction initiation method and type of application used to initiate the transaction. For example, the application cryptogram field 702G may have different values for 706G for different presentment modes such as QR™ code, NFC, etc. As such, in some embodiments, the application cryptogram may be used to ensure a token is being used in the designated transaction channel. For example, a token that is limited to NFC transactions only, may be associated with a NFC transaction application cryptogram algorithm and if the received application cryptogram is not validated with the NFC transaction application, the transaction may be declined. Accordingly, the application cryptogram allows for further transaction validation and control and provides the security benefits described above in reference to the token presentment mode.

The issuer discretionary data field 702H may include data 706H that may be provided by an issuer computer 170 (e.g., loyalty data), the network token system, or by the payment processing network computer 160. This field may provide entities within the transaction processing system flexibility in passing information to various entities within the transaction processing system.

The assurance level code field 702 may include assurance level information 706 such as information about which entity performed the authentication of the consumer or payment device (e.g., issuer authenticated). The assurance level code field 702 may indicate a level of assurance for the token 706A in the transaction. The token assurance level code can indicate how the cardholder, card credential, and/or the token have been authenticated by the payment network. For example, the token assurance level code can indicate which of the above authentication methods were used to authenticate the cardholder when the token was requested and ultimately generated. These authentication methods include, but are not limited to, a card verification value (CVV2) check, an address verification system (AVS) check, a zero dollar authorization, a payment processing network on-behalf-of authentication, a 3D-Secure extension issuer access control server (ACS) validation, and a 3D-Secure extension issuer one time password (OTP) validation. During the course of a normal payment transaction, the token assurance level code can be used by the issuer 170 for additional risk assessment and to obtain a certain level of confidence that the user using the token is in fact the genuine cardholder. Additional information regarding the token assurance code and its uses may be found in U.S. patent application Ser. No. 14/340,344, filed Jul. 24, 2014, titled "Systems and Methods for Communicating Risk Using Token Assurance Data,", which is hereby incorporated by reference in its entirety and for all purposes.

Some of the fields of the authorization request message may have the same PAN based value 704 and the token based value 706. For example, expiration date, merchant data, and issuer discretionary data may include the same information whether a token based transaction or a PAN based transaction.

Figure 8:
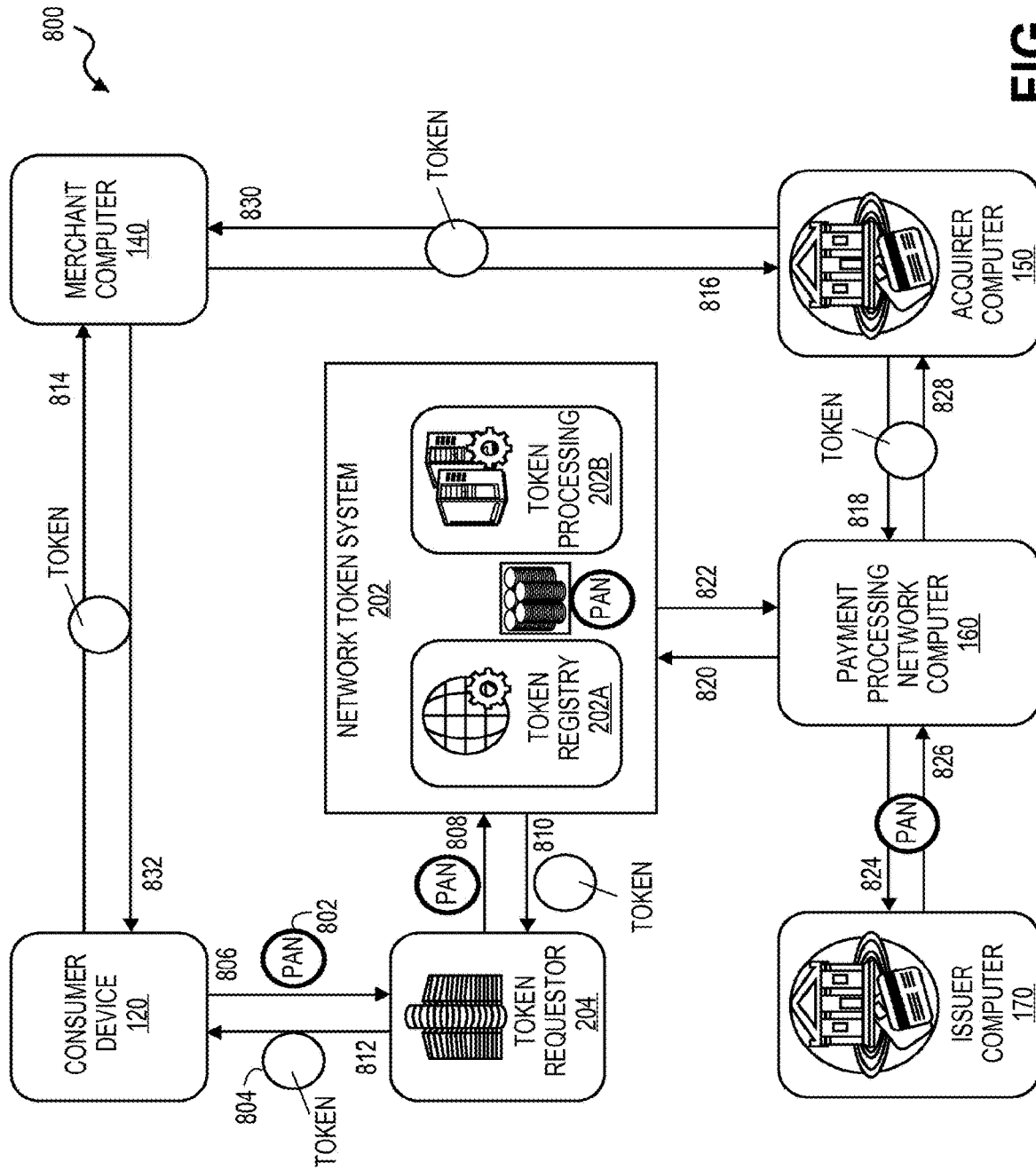
FIG. 8 shows a transaction flow using a payment token according to one embodiment of the invention.

FIG. 8 illustrates a transaction flow using a payment token according to an embodiment of the invention. In the embodiment shown in FIG. 8, a token requestor requests a token for an account identifier and provisions the token into the consumer device which the consumer then uses to initiate a transaction using the token. However, it is worth noting that other token processing methods may be possible using embodiments of the invention. For example, a token requestor may include a merchant computer and a token may be provided to a merchant and stored as a card-on-file token such that the merchant may perform transactions without providing the token to a consumer device as shown in FIG. 8. Further, an issuer may request a token and provide the token to the consumer device. As such, there are a variety of different methods and processes for obtaining a token and initiating a transaction using a token that are not shown in FIG. 8, as one of ordinary skill in the art would recognize. Embodiments of the invention may be used with any other these methods of obtaining and provisioning tokens as well as initiating transactions using the tokens.

In step 806, the consumer 110 provides an account identifier (e.g., primary account number (PAN)) 802 to a token requestor 204 to request a token for a transaction. For example, the consumer 110 can access a mobile application or a website on the consumer device 120 to interact with a mobile wallet provider (also referred to as a digital wallet provider), a mobile network operator, a device manufacturer, or any other entity that is requesting and providing tokens on behalf of consumers. In some embodiments, the consumer 110 participates in a consumer authentication and verification process with the token requestor, network token system, or issuer computer using one or more authentication schemes to utilize the network token services.

In step 808, the token requestor 204 communicates with the network token system 202 to request a token 804 associated with the PAN 802. For example, the token requestor 204 can be an entity such as a wallet application, a merchant computer, an operating system (OS) provider or an issuer that is registered with the token registry 202A. Referring back to FIG. 2, the token requestor 204 can send a token request message to the network token system 202 for a token using the token requestor interface 208. In one embodiment, the token request message may include a token requestor identifier, an account identifier (e.g., PAN) 802, an expiration date, a card verification value (e.g., CVV2) associated with the account identifier, and any other relevant information to the network token system 202 in order to request a token.

For the exemplary flow diagram shown in FIG. 8 where the token is to be provided to a consumer device, the token request may include a token requestor identifier associated with the token requestor (e.g., mobile wallet provider), an account identifier (e.g., PAN), a token expiration date (e.g., may be same as account identifier (PAN) expiration date), and a requested token assurance level. Additionally, a transaction channel, merchant limitations, a type of application cryptogram or dynamic verification value information, and any other relevant information to the transaction validation controls may be provided in the token request. Additionally, the validation controls and other limitations may be stored as being associated with the token requestor as the limitations and other configuration information was provided during registration.

In some embodiments, the token requests may be provided directly to the network token system from the token requestor using a token requestor interface that may include a proprietary API or other configured interface for communication using new messages that do not comply with ISO or other payment processing network protocol standards. For example, a web based interface may be designed to allow for various token requestors to request tokens using the web-based interface, an XML file, or any other communication network protocol (e.g., HTTPS, SOAP, and/or an XML interface). For example, a token requestor (e.g., mobile wallet provider, issuer, merchant, consumer device, or any other entity) may log into a website provided by the network token system and may submit requests through the web interface. Alternatively or in combination, a token requestor may send an XML file of account identifiers (e.g., PANs), expiration dates, a token requestor identifier, authentication information, and any other relevant information to the network token system through an XML interface. Accordingly, any of the interfaces shown in FIG. 2 may be used to request and receive tokens from the network token system.

The token requests may be received over any suitable interface including a token requestor API directly received from the token requestor. For example, card on file (COF) token requests may use a token requestor interface or API to support electronic commerce merchant "Card On File" token requestors to request tokens directly from the network token system. The COF token requestor interface may support token request types including requests for new tokens (i.e., request includes PAN), requests for change of an existing token (i.e., request includes token only, no PAN), and requests for deactivation of a token (i.e., token only, no PAN). Additionally, the requests may include authentication data (e.g., AVS and CAW data for cardholder authentication) that is not stored in the token vault but may be used to authenticate the request or the accountholder associated with the request. Other data present may include all elements necessary to properly populate the vault record including token requestor identifier, PAN, Expiration Date, and type of Token (channels on which it can be used) and whether the token request is for a New (PAN present), Change (no PAN required), or Delete (no PAN required) request type.

Depending on the type of token requestor and the type of token being requested (e.g., NFC vs. COF vs. e-commerce, etc.), the token request may comprise different information. Additionally, depending on the type of interface used to send the token request, different information and formats for the token request message may be used. For example, in some embodiments, an ISO or other payment processing network based protocol may be used to request a token, while in other embodiments a designated API or other network token configured web interface may be used to request a token.

An ISO or other payment processing network based communication protocol may be beneficial for use during a token request because the entities in the transaction processing eco-system may leverage existing infrastructure to request a token and may minimize difficulties associated with updating existing transaction processing eco-systems. For example, in such embodiments, the token requestor may actually send a request through the existing transaction flow shown in steps 814-820 in order to request a token from the network token system. Accordingly, the ISO messages may be passed through the existing payment eco-system using the existing payment processing network protocols and equipment. Additionally, these communication lines may be more secure than communications sent through the internet or other communications networks and thus, the ISO or payment processing network communication protocol token requests may leverage the existing security of the payment processing network communication protocols and infrastructure when requesting tokens through the network token system.

Referring to FIG. 2, the ISO (or other payment processing network communication protocols) token requests may be provided to the network token system through the payment processing network token interface, the acquirer token interface, the merchant token interface, or even through the issuer token interface depending on the configuration of the network token system (especially in the context of the payment processing network computer) and the processing controls associated with the ISO messages. For example, a merchant may request a token for card-on-file (COF) storage or a COF transaction (e.g., recurring transaction) and may send an ISO token request to the acquirer computer which may forward the ISO token request message to the payment processing network computer, and which subsequently passes the ISO request message to the token processing server computer through the payment processing network token interface. The token processing server computer may generate a token and return the token through an opposite flow back to the merchant computer using an ISO token response message. Accordingly, the existing payment processing network communication infrastructure may be used to send and receive token requests. Further, if the token processing server computer is configured to receive ISO messages directly from the merchant, acquirer, or an issuer, the appropriate token interfaces (e.g., merchant token interface, acquirer token interface, and issuer token interface) may be used to deliver (and return) the ISO token request message.

Additionally, as another example, existing payment processing network protocols and messages (e.g., ISO messages) may be used to perform token requests through the payment processing network. For instance, a request message may be created to allow participating issuers to request a tokenized PAN and manage existing tokens. The ISO token request may include an expiration date, message reason code associated with or indicating an action to take associated with a token, e.g., token create, token deactivate, token suspend, token resume, etc. An exemplary format for such an ISO message is provided in more detail in Table 4 below.

TABLE 4

Exemplary Issuer Based ISO
Token Request Message Format
Field Number and Name

| | |
|---|---|
| — | Bitmap, Secondary |
| 2 | Primary Account Number |
| 7 | Transmission Date & Time |
| 11 | System Trace Audit Number |
| 14 | Date, Token Expiration |
| 15 | Date, Settlement |
| 37 | Retrieval Reference Number |
| 39 | Response Code |
| 48 | Additional Data—Private Usage 1b |
| 63.0 | Bitmap (Field 63) |
| 63.1 | Network ID |
| 63.3 | Message Reason Code |
| 73 | Date, Action |
| 91 | File Update Code |
| 92 | File Security Code |
| 101 | File Name |
| 115 | Additional Trace Data |
| 123 | Verification Data, Usage 2—Dataset 68 (Token Data) |
| 127 | File Records—Action and Data, TK Token |

Further, as another example, a token requestor interface may include an ISO acquirer request interface. For instance, an enhanced account verification request may be used to allow acquirers to request that a network token system provision a token on their behalf or on behalf of a merchant or other upstream entity in the transaction processing system. For example, a merchant, acquirer, or wallet provider with an ISO connection may use the provisioning request to request a token through the existing payment processing network. The enhanced account verification request message may support Card On File provisioning and NFC provisioning. For example, the request message may include the following exemplary format provided in Table 5 below.

TABLE 5

Exemplary Acquirer Based ISO
Token Request Message Format
Field Number and Name

| | |
|---|---|
| — | Bitmap, Secondary |
| 2 | Primary Account Number |
| 3 | Processing Code |
| 4 | Amount, Transaction |
| 7 | Transmission Date & Time |
| 11 | System Trace Audit Number |
| 12 | Time, Local Transaction |
| 13 | Date, Local Transaction |
| 14 | Date, Expiration |
| 18 | Merchant Type |
| 19 | Acquiring Institution Country Code |
| 22 | POS Entry Mode Code |
| 25 | POS Condition Code |
| 32 | Acquiring Institution ID Code |
| 37 | Retrieval Reference Number |
| 39 | Response Code |
| 42 | Card Acceptor ID Code |
| 43 | Card Acceptor Name/Location |
| 44.1 | Response Source/Reason Code |
| 44.2 | Address Verification Result Cd |
| 44.10 | CVV2 Results Code |

TABLE 5-continued

Exemplary Acquirer Based ISO
Token Request Message Format
Field Number and Name

| 44.13 | CAVV Results Code |
| 48 | Additional Data—Private, Usage 2 or 9a |
| 49 | Currency Code, Transaction |
| 54 | Additional Amounts |
| 62.0 | CPS Field Bitmap |
| 62.2 | Transaction Identifier |
| 63.0 | Bitmap (Field 63) |
| 63.1 | Network ID |
| 63.19 | Fee Program Indicator |
| 123 | Verification Data, Usage 2—Dataset 66 (AVS Data) and Dataset 68 (Token Data) |
| 126.0 | Bitmap (Field 126) |
| 126.9 | CAVV Data |
| 126.10 | CVV2 Auth Request Data |

In step 810, the network token system 202 generates and/or determines a token associated with the token request and provides the token 804 to the token requestor in response to the token request. For example, referring back to FIG. 3, the network token system 202 may provide a token value (e.g., token number), a token expiration date, and a token assurance level to the token requestor 204. In some embodiments, the network token system 202 may generate the token value based on the real issuer identifier (e.g., BIN) of the account identifier (e.g., PAN) provided in the token request. Accordingly, the token may be generated using a token BIN range associated with the real account issuer associated with the account in which a token is being requested. For example, referring back to FIG. 6, the token processing computer may determine that the token should be generated using a token BIN range of "49000000-49000001" for the PAN 802 of "4147090000001234" with the real issuer identifier (e.g., BIN) of "414709."

The token value may be generated using any suitable method once a token BIN is designated, including choosing the next available sequential available token, randomly generating available tokens within the token BIN range, or any other suitable method. Once the token is generated or determined, a token record/entry for the token may be generated including the token data shown in FIG. 4 described above as well as Table 1 above regarding token entry or records in the token vault. Any processes or methods may be performed to obtain the relevant data to populate the token record data including obtaining data from a payment processing network or issuer associated with the account identifier, authenticating a consumer to determine the token assurance data associated with the request, and any other relevant processes for obtaining any relevant information. For instance, in some embodiments, application cryptogram shared secrets (e.g., cryptographic algorithms, derived encryption keys, etc.) may be requested from a payment processing network so that the token vault may validate the application cryptograms and dynamic card verification values received during transaction processing. Alternatively, this validation may occur at the payment processing network and thus, may not be necessary to be stored at the token vault.

Additionally, a token provisioning notification may be generated and returned to an issuer that may notify the issuer that one of their cardholders has provisioned a token using the network token system. The token provisioning notification message may include a message reason code that may contain any of the following information regarding the token provisioning including token create, token deactivate, token suspend, token resume, etc., and may also include an identifier of the type of notification to the issuer. Additionally, a token number, token assurance level, and token requestor identifier may be provided to the issuer. An exemplary format for the notification is shown in Table 6 below.

TABLE 6

Exemplary Issuer Notification
Message Format
Field Number and Name

| — | Bitmap, Secondary |
| 2 | Primary Account Number |
| 7 | Transmission Date & Time |
| 11 | System Trace Audit Number |
| 14 | Date, Token Expiration |
| 15 | Date, Settlement |
| 37 | Retrieval Reference Number |
| 39 | Response Code |
| 62.0 | CPS Field Bitmap |
| 62.2 | Transaction Identifier |
| 63.0 | Bitmap (Field 63) |
| 63.1 | Network ID |
| 63.3 | Message Reason Code |
| 63.4 | STIP/Switch Reason Code |
| 70 | Network Management Info Code |
| 100 | Receiving Institution ID Code |
| 123 | Verification Data, Usage 2—Dataset 68 (Token Data) |

In step 812, the token requestor 204 may provide the token 804 to the consumer 110 and/or consumer device 120. In one embodiment, if the token 804 is a static token, the token 804 may be stored in a secure location on the consumer device 120, e.g., a secure element of the mobile device.

In some embodiments, the token requestor may also pass a token requestor identifier and a token assurance level code associated with the token to the consumer device and may provision the token requestor identifier and token assurance level code with the token in the consumer device. Accordingly, when the consumer uses the consumer device to initiate a transaction, the token requestor identifier and token assurance level code may be passed in a generated authorization request message. Further, in some embodiments where the token requestor 204 is a payment enabler (e.g., a digital wallet provider or merchant application configured to pass the token to a merchant computer on behalf of the consumer), the token requestor 204 can orchestrate the population of the token requestor identifier and token assurance level code into a transaction message before passing it to the merchant computer 140. Any suitable method may be used to initiate and populate the token specific data elements into the authorization request message.

In step 814, the consumer 110 may provide the token 804 to the merchant computer 140. In one embodiment, the token 804 may be presented as part of the transaction using any suitable token presentment mode. For example, the token requestor 204 may provide the token 804 in the form of a QR™ code that may be displayed on the consumer device 120. A merchant can scan the QR™ code including the payment token into the merchant computer 140. Alternatively, the consumer 110 can wave the consumer device 120 in the vicinity of a contactless reader coupled to the merchant computer 140 to transfer the payment token in the contactless mode. Alternatively, a consumer may tap or otherwise make contact with a merchant access device to pass the token and other transaction information to initiate a transaction.

In step 816, the merchant computer may generate an authorization request message including the token 804 and send the authorization request message to the acquirer computer 150 for the transaction initiated by the consumer 110. For example, in some embodiments, referring back to FIG. 7, the authorization request message may include the token based values such as a token value, a presentment mode, a token requestor identifier, an assurance level code as described above. Depending on the type of transaction, the various token based information in the authorization request message may be provided through any number of different entities and through a various number of processes. For example, using the examples provided above, if a token is provided through a QR Code displayed by a consumer device, the merchant computer may determine that the token was received through a QR Code and may populate the authorization request message with the token presentment mode associated with the QR Code. Alternatively, the token presentment mode may be identified and provided by the mobile application on the mobile device, the token requestor, and/or any other suitable entity. Further, the QR Code may comprise additional token related information for populating the authorization request message including a token assurance level code, token requestor identifier, application cryptogram, issuer discretionary data, and any other relevant information described in reference to FIG. 7 above.

In step 818, the acquirer computer 150 may forward the authorization request message including the token 804 to the payment processing network computer 160. In one embodiment, the acquirer computer 150 can populate the token requestor identifier for each merchant into the authorization request message field (e.g., 702D in FIG. 7) prior to the submitting the authorization request message to the payment processing network computer 160. In such embodiments, the acquirer computer may receive a mapping or indication of the relevant token requestor identifiers associated with a merchant before the transaction is initiated. Further, the authorization request message may include a data flag or other identifier indicating to the acquirer that the transaction is a card-on-file (COF) transaction and that the merchant is the token requestor for the transaction.

In step 820, the payment processing network computer 160 may receive the authorization request message, may determine that the authorization request message comprises a token, and may provide the token 804 to the network token system 202 to receive a PAN in exchange for the transaction. For example, the payment processing network computer 160 may use the payment processing network token interface 214 as shown in FIG. 2. In some embodiments, the payment processing network may send the authorization request message to the network token system for validation of the transaction attributes associated with the token received in the authorization request message. In other embodiments, the payment processing network may send a request for the token attributes to the network token system and the network token system may respond with the token attributes that are associated with the token including the account identifier (e.g., PAN) but also the channel limitations, merchant limitations, etc.

Further, in some embodiments, the payment processing network may parse the relevant information for validation by the network token system and may provide the relevant information (e.g., token, token presentment mode, merchant information (e.g., merchant category code), token requestor identifier, etc.) for the transaction but may not forward the authorization request message to the network token system. Accordingly, any suitable method of providing and/or receiving the relevant information for validating the transaction information with the network token system may be used in processing a transaction.

In step 822, the token processing computer of the network token system 202 may receive the token, search the token registry for the token record associated with the received token, may determine an account identifier (e.g., PAN) associated with the token, determine any limitations and/or validation information associated with the token, and may provide the PAN 802 (and any other relevant validation information) to the payment processing network computer 160 for processing of the transaction.

Alternatively and/or in combination, as discussed with reference to FIG. 3, the token exchange and routing module 316 may validate if the token/PAN mapping is valid and/or if the transaction is allowed for the token based on the requested timestamp, transaction timestamp, token expiration date, token presentment mode, token requestor identifier, and any other relevant information. If a PAN cannot be located or validated for a token request, then the transaction may be declined. In this embodiment, if the transaction information is validated with the limitations associated with the token in the token registry, the account identifier (e.g., PAN) may be returned to the payment processing network. Depending on whether the payment processing network or the token vault processes the limitations and validates the transaction for the token related information, validation information may be sent in the response along with the account information or the account identifier (e.g., PAN) alone may be returned for including in an authorization request message.

Further, in some embodiments, the token processing computer of the network token system may be configured to perform all of the processes associated with the payment processing network (and vice versa). As such, the processing steps described in steps 820-822 could also be performed by a single entity associated with the token vault as well as the payment processing network.

In step 824, the payment processing network computer 160 may modify the authorization request message to include the PAN 802 in place of the token 804 and provide the modified authorization request message to the issuer computer 170. The payment processing network may also perform any other validation, authentication, authorization, and/or any other relevant processes before modifying and sending the modified authorization request message. In some embodiments, the authorization request message to the issuer computer 170 may also include the token 804 or an indication that the transaction involved a token, depending on the configuration settings of the issuer.

Additional information regarding the type of information included in the authorization request message, the modified authorization request message, any authorization response message, and the information available to each entity is provided in more detail regarding FIGS. 10-11 described below. For example, a token assurance level code may be provided in the modified authorization request message to provide the issuer additional information regarding the risk of the transaction and the confidence that the network token system has that the token requestor and/or consumer that requested the token was in fact the accountholder or an authorized agent of the accountholder.

In step 826, the issuer computer 170 receives the authorization request message, makes an authorization decision regarding whether the transaction should be approved or declined, and provides an authorization response message including an indication as to whether the transaction is approved or declined to the payment processing network computer 160. The issuer computer may perform any number of processes to determine whether the transaction should be approved or declined. For example, the issuer computer 170 may determine if the transaction can be authorized based on the consumer account information (e.g., available balance, transaction history, etc.).

In step 828, the payment processing network computer 160 may receive the authorization response message from the issuer computer and modify the authorization response message received from the issuer computer 170 to replace the PAN information with the token information. In some embodiments, the payment processing network computer 160 may interact with the network token system 202 (e.g., as discussed with respect to steps 820 and 822) to perform the PAN/token mapping to obtain the token associated with the PAN. However, in other embodiments, the payment processing network may temporarily store the PAN/token mapping for the transaction and may use the temporarily stored token to populate the token information in the authorization response message. Further, in some embodiments, the token may be provided in the modified authorization request message and thus, the token may be returned along with the account identifier (e.g., PAN) in the authorization request message and thus, may be parsed from the authorization response message. The payment processing network may log the decision of the issuer along with the token for the subsequent clearing and settlement processes. Accordingly, the payment processing network may perform any number of processes to determine the token associated with the PAN.

The payment processing network computer 160 may then modify the authorization response message to remove the account identifier (e.g., PAN) and send the modified authorization response message including the token 804 to the acquirer computer 150. In some embodiments, the payment processing network computer 160 may optionally provide the last four digits of the real account identifier (e.g., PAN) to the acquirer computer 150 in the modified authorization response message for printing on the receipt or otherwise confirming with the consumer that the correct account was charged or used for the transaction.

In step 830, the acquirer computer 150 may forward the modified authorization response message to the merchant computer 140.

In step 832, the merchant computer 140 may indicate the authorization response to the consumer 110. For example, the merchant computer 140 may send a message to the consumer device 140 indicating if the transaction is approved or declined.

Figure 9:
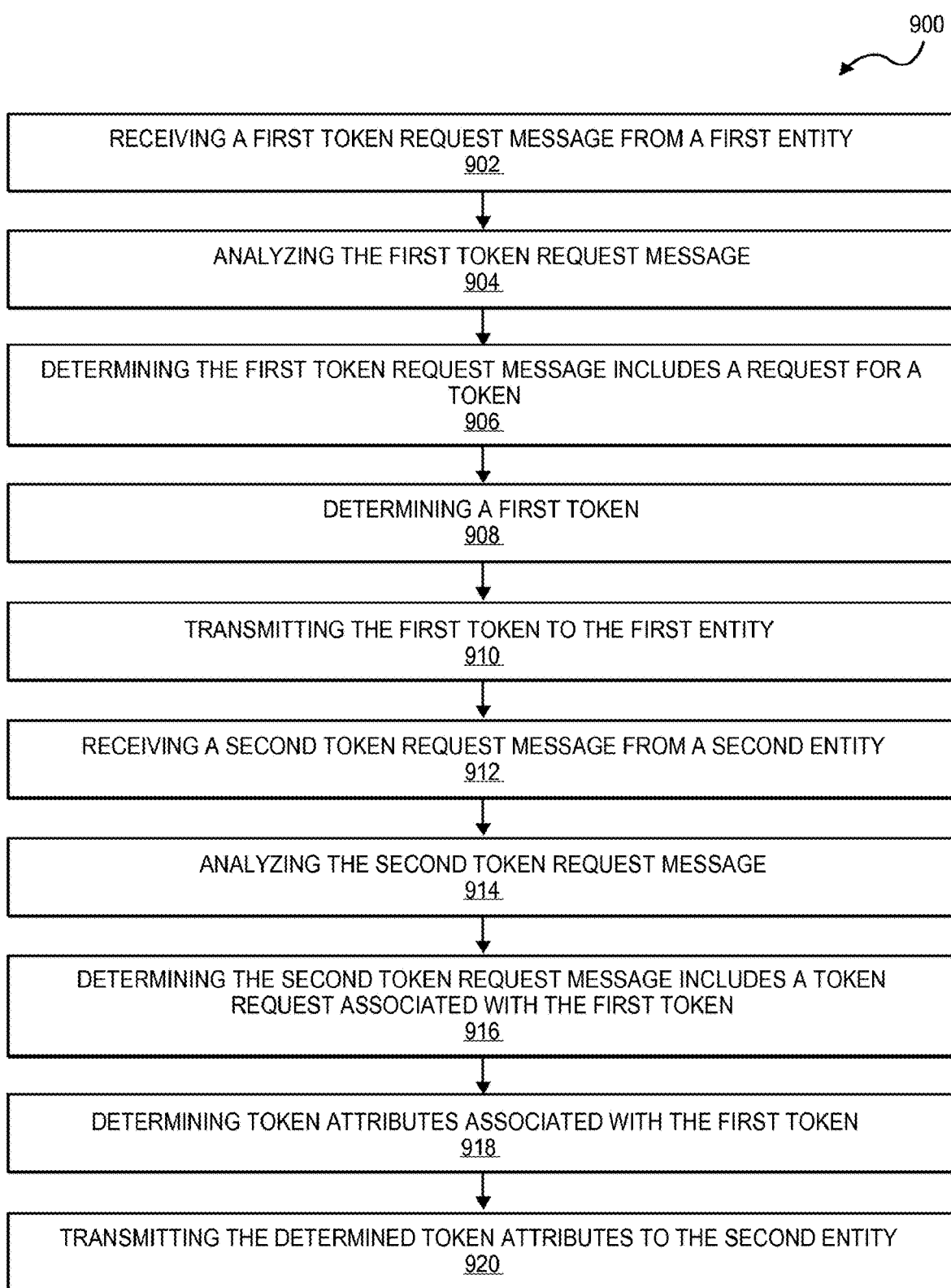
FIG. 9 shows a token request flow diagram according to one embodiment of the invention.

FIG. 9 illustrates a process flow for token request processing by the network token system according to one embodiment of the invention. The process flow of FIG. 9 may be in reference to any number of different token requests using any number of different token interfaces of the network token system. For example, the first entity may include a token requestor, merchant, issuer, acquirer, or any other entity that may obtain a token through the network token system. Further, the second entity may include any entity that may interface with the network token system to obtain any information or services from the network token system regarding an issued, generated, and/or provisioned token.

In step 902, a first token request message is received from a first entity. The first entity may be a mobile device, a mobile wallet provider, a merchant, an acquirer, an issuer, a payment processing network or another entity that may interface with or may use the network tokenization service. Referring back to FIG. 2, the network token system 202 may receive the first token request message from the token requestor 204 via the token requestor interface 208. For example, the first token request message may include a token request for issuing a token associated with an account identifier. As described above, the token issuance request or token provisioning request may include any information relevant to issuing or generating a token associated with a particular consumer account. For example, the token issuance request may include an account identifier (e.g., a PAN), consumer authentication data (e.g., username, password, challenge response information, etc.), account authentication data (e.g., CVV), and a token requestor identifier.

In step 904, the network token system analyzes the first token request message and determines a request associated with the first token request message. For example, the token processing server computer 202B may analyze the first token request message to determine which token interface the message is received, the entity sending the token request, the type of token request, whether the entity has the requisite permissions for obtaining the results of the token request, etc. For example, the network token system may be configured to provide any number of requests including a token issuance request, token validation request, a token exchange request, and/or a token management request. Each of these types of requests may be associated with a different flag, indication, token interface, and particular registered and authorized entities within the transaction processing system. Accordingly, the network token system may determine the entity associated with the token request, the token request interface or API being used to submit the request, and the relevant information contained within the request to determine an appropriate process or response to the request. Further, a token registry or other database may be searched for the registered entity sending the token request and the permissions associated with the entity associated with the first token request message.

In step 906, the token processing server computer 202B may determine that the first token request message includes a request for a token. The token processing server computer may determine the first token request message includes a request for a token through any suitable method. For example, the first token request may include a flag indicating the purpose of the message is associated with a token issuance request. Further, the first token request may include a token requestor identifier associated with an entity configured, authorized, and registered to allow for token issuance for consumer accounts. Additionally, the token request may include relevant information for token issuance that other message may not include, for example, an account identifier (e.g., PAN) may be included in the first token request message which may only be provided through token request messages including token issuance requests.

In step 908, token processing server computer 202B may determine, generate, and/or issue a token associated with the first token request message. In one embodiment, the token processing server computer 202B may interact with the token registry database 202A to determine if the first token already exists. For example, in some embodiments, a token may be issued to a new device or a token issuance request may be processed faster and more efficiently when a token has already been issued for the consumer account. For instance, the risk of the token issuance request being fraudulent may be minimized where a token has already been issued for a consumer account. Accordingly, the token processing computer may determine whether a token has previously been issued for the consumer account and/or device associated with the token issuance request. In some embodiments, a token may be device specific such that each device that requests a token associated with a particular account may receive a separate token for the same account on each device. Accordingly, device information may be included and the token processing computer may use the device information to determine whether a token has been issued for the consumer device requesting the issuance of the token from the token requestor (and subsequently the token processing computer).

In some embodiments, the token processing server computer 202B may determine a first token by generating the first token and information for a token record and storing the relevant information token record information in the token registry database 202A. As described above, the token may be generated using any relevant method and the consumer may be authenticated and other token related information may be obtained through any suitable method.

In step 910, the token processing computer transmits the first token to the first entity. In some embodiments, a token response message comprising a token and an assurance level code is transmitted to the first entity. In some embodiments, the first entity may forward the token response message to a consumer device or another entity. For example, in some embodiments, the first entity may include a token requestor and the token requestor may forward the token response message to a consumer device associated with the consumer that initiated the token request. Alternatively and/or in combination, the token requestor may store the token information in a database for future requests of the token information by a consumer (e.g., for embodiments where token information may be provisioned at a later time onto a consumer device or provided directly from the token requestor to a merchant or other payment provider for a transaction).

In step 912, the token processing server computer 202B may receive a second token request message from a second entity. The second entity may include any entity within the network token processing system. For example, the second entity may be a mobile device, a mobile wallet provider, a merchant, an acquirer, an issuer, a payment processing network or another entity that may interface with the network tokenization system.

In step 914, the token processing server computer 202B may analyze the second token request message. For example, the token processing server computer determine the identity of the second entity, the token interface being used for the request, the permissions associated with the second entity, and any other relevant information. Additional details regarding this step may be found in reference to step 904 discussed above.

In step 916, the token processing server computer 202B may determine that the second token request message includes a token request associated with the first token. For example, the second token request may include a token validation request, a token exchange request, and/or a token management request associated with the first token.

A token validation request may include a request for a network token system to determine and provide transaction restrictions (e.g., merchant category code), transaction channel or domain restrictions (e.g., NFC token, e-commerce token), token status information (e.g., active, inactive, deactivated, etc.), and/or any other relevant information to a requestor. For example, the token validation request may be received from a merchant computer 140, acquirer computer, or mobile wallet provider. In some embodiments, the token validation request may include transaction information for a particular transaction or may merely include a request for limitations associated with a particular token. The token validation request may include transaction data, an identifier for the entity requesting the token validation request, and the first token. Referring back to FIG. 2, the merchant computer 140 may provide a token validation request to the network token system 202 via the merchant token interface 210. Additionally, any of the other entities may provide a token validation request though their respective interfaces including the token requestor interface, acquirer token interface, payment processing network interface, and/or any other entity associated interface.

A token exchange request may include a request for a PAN associated with a token. A mobile wallet provider, a merchant, a consumer device, an acquirer, a payment processing network, and any other relevant entity may send a token exchange request to a network token system. The token exchange request may include any relevant information to determining the token and determining if the entity sending the token exchange request has authorization to obtain an account identifier associated with a token. For example, a token exchange request may include a registration identifier for the entity sending the token exchange request, a token, and a token requestor identifier.

A token management request may include a request to update a token record associated with the token. The token management request may include any relevant update of information and may be sent from any entity with authorization to update a token record associated with a consumer. For example, the second entity may include a mobile wallet provider or other token requestor that originally requested a token, an issuer associated with the token, a payment processing network associated with a token or network token system, and any other relevant entity. For instance, an issuer may send a network token system a token management request to activate, de-activate, update, or request the current status of a token.

In step 918, the token processing server computer 202B may determine the token attributes associated with the first token. In some embodiments, the token processing server computer 202B may interact with the token registry database 202A to determine token attributes associated with the token. The determined attributes associated with the first token may change and be dependent on the type of token request received in step 916.

For example, for a token validation request from the merchant computer 140 and the token processing server computer 202B may interact with the token registry database 202A to determine transaction restrictions associated with the first token. For instance, the token processing computer may search a token database for transaction restrictions associated with a first token included in the token validation request. The token processing computer may determine whether the second entity has authorization to request the token validation, determine a token record associated with the received token, obtain the transaction restrictions (e.g., merchant category codes, transaction channel, etc.) associated with the token record, generate a token validation response message, and send the token validation response including the transaction limitations and other validation conditions to the requesting entity.

As an additional example, where the token request includes a token validation request, the token processing computer may determine the token attributes associated with the first token by determining transaction information included in the token validation request, and the token processing computer may compare the transaction information to the conditions and limitations in the token record of the token vault. The token processing computer may determine whether the transaction is valid for the token and may provide a transaction validation response including whether the transaction information may be valid for the token in response to the second entity. For instance, a merchant, mobile wallet provider, merchant application, or any other entity may request a transaction validation before submitting a transaction processing through a payment processing network using the token validation request. Further, the second entity may determine if the token is currently valid and in good standing before initiating a transaction. Furthermore, a merchant may determine whether a received token is good for transactions, account holds, lay-away, reservations, etc. before a transaction is submitted.

As an additional example, where the token request includes a token exchange request including the first token and the token requestor identifier, the token processing computer may determine the token attributes associated with the first token by ensuring the second entity has authorization to obtain the account identifier, validating the token requestor identifier is associated with the first token, and if the token requestor is validated, providing the account identifier in response back to the second entity.

As an additional example, where the token request includes a token maintenance request, the token processing computer may determine the token attributes associated with the first token by performing the token maintenance request, updating or otherwise determining the status or other token record information in the relevant token record, and providing the relevant token attributes from the token record to the second entity. For example, a second entity may include an issuer and the token management request may include the first token and instructions to activate, de-activate, or update the first token. Accordingly, the token attributes may include a status of the first token after performing the requested maintenance action (or an indication whether the requested action is successful or not) and any other relevant information (e.g., update configuration attributes, record information, or any information stored in the token database that the entity is authorized to access).

In step 920, the token processing server computer 202B may transmit the determined token attributes to the second entity. For example, if the second entity is the merchant computer 140, the determined token attributes may be communicated using the merchant token interface 210, if the second entity is the issuer computer 170, the determined token attributes may be communicated using the issuer token interface 216. Any type of interface and/or message format may be used in providing the token attributes. Further, any number of additional steps and processes may be completed in combination with providing the token attributes. For example, transactions may be declined (e.g., for token validation requests and token exchange requests), the token registry may be updated to include information from the token request (e.g., for token maintenance requests), and entities may be registered with the network tokens system.

Figure 10:
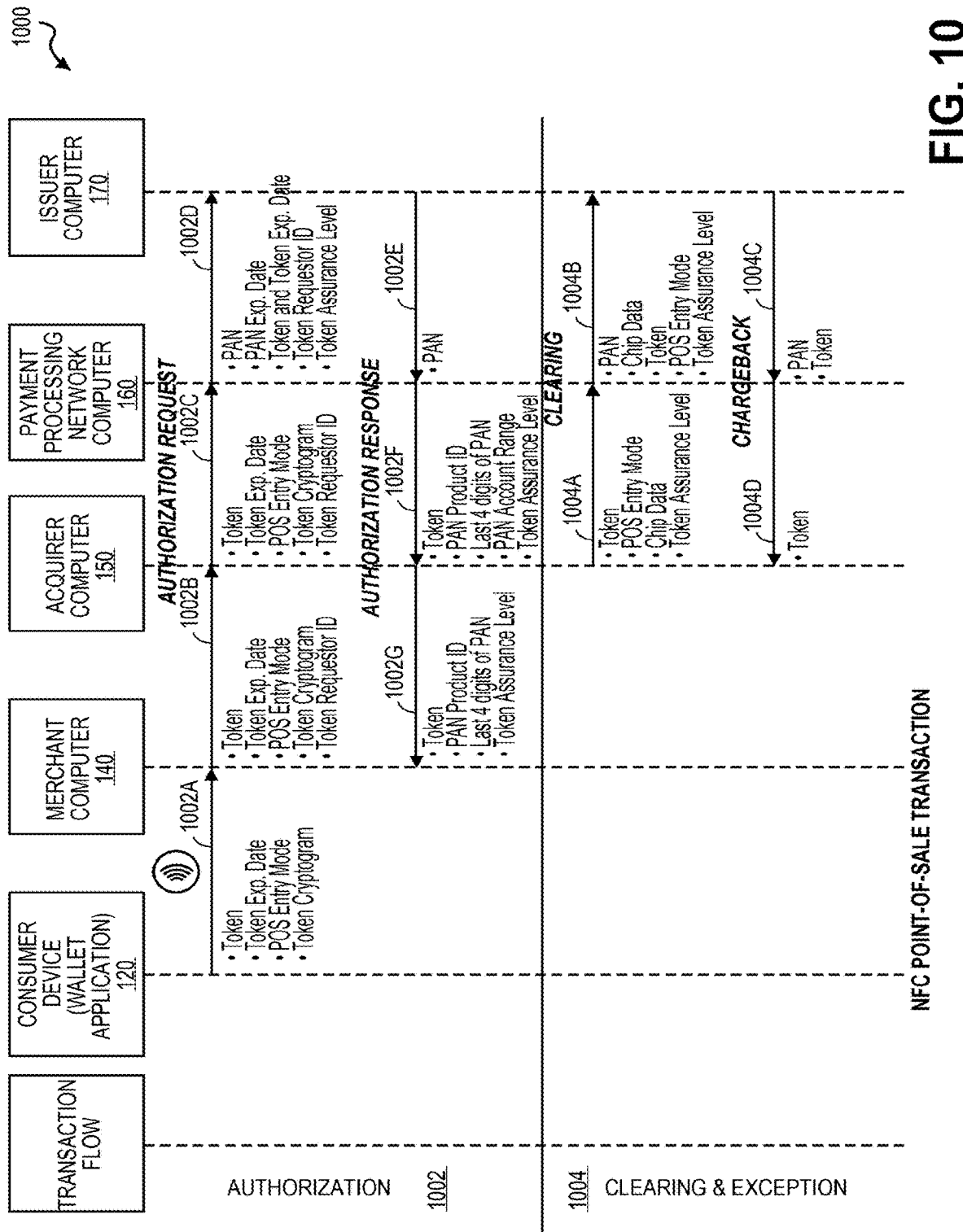
FIG. 10 shows a flow diagram for an exemplary transaction flow for NFC at the point-of-sale according to an embodiment of the invention.

FIG. 10 illustrates an exemplary transaction flow for NFC at the point-of-sale according to one embodiment of the invention. An authorization process 1002 for a transaction conducted at the POS using NFC may include steps 1002A-1002G.

In step 1002A, the NFC terminal at the merchant computer 140 may capture data from the consumer device 120 when the consumer device 120 is tapped or waved at the NFC terminal. For example, referring back to FIG. 1, the NFC terminal may be part of the access device 130 that may be communicatively coupled to the merchant computer 140. In one embodiment of the invention, in an off-line process, an issuer may have registered as a token requestor with the token vault and may have provisioned a token in a wallet application of the consumer device 120 (e.g., an NFC enabled cell phone). The consumer 110 may use the consumer device 120 to make a payment. The merchant computer 140 may capture a token, a token expiration date, a token cryptogram (or other chip based dynamic cryptogram), and a POS entry mode (as the token presentment mode) from the consumer device 120. In one embodiment, a token requestor identifier may be encrypted as part of the token and/or chip cryptogram data.

In 1002B, the merchant computer 1002B may generate an authorization request message with the captured data (e.g., token, token expiration date, token presentment mode, token cryptogram, and token requestor identifier) and provide it to the acquirer computer 150. The authorization request message may include addition fields such as transaction data, merchant identifier, card sequence number, and any other relevant data. The token requestor identifier may be provided by the consumer device and/or wallet application or may be determined by the merchant computer based on the received information (e.g., based on the mobile payment application or mobile wallet used to initiate the transaction on the consumer device).

In 1002C, the authorization request message may be conveyed to the payment processing network computer 160 by the acquirer computer 150.

In 1002D, the payment processing network computer 160 may interface with the network token system to determine an account identifier associated with the received token, validate the transaction is compatible with the token information stored in the token record of the token registry for the token (e.g., token presentment mode, merchant limitations, token requestor identifier validation, token cryptogram validation, etc.), determine token assurance level data associated with the token (in some embodiments this information may be received during the transaction as well), and send the chip data (e.g., token cryptogram and chip transaction indicator), the token, the token expiration date, the token requestor identifier, a token assurance level, a PAN, and a PAN expiration date to the issuer computer 170 for authorization. For example, the payment processing network computer 160 may exchange the token for the PAN from the token vault and modify the authorization request message to include the PAN in place of the token before providing to the issuer computer 170. The token requestor identifier and the token assurance level may be optional for the issuers. Before sending the modified authorization request message to the issuer computer 170, the payment processing network computer 160 may validate that the token is being properly used in the correct domain.

In 1002E, the issuer computer 170 may make an approval decision after receiving the modified authorization request message and send an authorization response message to the payment processing network 160. The authorization response message may identify the account (e.g., PAN) and include the authorization decision for the transaction. Although not shown in FIG. 10, the newly added token related fields (e.g., token assurance level) may be retained (e.g., stored at the issuer computer/database) and returned in the authorization response message.

In 1002F, the payment processing network 160, upon receiving the response, may swap the PAN for the token using the methods and processes described herein, may populate the authorization response message with the last four digits of the PAN (so the consumer may be assured that the correct account was used in the transaction), and may include the token assurance level in the modified authorization response message to the acquirer computer 150. The modified authorization response message may also include a PAN product identifier (i.e., PAN account range) to inform the acquirer as to any loyalty or special deals, offers, etc. associated with the account.

In 1002G, the acquirer computer 150 may forward the authorization response message to the merchant computer 1002G which may include the authorization decision for the transaction.

A clearing and exception process 1004 may include steps 1004A-1004D as described below. For example, as discussed with reference to FIG. 5, the clearing and exception process may be performed by the clearing module 518 to reconcile the transaction.

In step 1004A, the acquirer computer 150 may submit a clearing draft message with the token in the PAN field, along with the token cryptogram (or other chip data) to the payment processing network 160. The clearing draft message may also include a token assurance level.

In step 1004B, the payment processing network 160 may recognize the token and replace the token with the real account identifier (e.g., PAN) through similar processes to those described above involving the network token system/token registry in the clearing draft to the issuer computer 170. The payment processing network 160 may place the token in a new field in the clearing draft message to the issuer computer 170 and also include the token assurance level in the clearing message.

In step 1004C, should a chargeback occur, the issuer computer 170 may retain and return the token as well as the PAN to the payment processing network 160.

In step 1004D, the clearing process may move the token to the PAN field and drop the real PAN from the clearing draft message to the acquirer computer 150. Accordingly, the PAN associated with the token is kept secure while allowing charge-backs to occur for token related transactions.

Figure 11:
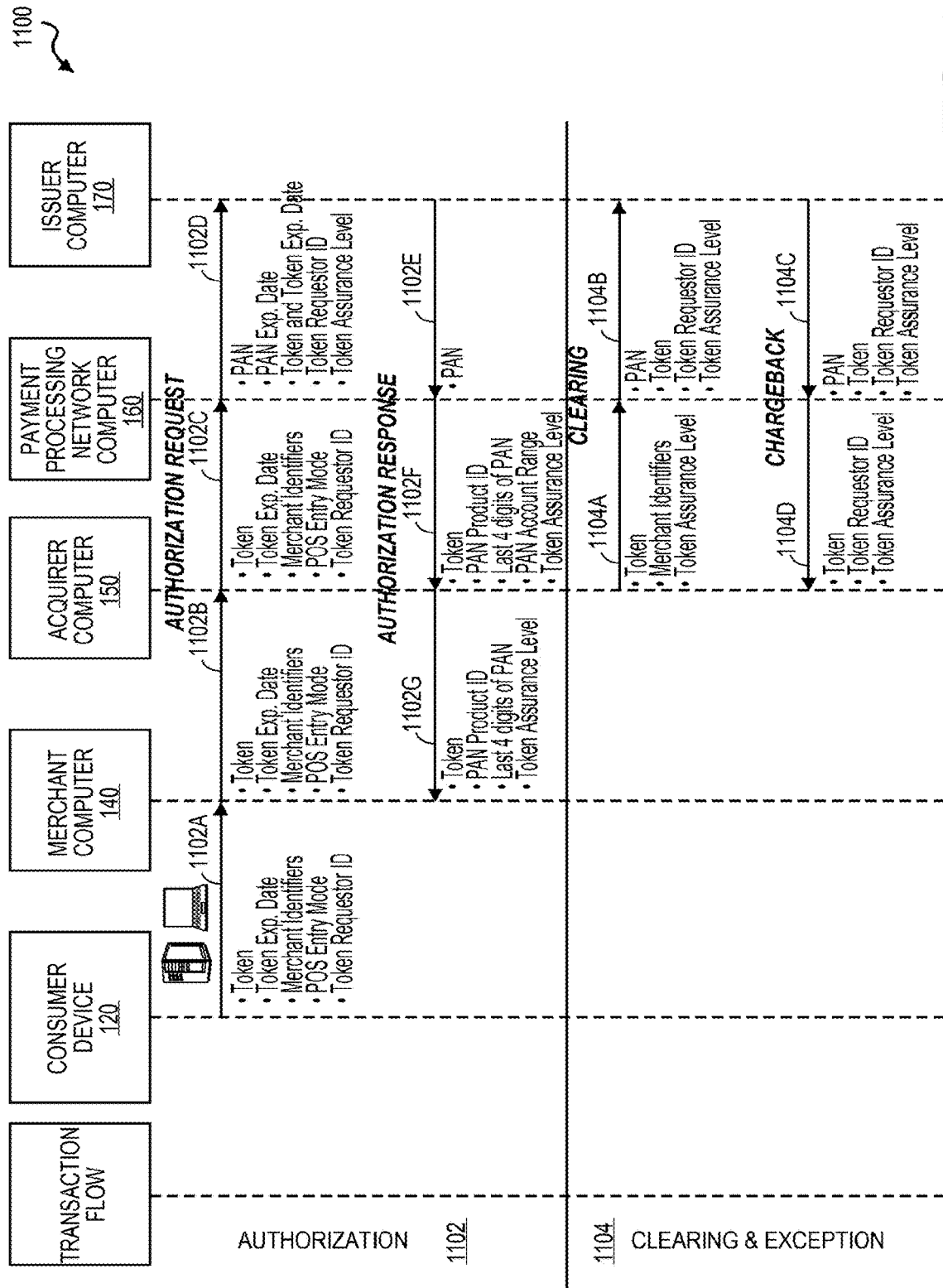
FIG. 11 shows a flow diagram for an exemplary flow for a card-on-file/e-commerce transaction according to one embodiment of the invention.

FIG. 11 illustrates shows an exemplary flow diagram for card-on-file/e-commerce transaction according to one embodiment of the invention. Although the flow diagram appears to show the same information for both COF and e-commerce transactions, different data may be provided in both processes (although the steps may be similar). For example, in the COF implementation, a merchant computer may request a token through any suitable manner as described above and may store the token at the merchant computer. As such, the merchant computer may receive payment credentials from the consumer in step 1102A instead of a token and then may request a token associated with the payment credentials before the transaction is initiated (or during the transaction). Accordingly, as an off-line process, prior to the transaction, the merchant (e.g., online merchant) may have registered for a token requestor identifier.

In step 1102A, the consumer 110 may make a purchase using the consumer device 120. In the COF implementation, the consumer may pass the token or an indication of the consumer information, account, etc. to the merchant to initiate the transaction. The merchant may then obtain the corresponding token from their stored token database and may generate the authorization request message using the stored token information. In the e-commerce transaction implementation, the token may be a static token stored on the mobile device and may be passed through a wireless connection over the internet through the use of a merchant application or mobile payment application to a merchant server computer. The information passed may include the information shown in FIG. 11 as well as the information discussed herein. Further, the token presentment mode (i.e., POS presentment mode) may include an "e-commerce" or "COF" indication depending on the type of transaction being performed.

In step 1102B, the merchant computer 140 may initiate an authorization request message to the acquirer computer 150. When the authorization is initiated, the merchant/acquirer may provide a token in place of the PAN and a token expiration date.

In step 1102C, the acquirer computer 150 may forward the authorization request message to the payment processing network computer 160.

In step 1102D, the payment processing network computer 160 may recognize that the token is from a token enabled merchant and replace the token with the real PAN (e.g., from the token vault) and send the token in a new field, the token requestor identifier, and token assurance level and the PAN to the issuer computer 170 in a modified authorization request message. The token requestor identifier and token assurance level may be optional for issuers.

In 1102E, the issuer computer 170 may make an approval decision and send an authorization response message to the payment processing network 160. The newly added fields (e.g., token assurance level) may be required to be "retained and returned" in the transaction.

In 1102F, the payment processing network 160, upon receiving the response, may swap the PAN for the token, optionally populate the last four digits of the PAN in the authorization response message, and return the token assurance level in the modified authorization response message to the acquirer computer 150. The modified authorization response message may also include a PAN product identifier.

In 1102G, the acquirer computer 150 may forward the authorization response message to the merchant computer 1102G.

A clearing and exception process 1104 may include steps 1104A-1104D as described below. For example, as discussed with reference to FIG. 5, the clearing and exception process may be performed by the clearing module 518 to reconcile the transaction order.

In step 1104A, the acquirer computer 150 may submit a clearing draft message with the token in the PAN field, along with CHIP data to the payment processing network 160. The clearing draft message may also include a token assurance level.

In step 11048, the clearing process at the payment processing network 160 may recognize the token and replace the token with the real PAN (e.g., from the token vault) in the clearing draft message to the issuer computer 170. The clearing process may place the token in a new field in the clearing draft message to the issuer computer 170, also populating the token assurance level.

In step 1104C, should a chargeback occur, the issuer computer 170 may retain and return the token as well as the PAN to the payment processing network 160.

In step 1104D, the clearing process may move the token to the PAN field and drop the real PAN from the clearing draft message to the acquirer computer 150.

The network token system as discussed with different embodiments provides a platform that can be leveraged by external entities (e.g., third party wallets, e-commerce merchants, payment enablers/payment service providers, etc.) or internal payment processing network systems that have the need to use the token to facilitate payment transactions. In embodiments of the invention, a token can support interoperability and can be accepted, processed and routed by the entities within the payment system. Embodiments of the invention can help card issuers and merchants improve card security or enable new payment experiences through tokenization.

The various participants and elements described herein with reference to FIGS. 1 and 2 may operate one or more computer apparatuses to facilitate the functions described herein. Any of the elements in FIGS. 1 and 2, including any servers or databases, may use any suitable number of subsystems to facilitate the functions described herein.

Figure 12:
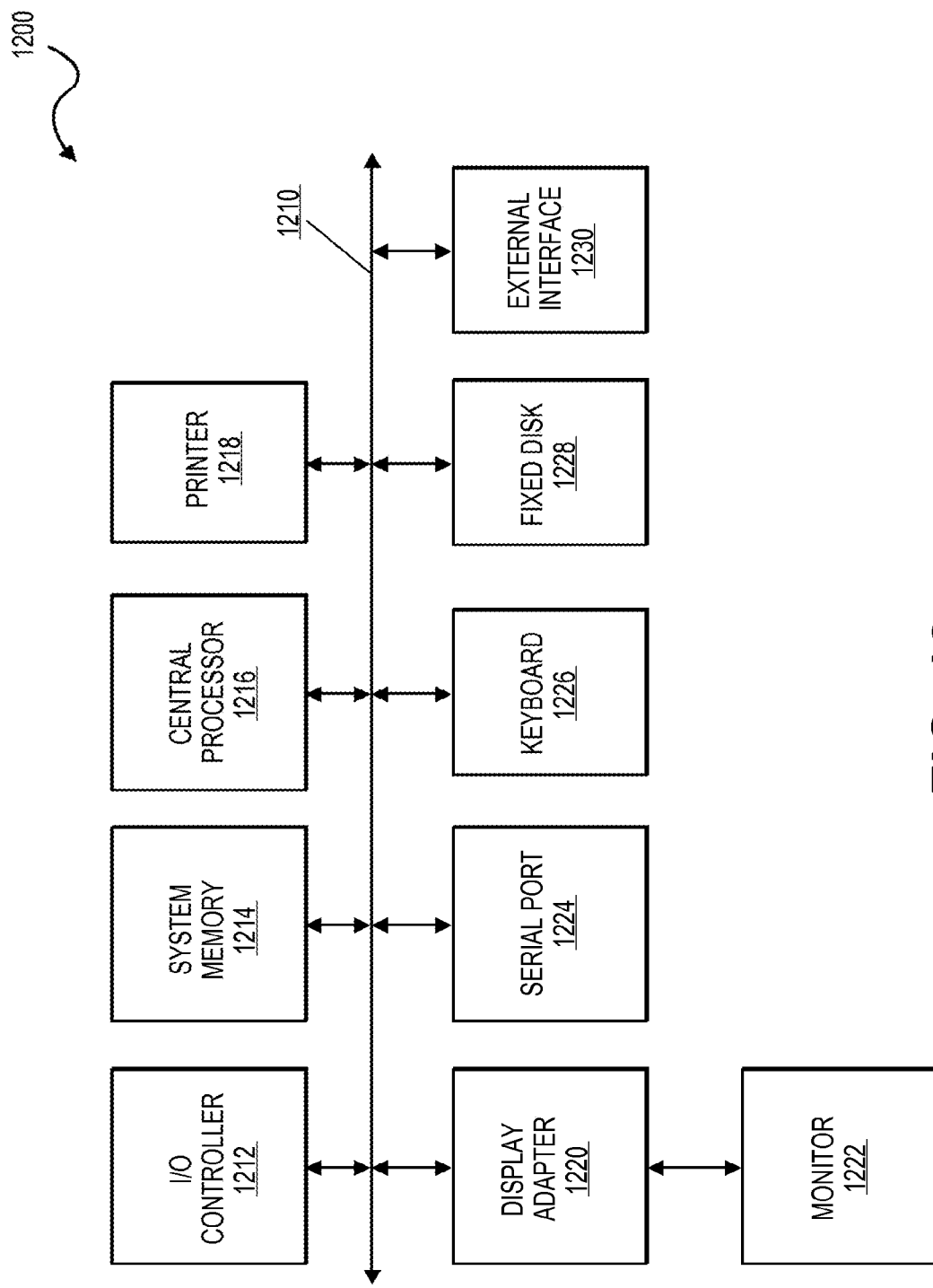
FIG. 12 shows a block diagram of a computer apparatus.

Examples of such subsystems or components are shown in FIG. 12. The subsystems shown in FIG. 12 are interconnected via a system bus 1210. Additional subsystems such as a printer 1218, keyboard 1226, fixed disk 1228 (or other memory comprising computer readable media), monitor 1222, which is coupled to display adapter 1220, and others are shown. Peripherals and input/output (I/O) devices, which couple to I/O controller 1212 (which can be a processor or other suitable controller), can be connected to the computer system by any number of means known in the art, such as serial port 1224. For example, serial port 1224 or external interface 1230 can be used to connect the computer apparatus to a wide area network such as the Internet, a mouse input device, or a scanner. The interconnection via system bus allows the central processor 1216 to communicate with each subsystem and to control the execution of instructions from system memory 1214 or the fixed disk 1228, as well as the exchange of information between subsystems. The system memory 1214 and/or the fixed disk 1228 may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method, comprising:
receiving, by a token processing server computer, a token request comprising a real account identifier from a token requestor computer, the token request requesting a token to be issued as substitute for the real account identifier;
performing, by the token processing server computer, an authentication method among a plurality of authentication methods on one or more of the real account identifier, the token or a holder of the real account identifier;
determining, by the token processing server computer, a token assurance level based on the authentication method, wherein the token assurance level indicates a level of confidence that the token was requested by a genuine account holder of the real account identifier;
identifying, by the token processing server computer, a token requestor communication interface provided by the token processing server computer;
transmitting, by the token processing server computer via the token requestor communication interface, the token representing the real account identifier to the token requestor computer, wherein the token requestor computer is authorized to obtain the token through the token requestor communication interface;
receiving, by the token processing server computer from a merchant computer, an authorization request message comprising the token for a transaction;
determining, by the token processing server computer, the real account identifier associated with the token;
generating, by the token processing server computer, a modified authorization request message comprising the real account identifier and the token assurance level associated with the token;
identifying, by the token processing server computer, an issuer communication interface provided by the token processing server computer, wherein the issuer communication interface executes on an issuer computer;
transmitting, by the token processing server computer via the issuer communication interface, the modified authorization request message to the issuer computer for approval, wherein the issuer computer is authorized to receive the token assurance level associated with the token through the issuer communication interface, wherein the issuer computer authorizes the modified authorization request message at least based on the token assurance level received via the issuer communication interface;
receiving, by the token processing server computer from the issuer computer, an authorization response message comprising the real account identifier;
generating, by the token processing server computer, a modified authorization response message including the token and the token assurance level; and
transmitting, by the token processing server computer, the modified authorization response message to the merchant computer.

2. The method of claim 1, wherein the issuer computer generates an authorization response message comprising the real account identifier, and transmits the authorization response message comprising the real account identifier to the token processing server computer.

3. The method of claim 1, further comprising:
before receiving the authorization request message, receiving, by the token processing server computer, the token from the issuer computer, wherein the token assurance level is generated by the issuer computer along with the token.

4. The method of claim 1, further comprising:
upon receiving the authorization request message comprising the token:
validating, by the token processing server computer, the token if the token assurance level is below a predetermined threshold; and
bypassing validation of the token if the token assurance level is above a predetermined threshold.

5. The method of claim 1, further comprising:
before receiving the authorization request message, generating, by the token processing server computer, the token along with the token assurance level.

6. The method of claim 1, wherein the token request further comprises an expiration date for the real account identifier, and the method further comprises sending, by the token processing server computer, an expiration date for the token to the token requestor computer.

7. The method of claim 1, wherein the token request comprises a CVV2 value associated with the real account identifier, and wherein the authentication method comprises a CVV2 check.

8. The method of claim 1, wherein the token requestor computer is a mobile phone.

9. The method of claim 1, further comprising:
performing, by the token processing server computer, a clearing process using the token and the token assurance level.

10. The method of claim 1, further comprising:
determining, by the token processing server computer, that one or more successful transactions have been performed using the token; and
updating the token assurance level to a higher token assurance level based on the one or more successful transactions.

11. A token processor server computer comprising a processor and a non-transitory computer readable medium storing instructions that, when executed by the processor, cause the processor to perform the steps of:
receiving a token request comprising a real account identifier from a token requestor computer, the token request requesting a token to be issued as substitute for the real account identifier;
performing an authentication method among a plurality of authentication methods on one or more of the real account identifier, the token or a holder of the real account identifier;
determining a token assurance level based on the authentication method, wherein the token assurance level indicates a level of confidence that the token was requested by a genuine account holder of the real account identifier;
identifying a token requestor communication interface provided by the token processing server computer;
transmitting, via the token requestor communication interface, the token representing the real account identifier to the token requestor computer, wherein the token requestor computer is authorized to obtain the token through the token requestor communication interface;
receiving, from a merchant computer, an authorization request message comprising the token for a transaction;
determining the real account identifier associated with the token;

generating a modified authorization request message comprising the real account identifier and the token assurance level associated with the token;
identifying an issuer communication interface provided by the token processing server computer, wherein the issuer communication interface executes on an issuer computer;
transmitting, via the issuer communication interface, the modified authorization request message to an issuer computer for approval, wherein the issuer computer is authorized to receive the token assurance level associated with the token through the issuer communication interface, wherein the issuer computer authorizes the modified authorization request message at least based on the token assurance level received via the issuer communication interface;
receiving, from the issuer computer, an authorization response message comprising the real account identifier;
generating a modified authorization response message including the token and the token assurance level; and
transmitting the modified authorization response message to the merchant computer.

12. The token processing server computer of claim 11, wherein the instructions, when executed by the processor, further cause the processor to perform the step of:
before receiving the authorization request message, receiving the token from the issuer computer.

13. The token processing server computer of claim 12, wherein the instructions, when executed by the processor, further cause the processor to perform the step of:
generating the token assurance level along with the token.

14. The token processing server computer of claim 11, wherein the instructions, when executed by the processor, further cause the processor to perform the step of:
assisting in a liability and dispute processing for a tokenized transaction where an entity approved the tokenized transaction when the token assurance level indicated risk of fraud, wherein the liability and dispute processing assigns liability to the entity.

15. The token processing server computer of claim 11, wherein the instructions, when executed by the processor, further cause the processor to perform the step of:
performing one or more additional authentication processes on one or more of the real account identifier, the token, or the holder of the real account identifier; and
updating the token assurance level based on the one or more additional authentication processes.

16. The token processing server computer of claim 11, wherein the instructions, when executed by the processor, further cause the processor to perform the step of:
periodically performing one or more additional authentication processes on one or more of the real account identifier, the token, or the holder of the real account identifier to account for changes to the token assurance level over time.

17. The token processing server computer of claim 11, wherein the token assurance level includes one or more of an indication that the token has not been authenticated, an indication that the token is authenticated by the token processing server computer, an identifier for the token processing server computer as an entity that performed the authentication method, a date that the authentication method was performed, an identification indicator of the token requestor computer, or an assurance level score.

18. The token processing server computer of claim 11, wherein the token assurance level is represented in form of a token assurance level field code incorporated in the modified authorization request message or the modified authorization response message.

19. The token processing server computer of claim 11, wherein the token assurance level indicates the authentication method used to authenticate the real account identifier, the token, or the holder of the real account identifier.

20. The token processing server computer of claim 11, wherein the token assurance level represents a level of confidence that the token was legitimately generated, and that the token is being used by a genuine holder of the real account identifier.

* * * * *